US010877720B2

(12) United States Patent
Decker et al.

(10) Patent No.: US 10,877,720 B2
(45) Date of Patent: Dec. 29, 2020

(54) BROWSER WITH DOCKED TABS

(71) Applicant: Apple Inc., Cupertino, CA (US)

(72) Inventors: Kevin Decker, San Jose, CA (US); Ada Chan, Cupertino, CA (US); Steven Falkenburg, Los Altos, CA (US); Chanaka G. Karunamuni, San Jose, CA (US); Richard Mondello, Mountain View, CA (US); Patrick L. Coffman, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/363,945

(22) Filed: Mar. 25, 2019

(65) Prior Publication Data

US 2019/0220243 A1  Jul. 18, 2019

Related U.S. Application Data

(63) Continuation of application No. 14/864,759, filed on Sep. 24, 2015, now Pat. No. 10,275,116.
(Continued)

(51) Int. Cl.
*G06F 3/16* (2006.01)
*G06F 16/957* (2019.01)
(Continued)

(52) U.S. Cl.
CPC ............ *G06F 3/165* (2013.01); *G06F 3/0482* (2013.01); *G06F 3/0483* (2013.01); *G06F 3/04842* (2013.01); *G06F 16/9577* (2019.01)

(58) Field of Classification Search
CPC .................. G06F 3/165; G06F 16/9577
See application file for complete search history.

(56) References Cited

U.S. PATENT DOCUMENTS

| 5,815,657 A | 9/1998 | Williams et al. |
| 6,097,371 A | 8/2000 | Siddiqui et al. |

(Continued)

FOREIGN PATENT DOCUMENTS

| AU | 2016100796 A4 | 6/2016 |
| CN | 1443427 A | 9/2003 |

(Continued)

OTHER PUBLICATIONS

Decision on Appeal received for U.S. Appl. No. 14/774,664, mailed on Sep. 12, 2019, 8 pages.
(Continued)

*Primary Examiner* — Roland J Casillas
(74) *Attorney, Agent, or Firm* — Dentons US LLP

(57) ABSTRACT

Systems and methods for displaying an icon representation of a webpage are provided. In one exemplary method, while displaying a web browser, an electronic device receives a request to display an icon representation of a webpage. In response to receiving the request, the device determines whether the webpage provides access to an image that meets predefined quality standards. In accordance with a determination that the webpage provides access to an image that meets predefined quality standards, the device displays the high-quality image as an icon associated with the webpage at a respective location in the web browser. In accordance with a determination that the webpage does not provide access to an image that meets the predefined quality standards, the device identifies other content associated with the webpage, generates a generated icon based on the content, and displays the generated icon at a respective location in the web browser.

27 Claims, 43 Drawing Sheets

Related U.S. Application Data

(60) Provisional application No. 62/172,227, filed on Jun. 7, 2015.

(51) Int. Cl.
*G06F 3/0482* (2013.01)
*G06F 3/0483* (2013.01)
*G06F 3/0484* (2013.01)

(56) References Cited

U.S. PATENT DOCUMENTS

| | | |
|---|---|---|
| 6,393,462 B1 | 5/2002 | Mullen-Schultz |
| 6,416,471 B1 | 7/2002 | Kumar et al. |
| 6,662,023 B1 | 12/2003 | Helle |
| 6,912,694 B1 | 6/2005 | Harrison et al. |
| 7,302,650 B1 | 11/2007 | Allyn et al. |
| 7,305,350 B1 | 12/2007 | Bruecken et al. |
| 7,502,480 B2 | 3/2009 | Baudisch et al. |
| 7,526,728 B2 | 4/2009 | Apparao et al. |
| 7,773,460 B2 | 8/2010 | Holt |
| 7,970,827 B1 | 6/2011 | Cumberbatch et al. |
| 8,105,208 B2 | 1/2012 | Oleson et al. |
| 8,121,945 B2 | 2/2012 | Rackley, III et al. |
| 8,225,191 B1 | 7/2012 | Kalman |
| 8,280,541 B1 | 10/2012 | Chen |
| 8,386,563 B2 | 2/2013 | Parks et al. |
| 8,392,617 B1 | 3/2013 | Weber et al. |
| 8,453,940 B2 | 6/2013 | Diamond |
| 8,462,997 B2 | 6/2013 | Soldan et al. |
| 8,467,770 B1 | 6/2013 | Ben Ayed |
| 8,478,816 B2 | 7/2013 | Parks et al. |
| 8,543,081 B2 | 9/2013 | Scott et al. |
| 8,554,694 B1 | 10/2013 | Ward et al. |
| 8,566,403 B2 | 10/2013 | Pascal et al. |
| 8,595,798 B2 | 11/2013 | Anand et al. |
| 8,624,836 B1 | 1/2014 | Miller et al. |
| 8,666,361 B2 | 3/2014 | Chu et al. |
| 8,681,203 B1 | 3/2014 | Yin et al. |
| 8,700,158 B2 | 4/2014 | Mass et al. |
| 8,706,628 B2 | 4/2014 | Phillips |
| 8,812,601 B2 | 8/2014 | Hsieh et al. |
| 8,825,445 B2 | 9/2014 | Hoffman et al. |
| 8,886,710 B2 | 11/2014 | Evans et al. |
| 8,914,840 B2 | 12/2014 | Reisman |
| 8,931,703 B1 | 1/2015 | Mullen et al. |
| 9,338,242 B1 | 5/2016 | Suchland et al. |
| 9,680,927 B2 | 6/2017 | Miller et al. |
| 9,904,906 B2 | 2/2018 | Kim et al. |
| 10,051,103 B1 | 8/2018 | Gordon et al. |
| 10,425,284 B2 | 9/2019 | Dellinger et al. |
| 2001/0031622 A1 | 10/2001 | Kivela et al. |
| 2002/0029169 A1 | 3/2002 | Oki et al. |
| 2002/0068600 A1 | 6/2002 | Chihara et al. |
| 2002/0142734 A1 | 10/2002 | Wickstead |
| 2003/0002391 A1 | 1/2003 | Biggs et al. |
| 2003/0182628 A1 | 9/2003 | Lira |
| 2003/0229900 A1 | 12/2003 | Reisman |
| 2004/0077462 A1 | 4/2004 | Brown et al. |
| 2004/0168107 A1 | 8/2004 | Sharp et al. |
| 2004/0201608 A1 | 10/2004 | Ma et al. |
| 2004/0218472 A1 | 11/2004 | Narayanaswami et al. |
| 2004/0225966 A1 | 11/2004 | Besharat et al. |
| 2004/0246607 A1 | 12/2004 | Watson et al. |
| 2005/0156873 A1 | 7/2005 | Walter et al. |
| 2005/0197063 A1 | 9/2005 | White et al. |
| 2005/0202846 A1 | 9/2005 | Glass et al. |
| 2006/0000900 A1 | 1/2006 | Fernandes et al. |
| 2006/0069458 A1 | 3/2006 | Lee et al. |
| 2006/0122748 A1 | 6/2006 | Nou |
| 2006/0155578 A1 | 7/2006 | Eisenberger et al. |
| 2006/0173749 A1 | 8/2006 | Ward et al. |
| 2006/0217104 A1 | 9/2006 | Cho |
| 2006/0218500 A1 | 9/2006 | Sauve et al. |
| 2006/0236255 A1 | 10/2006 | Lindsay et al. |
| 2006/0271605 A1 | 11/2006 | Petruzzo |
| 2006/0291666 A1 | 12/2006 | Ball et al. |
| 2007/0067733 A1 | 3/2007 | Moore et al. |
| 2007/0096765 A1 | 5/2007 | Kagan et al. |
| 2007/0101279 A1 | 5/2007 | Chaudhri et al. |
| 2007/0135043 A1 | 6/2007 | Hayes et al. |
| 2007/0194110 A1 | 8/2007 | Esplin et al. |
| 2007/0194113 A1 | 8/2007 | Esplin et al. |
| 2007/0244586 A1 | 10/2007 | Champion et al. |
| 2007/0254712 A1 | 11/2007 | Chitti |
| 2007/0261537 A1 | 11/2007 | Eronen et al. |
| 2007/0271340 A1 | 11/2007 | Goodman et al. |
| 2007/0283011 A1 | 12/2007 | Rakowski et al. |
| 2008/0040265 A1 | 2/2008 | Rackley, III et al. |
| 2008/0076637 A1 | 3/2008 | Gilley et al. |
| 2008/0077936 A1 | 3/2008 | Goel et al. |
| 2008/0183909 A1 | 7/2008 | Lim et al. |
| 2008/0259829 A1 | 10/2008 | Rosenblatt |
| 2009/0037326 A1 | 2/2009 | Chitti et al. |
| 2009/0057396 A1 | 3/2009 | Barbour et al. |
| 2009/0060170 A1 | 3/2009 | Coughlan et al. |
| 2009/0113315 A1 | 4/2009 | Fisher et al. |
| 2009/0144451 A1 | 6/2009 | Cabezas et al. |
| 2009/0164581 A1 | 6/2009 | Bove et al. |
| 2009/0195497 A1 | 8/2009 | Fitzgerald et al. |
| 2009/0205041 A1 | 8/2009 | Michalske |
| 2009/0216556 A1 | 8/2009 | Martin et al. |
| 2009/0231960 A1 | 9/2009 | Hutcheson |
| 2009/0248737 A1 | 10/2009 | Shukla et al. |
| 2009/0271744 A1 | 10/2009 | Anders |
| 2009/0276463 A1 | 11/2009 | Miller et al. |
| 2009/0311993 A1 | 12/2009 | Horodezky |
| 2009/0313579 A1 | 12/2009 | Poulson et al. |
| 2009/0319467 A1 | 12/2009 | Berg et al. |
| 2010/0054519 A1 | 3/2010 | Mulvey et al. |
| 2010/0064255 A1 | 3/2010 | Rottler et al. |
| 2010/0082481 A1 | 4/2010 | Lin et al. |
| 2010/0151908 A1 | 6/2010 | Skarby et al. |
| 2010/0151918 A1 | 6/2010 | Annambhotla et al. |
| 2010/0157742 A1 | 6/2010 | Relyea et al. |
| 2010/0190468 A1 | 7/2010 | Scott et al. |
| 2010/0194692 A1 | 8/2010 | Orr et al. |
| 2010/0198453 A1 | 8/2010 | Dorogusker et al. |
| 2010/0202368 A1 | 8/2010 | Hans |
| 2010/0211685 A1 | 8/2010 | McDowall et al. |
| 2010/0223145 A1 | 9/2010 | Dragt |
| 2010/0223542 A1 | 9/2010 | Vuong et al. |
| 2010/0223563 A1 | 9/2010 | Green |
| 2010/0225962 A1 | 9/2010 | Okigami et al. |
| 2010/0226213 A1 | 9/2010 | Drugge et al. |
| 2010/0281374 A1 | 11/2010 | Schulz et al. |
| 2010/0295795 A1 | 11/2010 | Wilairat |
| 2010/0299601 A1 | 11/2010 | Kaplan et al. |
| 2011/0004835 A1 | 1/2011 | Yanchar et al. |
| 2011/0010195 A1 | 1/2011 | Cohn et al. |
| 2011/0059769 A1 | 3/2011 | Brunolli |
| 2011/0061010 A1 | 3/2011 | Wasko et al. |
| 2011/0074699 A1 | 3/2011 | Marr et al. |
| 2011/0078025 A1 | 3/2011 | Shrivastav et al. |
| 2011/0083111 A1 | 4/2011 | Forutanpour et al. |
| 2011/0088086 A1 | 4/2011 | Swink et al. |
| 2011/0098928 A1 | 4/2011 | Hoffman et al. |
| 2011/0106954 A1 | 5/2011 | Chatterjee et al. |
| 2011/0113337 A1 | 5/2011 | Liu et al. |
| 2011/0137678 A1 | 6/2011 | Williams |
| 2011/0159959 A1 | 6/2011 | Mallinson et al. |
| 2011/0167369 A1 | 7/2011 | van Os |
| 2011/0193878 A1 | 8/2011 | Seo et al. |
| 2011/0197165 A1 | 8/2011 | Filippov et al. |
| 2011/0202883 A1 | 8/2011 | Oh et al. |
| 2011/0205851 A1 | 8/2011 | Harris et al. |
| 2011/0218765 A1 | 9/2011 | Rogers et al. |
| 2011/0227872 A1 | 9/2011 | Huska et al. |
| 2011/0234152 A1 | 9/2011 | Frossen et al. |
| 2011/0251892 A1 | 10/2011 | Laracey |
| 2011/0271223 A1 | 11/2011 | Cruz Moreno et al. |
| 2011/0296324 A1 | 12/2011 | Goossens et al. |
| 2011/0304685 A1 | 12/2011 | Khedouri et al. |
| 2011/0319056 A1 | 12/2011 | Toy et al. |
| 2011/0320450 A1 | 12/2011 | Liu et al. |

(56) References Cited

U.S. PATENT DOCUMENTS

| | | |
|---|---|---|
| 2012/0001922 A1 | 1/2012 | Escher et al. |
| 2012/0015779 A1 | 1/2012 | Powch et al. |
| 2012/0036029 A1 | 2/2012 | Esplin et al. |
| 2012/0036460 A1 | 2/2012 | Cieplinski et al. |
| 2012/0044062 A1 | 2/2012 | Jersa et al. |
| 2012/0059787 A1 | 3/2012 | Brown et al. |
| 2012/0060092 A1 | 3/2012 | Hill et al. |
| 2012/0066628 A1 | 3/2012 | Ens et al. |
| 2012/0079122 A1 | 3/2012 | Brown et al. |
| 2012/0079126 A1 | 3/2012 | Evans et al. |
| 2012/0083258 A1 | 4/2012 | Rabii et al. |
| 2012/0084210 A1 | 4/2012 | Farahmand |
| 2012/0092383 A1 | 4/2012 | Hysek et al. |
| 2012/0096069 A1 | 4/2012 | Chan |
| 2012/0101887 A1 | 4/2012 | Harvey et al. |
| 2012/0116550 A1 | 5/2012 | Hoffman et al. |
| 2012/0117507 A1 | 5/2012 | Tseng et al. |
| 2012/0131441 A1* | 5/2012 | Jitkoff ............... G06F 3/04817 715/234 |
| 2012/0136780 A1 | 5/2012 | El-awady et al. |
| 2012/0191603 A1 | 7/2012 | Nuzzi |
| 2012/0197523 A1 | 8/2012 | Kirsch et al. |
| 2012/0209829 A1 | 8/2012 | Thomas et al. |
| 2012/0258684 A1 | 10/2012 | Franz et al. |
| 2012/0297017 A1 | 11/2012 | Livshits et al. |
| 2012/0310674 A1 | 12/2012 | Faulkner et al. |
| 2012/0310760 A1 | 12/2012 | Phillips et al. |
| 2012/0324390 A1 | 12/2012 | Tao et al. |
| 2013/0007203 A1 | 1/2013 | Szu |
| 2013/0027341 A1 | 1/2013 | Mastandrea |
| 2013/0031490 A1 | 1/2013 | Joo et al. |
| 2013/0044072 A1 | 2/2013 | Kobayashi et al. |
| 2013/0047034 A1 | 2/2013 | Salomon et al. |
| 2013/0050263 A1 | 2/2013 | Khoe et al. |
| 2013/0055147 A1 | 2/2013 | Vasudev et al. |
| 2013/0063383 A1 | 3/2013 | Anderssonreimer et al. |
| 2013/0069893 A1 | 3/2013 | Brinda et al. |
| 2013/0093715 A1 | 4/2013 | Marsden et al. |
| 2013/0103814 A1 | 4/2013 | Carrasco et al. |
| 2013/0111579 A1 | 5/2013 | Newman et al. |
| 2013/0117696 A1 | 5/2013 | Robertson et al. |
| 2013/0137073 A1 | 5/2013 | Nacey et al. |
| 2013/0143512 A1 | 6/2013 | Hernandez et al. |
| 2013/0190083 A1 | 7/2013 | Toy et al. |
| 2013/0205210 A1 | 8/2013 | Jeon et al. |
| 2013/0222270 A1 | 8/2013 | Winkler et al. |
| 2013/0225118 A1 | 8/2013 | Jang et al. |
| 2013/0246202 A1 | 9/2013 | Tobin et al. |
| 2013/0254685 A1 | 9/2013 | Batraski et al. |
| 2013/0254705 A1 | 9/2013 | Mooring et al. |
| 2013/0260896 A1 | 10/2013 | Miura et al. |
| 2013/0262155 A1 | 10/2013 | Hinkamp |
| 2013/0290013 A1 | 10/2013 | Forrester et al. |
| 2013/0295872 A1 | 11/2013 | Guday et al. |
| 2013/0304276 A1 | 11/2013 | Flies |
| 2013/0311597 A1 | 11/2013 | Arrouye et al. |
| 2013/0311986 A1 | 11/2013 | Arrouye et al. |
| 2013/0320080 A1 | 12/2013 | Olson et al. |
| 2013/0325967 A1 | 12/2013 | Parks et al. |
| 2013/0332560 A1 | 12/2013 | Knight et al. |
| 2014/0022183 A1 | 1/2014 | Ayoub et al. |
| 2014/0025737 A1 | 1/2014 | Kruglick |
| 2014/0058860 A1 | 2/2014 | Roh et al. |
| 2014/0058935 A1 | 2/2014 | Mijares |
| 2014/0059493 A1 | 2/2014 | Kim et al. |
| 2014/0068434 A1 | 3/2014 | Filev et al. |
| 2014/0068520 A1 | 3/2014 | Missig et al. |
| 2014/0073298 A1 | 3/2014 | Rossmann |
| 2014/0074407 A1 | 3/2014 | Hernandez-silveira et al. |
| 2014/0074717 A1 | 3/2014 | Evans et al. |
| 2014/0075130 A1 | 3/2014 | Bansal et al. |
| 2014/0081854 A1 | 3/2014 | Sanchez et al. |
| 2014/0094124 A1 | 4/2014 | Dave et al. |
| 2014/0134947 A1 | 5/2014 | Stouder-Studenmund et al. |
| 2014/0143145 A1 | 5/2014 | Kortina et al. |
| 2014/0143678 A1 | 5/2014 | Mistry et al. |
| 2014/0149198 A1 | 5/2014 | Kim et al. |
| 2014/0164241 A1 | 6/2014 | Neuwirth et al. |
| 2014/0176475 A1 | 6/2014 | Myers et al. |
| 2014/0181205 A1 | 6/2014 | Sherrets et al. |
| 2014/0187323 A1 | 7/2014 | Perry |
| 2014/0189584 A1 | 7/2014 | Weng et al. |
| 2014/0208250 A1 | 7/2014 | Ording et al. |
| 2014/0244495 A1 | 8/2014 | Davis et al. |
| 2014/0245177 A1 | 8/2014 | Maklouf et al. |
| 2014/0250391 A1 | 9/2014 | Jong et al. |
| 2014/0281983 A1 | 9/2014 | Xian et al. |
| 2014/0282103 A1 | 9/2014 | Crandall et al. |
| 2014/0287821 A1 | 9/2014 | Barclay et al. |
| 2014/0289660 A1 | 9/2014 | Min et al. |
| 2014/0293755 A1 | 10/2014 | Geiser et al. |
| 2014/0304738 A1 | 10/2014 | Nakaoka et al. |
| 2014/0310618 A1 | 10/2014 | Venkatesh |
| 2014/0317543 A1 | 10/2014 | Kim |
| 2014/0325384 A1 | 10/2014 | Kobayashi |
| 2014/0325408 A1 | 10/2014 | Leppanen et al. |
| 2014/0337207 A1 | 11/2014 | Ye et al. |
| 2014/0337450 A1 | 11/2014 | Choudhary et al. |
| 2014/0362056 A1 | 12/2014 | Zambetti et al. |
| 2015/0006376 A1 | 1/2015 | Paulson et al. |
| 2015/0012425 A1 | 1/2015 | Mathew |
| 2015/0039494 A1 | 2/2015 | Sinton et al. |
| 2015/0066758 A1 | 3/2015 | DeNardis et al. |
| 2015/0067513 A1 | 3/2015 | Zambetti et al. |
| 2015/0098309 A1 | 4/2015 | Adams et al. |
| 2015/0100982 A1 | 4/2015 | Sirpal et al. |
| 2015/0121405 A1 | 4/2015 | Ates et al. |
| 2015/0130830 A1 | 5/2015 | Nagasaki et al. |
| 2015/0160856 A1 | 6/2015 | Jang et al. |
| 2015/0180980 A1 | 6/2015 | Welinder et al. |
| 2015/0185995 A1 | 7/2015 | Shoemaker et al. |
| 2015/0205509 A1 | 7/2015 | Scriven et al. |
| 2015/0215398 A1 | 7/2015 | Murphy et al. |
| 2015/0217163 A1 | 8/2015 | Amis et al. |
| 2015/0256491 A1 | 9/2015 | Eatough et al. |
| 2015/0269848 A1 | 9/2015 | Yuen et al. |
| 2015/0286391 A1 | 10/2015 | Jacobs et al. |
| 2015/0295901 A1 | 10/2015 | Woodward et al. |
| 2015/0301506 A1 | 10/2015 | Koumaiha |
| 2015/0324166 A1 | 11/2015 | Lin |
| 2015/0334546 A1 | 11/2015 | Diamond |
| 2015/0347711 A1 | 12/2015 | Soli et al. |
| 2015/0348009 A1 | 12/2015 | Rosen et al. |
| 2015/0350861 A1 | 12/2015 | Soli et al. |
| 2016/0004393 A1 | 1/2016 | Faaborg et al. |
| 2016/0014266 A1 | 1/2016 | Bhatt |
| 2016/0022202 A1 | 1/2016 | Peterson et al. |
| 2016/0027420 A1 | 1/2016 | Eronen |
| 2016/0028869 A1 | 1/2016 | Bhatt |
| 2016/0044269 A1 | 2/2016 | Kang |
| 2016/0058336 A1 | 3/2016 | Blahnik et al. |
| 2016/0065505 A1 | 3/2016 | Iskander |
| 2016/0066005 A1 | 3/2016 | Davis et al. |
| 2016/0098137 A1 | 4/2016 | Kim et al. |
| 2016/0150063 A1 | 5/2016 | Choi et al. |
| 2016/0188181 A1 | 6/2016 | Smith et al. |
| 2016/0202889 A1 | 7/2016 | Shin et al. |
| 2016/0226713 A1 | 8/2016 | Pitschel et al. |
| 2016/0239724 A1 | 8/2016 | Arfvidsson et al. |
| 2016/0253864 A1* | 9/2016 | Weber ............... G07F 17/3202 463/20 |
| 2016/0261675 A1 | 9/2016 | Block et al. |
| 2016/0327911 A1 | 11/2016 | Eim et al. |
| 2016/0357363 A1 | 12/2016 | Decker et al. |
| 2016/0357507 A1 | 12/2016 | Decker et al. |
| 2016/0358133 A1 | 12/2016 | Van Os et al. |
| 2016/0358134 A1 | 12/2016 | Van Os et al. |
| 2016/0358180 A1 | 12/2016 | Van Os et al. |
| 2017/0004507 A1 | 1/2017 | Henderson et al. |
| 2017/0063753 A1 | 3/2017 | Probasco et al. |
| 2017/0093780 A1 | 3/2017 | Lieb et al. |
| 2017/0123571 A1 | 5/2017 | Huang et al. |
| 2017/0134321 A1 | 5/2017 | Ushio et al. |
| 2017/0269792 A1 | 9/2017 | Xu et al. |

(56) References Cited

U.S. PATENT DOCUMENTS

| | | | |
|---|---|---|---|
| 2017/0289249 | A1 | 10/2017 | Knight et al. |
| 2017/0344257 | A1 | 11/2017 | Gnedin et al. |
| 2017/0354845 | A1 | 12/2017 | Williams et al. |
| 2017/0359623 | A1 | 12/2017 | Folse et al. |
| 2018/0034765 | A1 | 2/2018 | Keszler et al. |
| 2018/0039406 | A1 | 2/2018 | Kong et al. |
| 2018/0081515 | A1 | 3/2018 | Block et al. |
| 2018/0143761 | A1 | 5/2018 | Choi et al. |
| 2019/0232110 | A1 | 8/2019 | Williams |
| 2019/0232111 | A1 | 8/2019 | Williams |
| 2019/0250813 | A1 | 8/2019 | Block et al. |
| 2019/0334782 | A1 | 10/2019 | Dellinger et al. |
| 2019/0339822 | A1 | 11/2019 | Devine et al. |
| 2019/0349463 | A1 | 11/2019 | Soli et al. |
| 2020/0213437 | A1 | 7/2020 | Bhatt |

FOREIGN PATENT DOCUMENTS

| | | | |
|---|---|---|---|
| CN | 1536511 | A | 10/2004 |
| CN | 1782685 | A | 6/2006 |
| CN | 1997050 | A | 7/2007 |
| CN | 101061484 | A | 10/2007 |
| CN | 101505320 | A | 8/2009 |
| CN | 101822020 | A | 9/2010 |
| CN | 101827363 | A | 9/2010 |
| CN | 101828411 | A | 9/2010 |
| CN | 102646081 | A | 8/2012 |
| CN | 102989159 | A | 3/2013 |
| CN | 103154954 | A | 6/2013 |
| CN | 103297610 | A | 9/2013 |
| CN | 103581456 | A | 2/2014 |
| CN | 104288983 | A | 1/2015 |
| EP | 1705883 | A1 | 9/2006 |
| EP | 2426902 | A1 | 3/2012 |
| EP | 2632139 | A2 | 8/2013 |
| GB | 2550639 | A | 11/2017 |
| JP | 2003-296246 | A | 10/2003 |
| JP | 2004-258738 | A | 9/2004 |
| JP | 2005-339017 | A | 12/2005 |
| JP | 2007-41976 | A | 2/2007 |
| JP | 2008-272301 | A | 11/2008 |
| JP | 2009-147889 | A | 7/2009 |
| JP | 2010-12335 | A | 1/2010 |
| JP | 2012-53642 | A | 3/2012 |
| JP | 2012-533117 | A | 12/2012 |
| JP | 2014-44724 | A | 3/2014 |
| JP | 2014-216868 | A | 11/2014 |
| JP | 2015-531916 | A | 11/2015 |
| KR | 10-2004-0067514 | A | 7/2004 |
| KR | 10-2014-0105309 | A | 9/2014 |
| TW | 498240 | B | 8/2002 |
| TW | 200512616 | A | 4/2005 |
| TW | 201131471 | A | 9/2011 |
| TW | 201210368 | A | 3/2012 |
| TW | 201240499 | A | 10/2012 |
| WO | 2007/000012 | A1 | 1/2007 |
| WO | 2007/142703 | A1 | 12/2007 |
| WO | 2007/149731 | A1 | 12/2007 |
| WO | 2014/002711 | A1 | 1/2014 |
| WO | 2014/022711 | A1 | 2/2014 |
| WO | 2014/074407 | A1 | 5/2014 |
| WO | 2015/074548 | A1 | 5/2015 |
| WO | 2016/126733 | A1 | 8/2016 |

OTHER PUBLICATIONS

International Search Report and Written Opinion received for PCT Patent Application No. PCT/US2019/024790, dated Sep. 11, 2019, 18 pages.
Office Action received for Danish Patent Application No. PA201870385, dated Aug. 23, 2019, 3 pages.
Decision on Appeal received for U.S. Appl. No. 14/863,099, mailed on Aug. 22, 2019, 9 pages.
Invitation to Pay Additional Fee received for PCT Patent Application No. PCT/US2019/024790, dated Jul. 18, 2019, 10 pages.
Office Action received for European Patent Application No. 17810749.6, dated Aug. 20, 2019, 9 pages.
Office Action received for Japanese Patent Application No. 2016-569945, dated Jul. 29, 2019, 5 pages (2 pages of English Translation and 3 pages of Official Copy).
Supplemental Notice of Allowance received for U.S. Appl. No. 14/863,069, dated Aug. 15, 2019, 3 pages.
Advisory Action received for U.S Appl. No. 14/841,606, dated Feb. 28, 2019, 3 pages.
Advisory Action received for U.S. Appl. No. 14/869,877, dated Jan. 5, 2017, 3 pages.
Advisory Action received for U.S. Appl. No. 14/870,793, dated Apr. 13, 2017, 3 pages.
Advisory Action Received for U.S. Appl. No. 14/869,981, dated Mar. 12, 2019, 11 pages.
Certification of Examination received for Australian Patent Application No. 2018100158, dated Oct. 23, 2018, 2 pages.
Decision to Grant received for European Patent Application No. 16706081.3, dated Nov. 29, 2018, 2 pages.
Examiner's Answer to Appeal Brief received for U.S. Appl. No. 14/870,793, mailed on Apr. 16, 2018, 15 pages.
Extended European Search Report received for European Patent Application No. 16762356.0, dated Nov. 9, 2018, 10 Pages.
Extended European Search Report received for European Patent Application No. 16804040.0, dated Feb. 26, 2018, 9 pages.
Extended European Search Report received for European Patent Application No. 18213157.3, dated Apr. 12, 2019, 8 pages.
Final Office Action received for U.S. Appl. No. 14/599,424, dated Jun. 28, 2018, 12 pages.
Final Office Action received for U.S. Appl. No. 14/599,425, dated Jun. 12, 2018, 45 pages.
Final Office Action received for U.S. Appl. No. 14/599,425, dated May 19, 2017, 24 pages.
Final Office Action received for U.S. Appl. No. 14/841,606, dated Sep. 7, 2018, 34 pages.
Final Office Action received for U.S. Appl. No. 14/863,069, dated Jul. 5, 2018, 19 pages.
Final Office Action received for U.S. Appl. No. 14/869,877, dated Apr. 26, 2018, 18 pages.
Final Office Action received for U.S. Appl. No. 14/869,877, dated Aug. 3, 2016, 13 pages.
Final Office Action received for U.S. Appl. No. 14/870,726, dated Apr. 19, 2017, 17 pages.
Final Office Action received for U.S. Appl. No. 14/870,793, dated Jan. 19, 2017, 16 pages.
Final Office Action received for U.S. Appl. No. 15/614,121, dated Apr. 8, 2019, 32 pages.
Final Office Action received for U.S. Appl. No. 14/869,981, dated Dec. 26, 2018, 25 pages.
"Firefox Sync—Take Your Bookmarks, Tabs and Personal Information with You", available online at https://web.archive.org/web/20120601020556/http://support.mozilla.org/en-US/kb/firefox-sync-take-your-bookmarks-and-tabs-with-you?redirectlocale=en-US&redirectslug=what-firefox-sync, Jun. 1, 2012, 3 pages.
Intention to Grant received for European Patent Application No. 13171047.7, dated Jan. 23, 2019, 8 pages.
Intention to Grant received for European Patent Application No. 16706081.3, dated Jul. 18, 2018, 8 pages.
Intention to Grant received for European Patent Application No. 16706081.3, dated Jun. 11, 2018, 7 pages.
International Preliminary Report on Patentability received for PCT Patent Application No. PCT/US2015/032474, dated Dec. 15, 2016, 7 pages.
International Preliminary Report on Patentability received for PCT Patent Application No. PCT/US2015/053353, dated Sep. 21, 2017, 15 pages.
International Preliminary Report on Patentability received for PCT Patent Application No. PCT/US2015/064329, dated Dec. 21, 2017, 9 pages.

(56) References Cited

OTHER PUBLICATIONS

International Preliminary Report on Patentability received for PCT Patent Application No. PCT/US2016/016216, dated May 4, 2017, 14 pages.
International Preliminary Report on Patentability received for PCT Patent Application No. PCT/US2016/021403, dated Sep. 21, 2017, 21 pages.
International Preliminary Report on Patentability received for PCT Patent Application No. PCT/US2016/034175, dated Dec. 14, 2017, 14 pages.
International Preliminary Report on Patentability received for PCT Patent Application No. PCT/US2017/035554, dated Dec. 20, 2018, 39 pages.
International Preliminary Report on Patentability received for PCT Patent Application No. PCT/US2017/036608, dated Dec. 27, 2018, 12 pages.
International Search Report and Written Opinion received for PCT Patent Application No. PCT/US2015/053353, dated May 9, 2016, 21 pages.
International Search Report and Written Opinion received for PCT Patent Application No. PCT/US2015/064329, dated Apr. 28, 2016, 11 pages.
International Search Report and Written Opinion received for PCT Patent Application No. PCT/US2016/016216, dated Jun. 27, 2016, 18 pages.
International Search Report and Written Opinion received for PCT Patent Application No. PCT/US2016/021403, dated May 12, 2016, 23 pages.
International Search Report and Written Opinion received for PCT Patent Application No. PCT/US2016/034175, dated Oct. 7, 2016, 17 pages.
International Search Report and Written Opinion received for PCT Patent Application No. PCT/US2017/035554, dated Sep. 22, 2017, 42 pages.
International Search Report and Written Opinion received for PCT Patent Application No. PCT/US2017/036608, dated Oct. 20, 2017, 15 pages.
Invitation to Pay Addition Fees and Partial International Search Report received for PCT Patent Application No. PCT/US2016/016216, dated Apr. 20, 2016, 6 pages.
Invitation to Pay Addition Fees received for PCT Patent Application No. PCT/US2017/036608, dated Aug. 14, 2017, 2 pages.
Invitation to Pay Additional fees received for PCT Patent Application No. PCT/US2015/053353, dated Jan. 21, 2016, 7 pages.
Invitation to Pay Additional Fees received for PCT Patent Application No. PCT/US2016/034175, dated Aug. 11, 2016, 3 pages.
Invitation to Pay Additional Fees received for PCT Patent Application No. PCT/US2017/035554, dated Jul. 20, 2017, 2 pages.
Invitation to Restrict or Pay Additional Fees received for PCT Patent Application No. PCT/US2016/016216, dated Dec. 19, 2016, 9 pages.
"IOS Security", White Paper, Apr. 2015, 55 pages.
"iPhone User Guide for iOS 7.1 Software", Mar. 10, 2014, pp. 1-162.
"Mugs", Online Available at: https://web.archive.org/web/20151029034349/http://le-mugs.com/, Oct. 29, 2015.
Non Final Office Action received for U.S. Appl. No. 14/869,877, dated Jan. 29, 2016, 18 pages.
Non Final Office Action received for U.S. Appl. No. 14/869,877, dated Jun. 16, 2017, 17 pages.
Non Final Office Action received for U.S. Appl. No. 14/869,877, dated Oct. 5, 2018, 19 pages.
Non Final Office Action received for U.S. Appl. No. 14/870,793, dated Apr. 19, 2016, 17 pages.
Non-Final Office Action received for U. S. Appl. No. 15/554,204, dated Apr. 17, 2019, 19 pages.
Non-Final Office Action received for U.S. Appl. No. 14/599,424, dated Jan. 17, 2018, 13 pages.
Non-Final Office Action received for U.S. Appl. No. 14/599,425, dated Jan. 11, 2018, 42 pages.
Non-Final Office Action received for U.S. Appl. No. 14/599,425, dated Oct. 26, 2016, 22 pages.
Non-Final Office Action received for U.S. Appl. No. 14/841,606, dated Dec. 7, 2017, 30 pages.
Non-Final Office Action received for U.S. Appl. No. 14/863,069, dated Oct. 5, 2017, 19 pages.
Non-Final Office Action received for U.S. Appl. No. 14/869,981, dated Mar. 7, 2018, 39 pages.
Non-Final Office Action received for U.S. Appl. No. 14/870,726, dated Sep. 16, 2016, 12 pages.
Non-Final Office Action received for U.S. Appl. No. 15/614,121, dated Nov. 30, 2018, 28 pages.
Non-Final Office Action received for U.S. Appl. No. 15/620,666, dated Mar. 28, 2018, 14 pages.
Notice of Acceptance received for Australian Patent Application No. 2015267240, dated Apr. 10, 2018, 3 pages.
Notice of Acceptance received for Australian Patent Application No. 2016215440, dated Feb. 28, 2019, 3 pages.
Notice of Acceptance received for Australian Patent Application No. 2016229847, dated Sep. 12, 2018, 3 pages.
Notice of Allowance received for Chinese Patent Application No. 201580028677.9, dated Apr. 2, 2019, 2 pages (1 pages of English Translation and 1 pages of Official Copy).
Notice of Allowance received for Taiwanese Patent Application No. 104117509, dated Mar. 31, 2017, 3 pages (Official Copy Only). {See communication under 37 CFR § 1.98(a) (3)}.
Notice of Allowance received for U.S. Appl. No. 13/492,057, dated Jan. 3, 2017, 5 pages.
Notice of Allowance received for U.S. Appl. No. 13/492,057, dated May 18, 2017, 3 pages.
Notice of Allowance received for U.S. Appl. No. 14/599,424, dated Dec. 13, 2018, 6 pages.
Notice of Allowance received for U.S. Appl. No. 14/599,425, dated Dec. 19, 2018, 9 pages.
Notice of Allowance received for U.S. Appl. No. 14/863,069, dated Feb. 6, 2019, 6 pages.
Notice of Allowance received for U.S. Appl. No. 14/870,726, dated Sep. 11, 2018, 9 pages.
Notice of Allowance received for U.S. Appl. No. 15/616,480, dated Jan. 3, 2019, 8 pages.
Office Action received for Japanese Patent Application No. 2016-569945, dated Nov. 10, 2017, 8 pages (4 pages of English Translation and 4 pages of Official Copy).
Office Action received for Australian Patent Application No. 2015267240, dated Apr. 10, 2017, 5 pages.
Office Action received for Australian Patent Application No. 2015267240, dated Mar. 21, 2018, 5 pages.
Office Action received for Australian Patent Application No. 2016100796, dated Aug. 26, 2016, 6 pages.
Office Action received for Australian Patent Application No. 2016100796, dated Feb. 13, 2017, 4 pages.
Office Action received for Australian Patent Application No. 2016215440, dated Jan. 22, 2019, 2 pages.
Office Action received for Australian Patent Application No. 2016215440, dated Mar. 13, 2018, 3 pages.
Office Action received for Australian Patent Application No. 2016229847, dated Jul. 3, 2018, 4 pages.
Office Action received for Australian Patent Application No. 2016270323, dated Nov. 26, 2018, 4 pages.
Office Action received for Australian Patent Application No. 2017100231, dated Apr. 13, 2017, 3 pages.
Office Action received for Australian Patent Application No. 2017100667, dated Aug. 3, 2017, 9 pages.
Office Action received for Australian Patent Application No. 2017101375, dated Dec. 1, 2017, 3 pages.
Office Action received for Australian Patent Application No. 2017101375, dated Feb. 19, 2018, 4 pages.
Office Action received for Australian Patent Application No. 2018100158, dated Apr. 23, 2018, 5 pages.
Office Action received for Australian Patent Application No. 2018101855, dated Feb. 22, 2019, 4 pages.
Office Action received for Australian Patent Application No. 2018206772, dated Apr. 1, 2019, 4 pages.

(56) References Cited

OTHER PUBLICATIONS

Office Action received for Chinese Patent Application No. 201510284850.3, dated Jul. 9, 2018, 11 pages (2 pages of English Translation and 9 pages of Official copy).
Office Action received for Chinese Patent Application No. 201510284850.3, dated Nov. 28, 2017, 15 pages (5 pages of English Translation and 10 pages of Official Copy).
Office Action received for Chinese Patent Application No. 201580028677.9, dated May 25, 2018, 14 pages (4 pages of English Translation and 10 pages of Official copy).
Office Action received for Chinese Patent Application No. 201610371774.4, dated Dec. 19, 2018, 13 pages (5 pages of English Translation and 8 pages of Official copy).
Office Action received for Chinese Patent Application No. 201620509515.9, dated Nov. 9, 2016, 2 pages (1 page of English Translation and 1 page of Official Copy).
Office Action received for Danish Patent Application No. PA201670362, dated Jan. 29, 2018, 3 pages.
Office Action received for Danish Patent Application No. PA201670362, dated Jun. 1, 2017, 6 pages.
Office Action received for Danish Patent Application No. PA201670362, dated Nov. 21, 2016, 11 pages.
Office Action received for Danish Patent Application No. PA201670749, dated Jan. 30, 2017, 11 pages.
Office Action received for Danish Patent Application No. PA201670749, dated Oct. 3, 2017, 3 pages.
Office Action received for Danish Patent Application No. PA201670751, dated Jan. 13, 2017, 9 pages.
Office Action received for Danish Patent Application No. PA201670751, dated Nov. 13, 2017, 2 pages.
Office Action received for Danish Patent Application No. PA201770423, dated Jun. 12, 2018, 7 pages.
Office Action received for Danish Patent Application No. PA201770423, dated Mar. 29, 2019, 6 pages.
Office Action received for European Patent Application No. 13171047.7, dated May 24, 2017, 7 pages.
Office Action received for European Patent Application No. 15730890.9, dated Aug. 3, 2017, 4 pages.
Office Action received for Japanese Patent Application No. 2016-569945, dated Sep. 10, 2018, 11 pages (6 pages of English Translation and 5 pages of Official Copy).
Office Action received for Japanese Patent Application No. 2017-545918, dated Sep. 14, 2018, 12 pages (7 pages of English Translation and 5 pages of Official copy).
Office Action received for Japanese Patent Application No. 2017-562330, dated Jan. 18, 2019, 11 pages (6 pages of English Translation and 5 pages of Official Copy).
Office Action received for Korean Patent Application No. 10-2017-7024570, dated Sep. 28, 2018, 14 pages (6 pages of English Translation and 8 pages of Official copy).
Office Action received for Korean Patent Application No. 10-2017-7034558, dated Dec. 15, 2018, 15 pages (7 pages of English Translation and 8 pages of Official Copy).
Office Action received for Taiwanese Patent Application No. 104117509, dated Aug. 22, 2016, 6 pages (3 pages of English Translation and 3 pages of Official Copy).
Office Action received for Taiwanese Patent Application No. 104132636, dated Dec. 13, 2018, 26 pages (9 pages of English Translation and 17 pages of Official Copy).
Office Action received for Taiwanese Patent Application No. 104132636, dated Mar. 23, 2017, 25 pages (10 pages of English Translation and 15 pages of Official copy).
Office Action received for Taiwanese Patent Application No. 104132636, dated Oct. 31, 2017, 10 pages (4 pages of English Translation and 6 pages of Official Copy).
Preliminary Opinion received for European Patent Application No. 15730890.9, dated Mar. 7, 2019, 4 pages.
Search Report and Opinion received for Danish Patent Application No. PA201770423, dated Oct. 4, 2017, 10 pages.
Search Report and Opinion received for Danish Patent Application No. PA201870385, dated Nov. 16, 2018, 10 Pages.
Summons to Attend Oral Proceedings received for European Patent Application No. 13171047.7, mailed on Jul. 9, 2018, 12 pages.
Summons to Attend Oral Proceedings received for European Patent Application No. 15730890.9, mailed on Sep. 10, 2018, 11 pages.
Supplemental Notice of Allowance received for U.S. Appl. No. 14/863,069, dated Mar. 29, 2019, 3 pages.
Supplemental Notice of Allowance received for U.S. Appl. No. 14/863,069, dated Mar. 1, 2019, 3 pages.
Supplemental Notice of Allowance received for U.S. Appl. No. 14/870,726, dated Mar. 6, 2019, 6 pages.
Supplemental Notice of Allowance received for U.S. Appl. No. 15/616,480, dated Mar. 28, 2019, 2 pages.
Written Opinion Issued from International Preliminary Examining Authority for PCT Application No. PCT/US2016/016216, dated Feb. 20, 2017, 12 pages.
Notice of Allowance received for Taiwanese Patent Application No. 102120412, dated Oct. 28, 2015, 5 pages (2 pages of English Translation and 3 pages of Official copy).
Office Action received for Taiwanese Patent Application No. 102120412, dated Feb. 25, 2015, 15 pages (6 pages of English Translation and 9 pages of Official Copy).
Final Office Action received for U.S. Appl. No. 13/492,057, dated Apr. 8, 2016, 29 pages.
Final Office Action received for U.S. Appl. No. 13/492,057, dated Mar. 30, 2015, 18 pages.
Non Final Office Action received for U. S. Appl. No. 13/492,057, dated Dec. 17, 2015, 25 pages.
Non Final Office Action received for U.S. Appl. No. 13/492,057, dated Jul. 8, 2014, 14 pages.
Extended European Search Report received for European Patent Application No. 13171047.7, dated Oct. 29, 2014, 8 pages.
Non-Final Office Action received for U.S. Appl. No. 14/503,372, dated Dec. 5, 2014, 11 pages.
Final Office Action received for U.S. Appl. No. 14/599,425, dated Oct. 8, 2015, 20 pages.
Non-Final Office Action received for U.S. Appl. No. 14/599,425, dated Mar. 17, 2015, 16 pages.
Office Action received for Australian Patent Application No. 2015100734, dated Jul. 29, 2015, 5 pages.
Notice of Allowance received for Chinese Patent Application No. 201520358505.5, dated Jan. 13, 2016, 3 pages (2 pages of English Translation and 1 page of Official Copy).
Akhgari, Ehsan, "Don't Leave a Trace: Private Browsing in Firefox", available online at "http://ehsanakhgari.org/blog/2008-11-04/dont-leave-trace-private-browsing-firefox", Nov. 4, 2008, 71 pages.
Beard, Chris, "Mozilla Labs Introducing Weave", available online at <https://blog.mozilla.org/labs/2007/12/introducing-weave/>, Dec. 21, 2007, 57 pages.
Bell, Killian, "Twitter Notifications, iCloud Tabs & Location-Based Reminders Appear In Latest OS X 10.8 Beta", available online at "http://www.cultofmac.com/154522/twitter-notifications-icloud-tabs-location-based-reminders-appear-in-latest-os-x-10-8-beta/", Mar. 19, 2012, 10 pages.
Codrington, Simon, "Intuitive Scrolling Interfaces with CSS Scroll Snap Points", Online Available at: https://www.sitepoint.com/intuitive-scrolling-interfaces-with-css-scroll-snap-points/, Dec. 8, 2015, 14 pages.
Dybwad, Barb, "Google Chrome Gets Bookmark Syncing", available online at "http://mashable.com/2009/11/02/chrome-bookmark-sync/", Nov. 3, 2009, 6 pages.
Google Labs, "Google Browser Sync", available online at "https://web.archive.org/web/20120518050142/http://www.google.com/tools/firefox/browsersync/faq.html", May 18, 2012, 5 pages.
Mackie, Simon, "Emulate Safari's Reader Mode in Other Browsers With Readability", available online at "https://gigaom.com/2010/06/21/emulate-safaris-reader-mode-in-other-browsers-with-readability/", Jun. 21, 2010, 5 pages.
Mozilla Services, "Firefox Sync Terms of Service (for versions prior to Firefox 29)", available online at <https://services.mozilla.com/tos/>, Aug. 19, 2010, 4 pages.

(56) References Cited

OTHER PUBLICATIONS

International Preliminary Report on Patentability received for PCT Patent Application No. PCT/US2013/044710, dated Dec. 18, 2014, 11 pages.
International Search Report and Written Opinion received for PCT Patent Application No. PCT/US2013/044710, dated Aug. 15, 2013, 11 pages.
International Search Report and Written Opinion received for PCT Patent Application No. PCT/US2015/032474, dated Aug. 19, 2015, 8 pages.
Razykdreviews, "In Depth Review of Apple Watch Activity and Workout App", available at <URL: https://www.youtube.com/watch?v=GkKl3qlK0ow>, Category: X Claims: 1-5 Category: L Reason: Internet citation/video, May 11, 2015, 1 page.
Rizknows, "Garmin Connect Mobile App—Review #2", https://www.youtube.com/watch?v=7my3wMpeRbE, Category: X Claims: 1-5 Category: L Reason: Internet citation/video, Oct. 22, 2015, 1 page.
Smith, Eddie, "The expert's guide to Instapaper", available online at "http://www.macworld.com/article/1166898/the_experts_guide_to_instapaper.html", May 23, 2012, 8 pages.
Tweedie, Steven, "Create and Customize Your Own Emojis with 'Makemoji' for iPhone", Available online at: <http://www.businessinsider.com/create-custom-emojis-with-makemoji-app-2014-8>, Aug. 19, 2014, 6 pages.
Whitwam, Ryan, "Facer is Fast Becoming the De Facto Custom Watch Face Maker for Android Wear", Available online at: <http://www.androidpolice.com/2014/09/19/facer-is-fast-becoming-the-de-facto-custom-watch-face-maker-for-android-wear>, Sep. 19, 2014, 11 pages.
Final Office Action received for U.S. Appl. No. 14/869,877, dated Jun. 11, 2019, 35 pages.
Notice of Allowance received for U.S. Appl. No. 14/863,069, dated Jun. 18, 2019, 6 pages.
Office Action received for Australian Patent Application No. 2016270323, dated May 29, 2019, 4 pages.
Office Action received for Korean Patent Application No. 10-2017-7034558, dated Jun. 4, 2019, 7 pages (3 pages of English Translation and 4 pages of Official Copy).
Office Action received for Korean Patent Application No. 10-2019-7038235, dated Mar. 9, 2020, 15 pages (7 pages of English Translation and 8 pages of Official Copy).
Certificate of Examination received for Australian Patent Application No. 2018101855, dated Aug. 6, 2019, 02 pages.
Office Action received for Australian Patent Application No. 2019100490, dated Jul. 26, 2019, 4 pages.
Supplementary European Search Report received for European Patent Application No. 17810749.6, dated Aug. 6, 2019, 6 pages.
Applicant-Initiated Interview Summary received for U.S. Appl. No. 15/614,121, dated Feb. 13, 2020, 4 pages.
Non-Final Office Action received for U.S. Appl. No. 16/145,033, dated Mar. 4, 2020, 50 pages.
Office Action received for Australian Patent Application No. 2018206772, dated Feb. 6, 2020, 4 pages.
Extended European Search Report received for European Patent Application No. 17813824.4, dated Dec. 5, 2019, 7 pages.
"How to Send and Receive files over Bluetooth on an Android Phone", Online Available at: https://web.archive.org/web/20160529062240/http://www.androidtipsandhacks.com/android/send-receive-files-bluetooth-android-phone/, May 29, 2016, 7 pages.
"Kamcord—Wikipedia", Online Available at: https://en.wikipedia.org/w/index.php?title=Kamcord&oldid=712263010>, Mar. 28, 2016, 2 pages.
"Kamcord Developers", Online Available at: https://web.archive.org/web/20140827043641/http://www.kamcord.conn/developers/>, Aug. 27, 2014, 7 pages.
"Kamcord Developers—Quick Start Guide", Online Available at: https://web.archive.org/web/20140801055705/https://www.kamcord.com/developers/docs/ios/features-and-settings/, Aug. 1, 2014, 10 pages.

Office Action received for Chinese Patent Application No. 201610371774.4, dated Dec. 2, 2019, 6 pages (3 pages of English Translation and 3 pages of Official Copy).
Office Action received for Chinese Patent Application No. 201811330077.X, dated Nov. 13, 2019, 14 pages (6 pages of English Translation and 8 pages of Official Copy).
Certificate of Examination received for Australian Patent Application No. 2019100490, dated Oct. 16, 2019, 2 pages.
Final Office Action received for U.S. Appl. No. 15/554,204, dated Oct. 31, 2019, 22 pages.
Non-Final Office Action received for U.S. Appl. No. 15/614,121, dated Nov. 4, 2019, 44 pages.
Office Action received for European Patent Application No. 15825879.8, dated Nov. 6, 2019, 6 pages.
Applicant-Initiated Interview Summary received for U. S. Appl. No. 15/554,204, dated Oct. 11, 2019, 5 pages.
Notice of Allowance received for Japanese Patent Application No. 2017-562330, dated Sep. 20, 2019, 4 pages (1 page of English Translation and 3 pages of Official Copy).
Office Action received for Chinese Patent Application No. 201680008151.9, dated Aug. 27, 2019, 24 pages (11 pages of English Translation and 13 pages of Official Copy).
Office Action received for Korean Patent Application No. 10-2017-7034558, dated Sep. 25, 2019, 9 pages (4 pages of English Translation and 5 pages of Official Copy).
Office Action received for Australian Patent Application No. 2018206772, dated Nov. 6, 2019, 4 pages.
Office Action received for Korean Patent Application No. 10-2019-7029673, dated Nov. 5, 2019, 10 pages (4 pages of English Translation and 6 pages of Official Copy).
[PC] Pre-Customization of Black Desert's Characters, Online Available at:—https://blog.naver.com/hsh6051/220209813968, Dec. 14, 2014, 41 pages (21 pages of English translation and 20 pages of Official Copy).
Decision to Grant received for European Patent Application No. 13171047.7, dated Jun. 27, 2019, 2 pages.
Extended European Search Report received for European Patent Application No. 19163212.4, dated Jun. 25, 2019, 11 pages.
Office Action received for Australian Patent Application No. 2018279037, dated Jun. 18, 2019, 5 pages.
Wikipedia, "Enhanced Multi-Level Precedence And Pre-emption Service", Available online at: https://de.wikipedia.org/w/index.php?%20title=Enhanced%20Multi%E3%83%BCLevel_Precedence_And_Pre-emption_Service&oldid=123047429, Oct. 2013, 2 pages. (Official copy only) (See Communication under 37 CFR § 1.98(a) (3)).
Advisory Action received for U.S. Appl. No. 14/863,099, dated Sep. 8, 2016, 3 pages.
Dharmasena, Anusha, "iMessage—send as text message Option", YouTube, Available online at: https://www.youtube.com/watch?v=hXG-MdlW6FA, Feb. 18, 2013, 1 page.
Examiner's Answer to Appeal Brief received for U.S. Appl. No. 14/774,664, mailed on May 31, 2018, 28 pages.
Examiner's Answer to Appeal Brief received for U.S. Appl. No. 14/863,099, mailed on Jul. 28, 2017, 31 pages.
Final Office Action received for U.S. Appl. No. 14/774,664, dated Aug. 25, 2017, 23 pages.
Final Office Action received for U.S. Appl. No. 14/863,099, dated Apr. 21, 2016, 20 pages.
International Preliminary Report on Patentability received for PCT Patent Application No. PCT/US2014/027882, dated Sep. 24, 2015, 8 pages.
International Search Report and Written Opinion received for PCT Patent Application No. PCT/US2013/032498, dated Feb. 10, 2014, 18 pages.
International Search Report and Written Opinion received for PCT Patent Application No. PCT/US2014/027882, dated Oct. 10, 2014, 11 pages.
Invitation to Pay Additional Fees received for PCT Patent Application No. PCT/US2014/027882, dated Aug. 5, 2014, 2 pages.
Non-Final Office Action received for U.S. Appl. No. 14/774,664, dated Mar. 7, 2017, 23 pages.
Non-Final Office Action received for U.S. Appl. No. 14/863,099, dated Dec. 2, 2015, 12 pages.

(56) References Cited

OTHER PUBLICATIONS

Notice of Allowance received for Japanese Patent Application No. 2017-545918, dated Jul. 22, 2019, 4 pages (1 page of English Translation and 3 pages of Official Copy).
Office Action received for Chinese Patent Application No. 201510284850.3, dated Jun. 21, 2019, 10 pages (4 pages of English Translation and 6 pages of Official Copy).
Office Action received for Chinese Patent Application No. 201610371774.4, dated Jul. 8, 2019, 6 pages (3 pages of English Translation and 3 pages of Official copy).
Office Action received for Korean Patent Application No. 10-2017-7024570, dated Jul. 10, 2019, 6 pages (3 pages of English Translation and 3 pages of Official Copy).
Non-Final Office Action received for U.S. Appl. No. 14/841,606, dated May 8, 2019, 28 pages.
Notice of Allowance received for U.S. Appl. No. 14/869,981, dated May 9, 2019, 11 pages.
Office Action received for Australian Patent Application No. 2017286296, dated May 8, 2019, 4 pages.
Office Action received for European Patent Application No. 16804040.0, dated May 13, 2019, 12 pages.
Partial Supplementary European Search Report received for European Patent Application No. 17810749.6, dated Apr. 25, 2019, 8 pages.
Applicant-Initiated Interview Summary received for U.S. Appl. No. 15/554,204, dated Jan. 31, 2020, 3 pages.
Intention to Grant received for Danish Patent Application No. PA201870385, dated Jan. 24, 2020, 2 pages.
Notice of Allowance received for Japanese Patent Application No. 2016-569945, dated Jan. 7, 2020, 4 pages (1 page of English Translation and 3 pages of Official Copy).
Office Action received for Australian Patent Application No. 2018279037, dated Jan. 17, 2020, 4 pages.
Summons to Attend Oral Proceedings received for European Patent Application No. 16804040.0, mailed on Jan. 24, 2020, 11 pages.
Wikipedia, "Emoji", Available online at: https://en.wikipedia.org/w/index.php?title=Emoji&oldid=648831795, Feb. 25, 2015, 12 pages.
Wikipedia, "Emoticon", Available online at: https://en.wikipedia.org/w/index.php?title=Emoticon&oldid=648776142, Feb. 25, 2015, 9 pages.
Advisory Action received for U.S. Appl. No. 15/554,204, dated Mar. 12, 2020, 3 pages.
Notice of Allowance received for U.S. Appl. No. 15/614,121, dated Mar. 6, 2020, 8 pages.
Final Office Action received for U.S. Appl. No. 14/864,759, dated Sep. 4, 2018, 24 pages.
International Preliminary Report on Patentability received for PCT Patent Application No. PCT/US2016/014997, dated Dec. 21, 2017, 16 pages.
International Search Report & Written Opinion received for PCT Patent Application No. PCT/US2016/014997, dated Aug. 31, 2016, 21 pages.
Invitation to Pay Addition Fees and Partial International Search Report received for PCT Patent Application No. PCT/US2016/014997, dated May 2, 2016, 5 pages.
Non-Final Office Action received for U.S. Appl. No. 14/864,759, dated Mar. 20, 2018, 20 pages.
Notice of Allowance received for U.S. Appl. No. 14/864,759, dated Dec. 14, 2018, 10 pages.
Decision to Grant received for Danish Patent Application No. PA201870385, dated Mar. 26, 2020, 2 pages.
Non-Final Office Action received for U.S. Appl. No. 16/389,722, dated Apr. 3, 2020, 15 pages.
Non-Final Office Action received for U.S. Appl. No. 16/407,590, dated Apr. 10, 2020, 12 pages.
Notice of Acceptance received for Australian Patent Application No. 2018206772, dated Mar. 17, 2020, 3 pages.
Office Action received for Chinese Patent Application No. 201710439448.7, dated Mar. 27, 2020, 13 pages (7 pages of English Translation and 6 pages of Official Copy).
Office Action received for European Patent Application No. 19724963.4, dated Jul. 28, 2020, 6 pages.
Applicant Initiated Interview Summary received for U.S. Appl. No. 16/389,722, dated Jul. 7, 2020, 5 pages.
Notice of Allowance received for U.S. Appl. No. 15/554,204, dated Jul. 13, 2020, 10 pages.
Non-Final Office Action received for U.S. Appl. No. 16/377,892, dated May 21, 2020, 9 pages.
Notice of Acceptance received for Australian Patent Application No. 2017286296, dated May 1, 2020, 3 pages.
Notice of Acceptance received for Australian Patent Application No. 2018279037, dated May 13, 2020, 3 pages.
Office Action received for European Patent Application No. 18213157.3, dated May 15, 2020, 7 pages.
Applicant-Initiated Interview Summary received for U.S. Appl. No. 16/407,590, dated Jun. 5, 2020, 3 pages.
Brief Communication Regarding Oral Proceedings received for European Patent Application No. 16804040.0, mailed on May 28, 2020, 15 pages.
Non-Final Office Action received for U.S. Appl. No. 16/378,136, dated Jun. 2, 2020, 8 pages.
Notice of Allowance received for Chinese Patent Application No. 201610371774.4, dated Jun. 4, 2020, 2 pages (1 page of English Translation and 1 page of Official Copy).
Office Action received for Australian Patent Application No. 2017277971, dated Jun. 3, 2020, 3 pages.
Applicant-Initiated Interview Summary received for U.S. Appl. No. 16/145,033, dated Jun. 29, 2020, 5 pages.
Examiner's Answer to Appeal Brief received for U.S. Appl. No. 14/869,877, mailed on Jun. 26, 2020, 14 pages.
Notice of Allowance received for Chinese Patent Application No. 201680008151.9, dated Jun. 16, 2020, 2 pages (1 page of English Translation and 1 page of Official Copy).
Office Action received for Chinese Patent Application No. 201811330077.X, dated May 18, 2020, 9 pages (3 pages of English Translation and 6 pages of Official Copy).
Office Action received for Chinese Patent Application No. 201680008151.9, dated Apr. 20, 2020, 6 pages (3 pages of English Translation and 3 pages of Official Copy).
Office Action received for Chinese Patent Application No. 201680013193.1, dated Mar. 25, 2020, 21 pages (8 pages of English Translation and 13 pages of Official Copy).
Corrected Notice of Allowance received for U.S. Appl. No. 15/554,204, dated Aug. 19, 2020, 3 pages.
Final Office Action received for U.S. Appl. No. 16/407,590, dated Aug. 25, 2020, 14 pages.
Notice of Allowance received for U.S. Appl. No. 15/614,121, dated Aug. 27, 2020, 8 pages.
Office Action received for Australian Patent Application No. 2017277971, dated Aug. 12, 2020, 3 pages.
Summons to Attend Oral Proceedings received for European Patent Application No. 17810749.6, mailed on Aug. 12, 2020, 11 pages.

\* cited by examiner

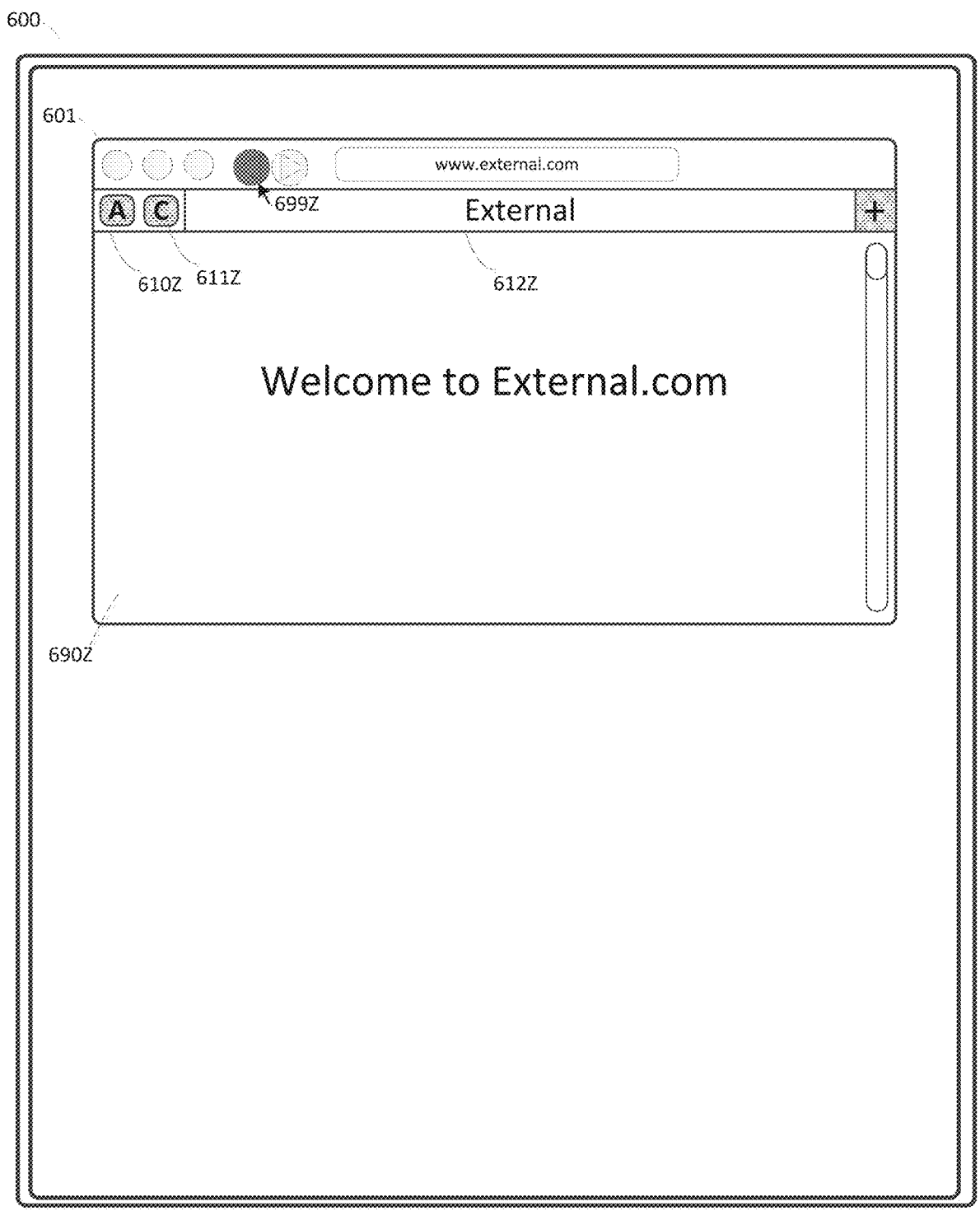
FIG. 6ZZZ

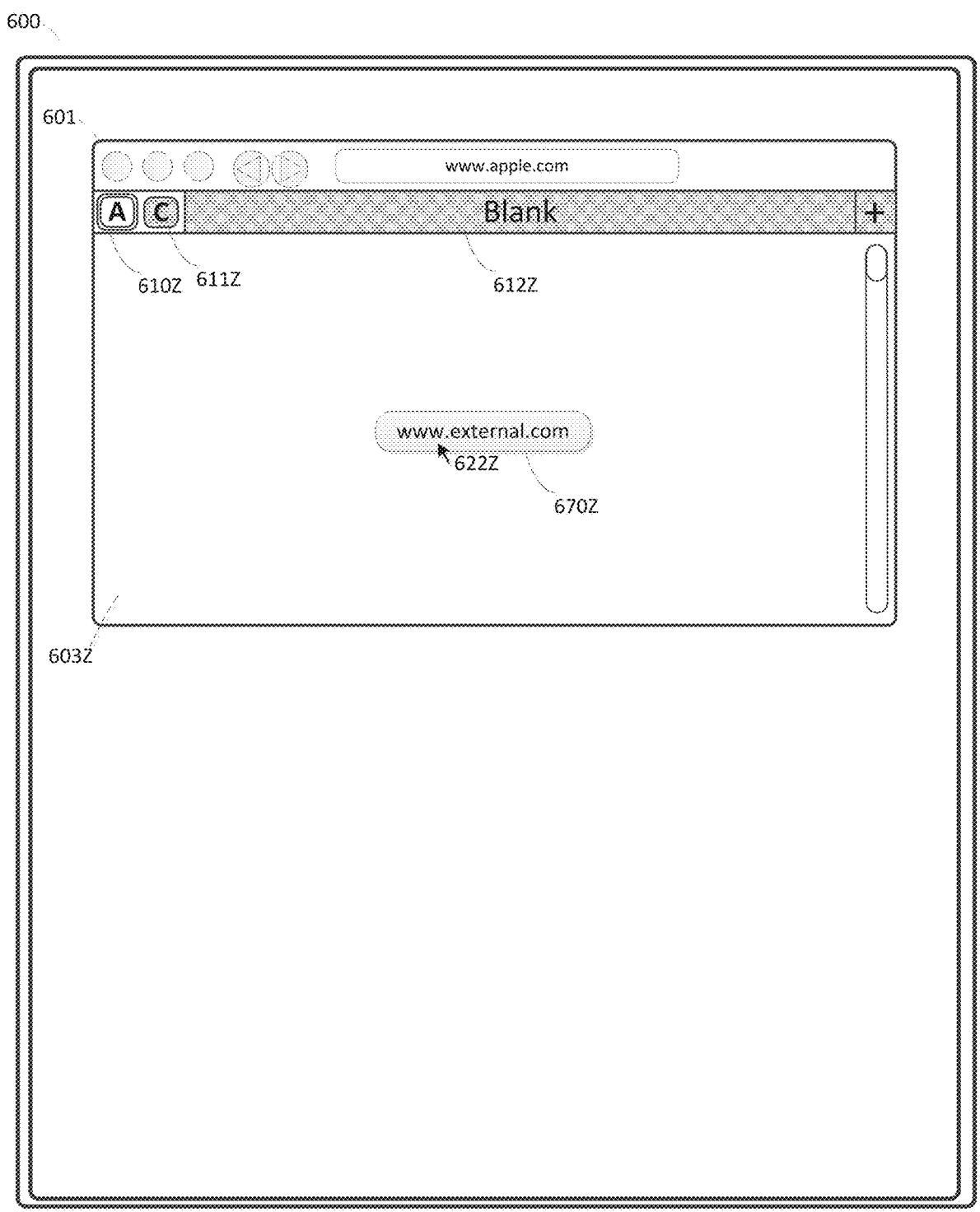
FIG. 6ZZZZ ial Patent Application No. 62/172,227, entitled
BROWSER WITH DOCKED TABS

CROSS-REFERENCE TO RELATED APPLICATIONS

This application is a continuation of U.S. patent application Ser. No. 14/864,759, entitled "Browser with Docked Tabs," filed Sep. 24, 2015, which claims priority to U.S. Provisional Patent Application No. 62/172,227, entitled "Browser with Docked Tabs," filed Jun. 7, 2015, the contents of which are hereby incorporated by reference in their entirety for all purposes.

FIELD

The present disclosure relates generally to computer user interfaces, and more specifically to techniques for managing browser tabs.

BACKGROUND

Modern electronic devices and communications systems allow users to be more connected than ever to people, information, entertainment, and shopping. A substantial amount of information is available to users utilizing the Internet, and this information is typically accessed through a web browser such as the Safari® web browser of Apple Inc. of Cupertino, Calif. A browser typically can display multiple webpages in a single window, where each webpage is associated with a single tab. Users may have many webpages active at once. Those webpages each may be associated with a tab in a single browser window, or those webpages may be open in different tabs in different browser windows.

BRIEF SUMMARY

Often, users wish to interact with particular websites on a frequent basis. Moreover, users often consume content from a webpage over multiple sessions, after having interacted with the webpage (e.g., scrolling the website or navigating to a subdomain). In such instances, a user may be required, in a subsequent session, to repeat one or more of the same interactions in order to continue their consumption of content. Additionally, it may become difficult for a user to keep track of which active webpages are open. Further, a user may have begun to enter data in one webpage, become distracted by content in a different webpage, and then forgotten he or she had already started to enter data in the first webpage. As a result, the user may open the web page in a different tab and start from the beginning, not realizing that an active webpage in a different tab already includes information entered by the user. Such repetitive entry causes additional work and consumes more of the user's time.

Some techniques for providing and managing browser tabs using electronic devices, however, are generally cumbersome and inefficient. For example, existing techniques use a complex and time-consuming user interface, which may include multiple key presses or keystrokes. Existing techniques require more time than necessary, wasting user time and device energy. This latter consideration is particularly important in battery-operated devices. Existing techniques rely on the user's attention and memory, which can vary with time of day and stress, and which may be unreliable.

Accordingly, the present application provides for electronic devices with faster, more efficient methods and interfaces for providing and managing browser tabs. Such methods and interfaces optionally complement or replace other methods for providing and managing browser tabs. Such methods and interfaces reduce the cognitive burden on a user and produce a more efficient human-machine interface. For battery-operated computing devices, such methods and interfaces conserve power and increase the time between battery charges.

In some embodiments, a method for providing and managing browser tabs at an electronic device, while a webpage is open in a first tab in a browser application, includes: receiving one or more inputs corresponding to the webpage; and in response to the one or more inputs, changing a state of the webpage in the first tab; after changing the state of the webpage in the first tab, receiving a request to open the webpage in a second tab that is different from the first tab; and in response to the request to open the webpage in the second tab, determining whether the first tab is a docked tab and whether the webpage is associated with a docked tab: in accordance with a determination that the webpage is associated with a docked tab and that the first tab is a docked tab, presenting the webpage with the state of the webpage in the first tab; in accordance with a determination that the webpage is associated with a standard tab and that the first tab is not a docked tab, presenting the webpage in the second tab with a state different from the state of the webpage in the first tab.

In some embodiments, an electronic device includes a display; a memory; one or more processors coupled to the display and the memory; and a browser application stored in the memory and executable by the processor; the processor configured to: while a webpage is open in a first tab in a browser application: receive one or more inputs corresponding to the webpage; and in response to receipt of the one or more inputs, change a state of the webpage in the first tab; after the change of the state of the webpage in the first tab: receive a request to open the webpage in a second tab that is different from the first tab; and in response to receipt of the request to open the webpage in the second tab, determine whether the first tab is a docked tab and whether the webpage is associated with a docked tab: in accordance with a determination that the webpage is associated with a docked tab and that the first tab is a docked tab, present the webpage with the state of the webpage in the first tab; in accordance with a determination that the webpage is associated with a standard tab and that the first tab is not a docked tab, present the webpage in the second tab with a state different from the state of the webpage in the first tab.

In some embodiments, a non-transitory computer-readable storage medium stores one or more programs, the one or more programs comprising instructions, which when executed by an electronic device, cause the electronic device to: while a webpage is open in a first tab in a browser application: receive one or more inputs corresponding to the webpage; and in response to receipt of the one or more inputs, change a state of the webpage in the first tab; after the change of the state of the webpage in the first tab: receive a request to open the webpage in a second tab that is different from the first tab; and in response to receipt of the request to open the webpage in the second tab, determine whether the first tab is a docked tab and whether the webpage is associated with a docked tab: in accordance with a determination that the webpage is associated with a docked tab and that the first tab is a docked tab, present the webpage with the state of the webpage in the first tab; in accordance with a determination that the webpage is associated with a standard tab and that the first tab is not a docked tab, present the webpage in the second tab with a state different from the state of the webpage in the first tab.

In some embodiments, a transitory computer-readable medium stores one or more programs, the one or more programs comprising instructions, which when executed by an electronic device, cause the electronic device to: while a webpage is open in a first tab in a browser application: receive one or more inputs corresponding to the webpage; and in response to receipt of the one or more inputs, change a state of the webpage in the first tab; after the change of the state of the webpage in the first tab: receive a request to open the webpage in a second tab that is different from the first tab; and in response to receipt of the request to open the webpage in the second tab, determine whether the first tab is a docked tab and whether the webpage is associated with a docked tab: in accordance with a determination that the webpage is associated with a docked tab and that the first tab is a docked tab, present the webpage with the state of the webpage in the first tab; in accordance with a determination that the webpage is associated with a standard tab and that the first tab is not a docked tab, present the webpage in the second tab with a state different from the state of the webpage in the first tab.

In some embodiments, a system utilizes an electronic device with a display, the system comprising: while a webpage is open in a first tab in a browser application: means for receiving one or more inputs corresponding to the webpage; and means, in response to the one or more inputs, for changing a state of the webpage in the first tab; after changing the state of the webpage in the first tab: means for receiving a request to open the webpage in a second tab that is different from the first tab; and means, in response to the request to open the webpage in the second tab, for determining whether the first tab is a docked tab and whether the webpage is associated with a docked tab: means, in accordance with a determination that the webpage is associated with a docked tab and that the first tab is a docked tab, for presenting the webpage with the state of the webpage in the first tab; means, in accordance with a determination that the webpage is associated with a standard tab and that the first tab is not a docked tab, for presenting the webpage in the second tab with a state different from the state of the webpage in the first tab.

In some embodiments, an electronic device includes: a processing unit that includes a determining unit, a display enabling unit, and a receiving unit, the processing unit configured to: while a webpage is open in a first tab in a browser application: receive, using the receiving unit, one or more inputs corresponding to the webpage; and in response to the one or more inputs, change a state of the webpage in the first tab; after the change to the state of the webpage in the first tab: receive, using the receiving unit, a request to open the webpage in a second tab that is different from the first tab; and in response to the request to open the webpage in the second tab, determine, using the determining unit, whether the first tab is a docked tab and whether the webpage is associated with a docked tab: in accordance with a determination that the webpage is associated with and that the first tab is a docked tab, present, using the display enabling unit, the webpage with the state of the webpage in the first tab; in accordance with a determination that the webpage is associated with a standard tab and that the first tab is not a docked tab, present, using the display enabling unit, the webpage in the second tab with a state different from the state of the webpage in the first tab.

Thus, devices are provided with faster, more efficient methods and interfaces for providing and managing docked browser tabs, thereby increasing the effectiveness, efficiency, and user satisfaction with such devices. Such methods and interfaces complement or replace other methods for providing and managing browser tabs.

DESCRIPTION OF THE FIGURES

For a better understanding of the various described embodiments, reference should be made to the Description of Embodiments below, in conjunction with the following drawings in which like reference numerals refer to corresponding parts throughout the figures.

DESCRIPTION OF EMBODIMENTS

Figure 1A:
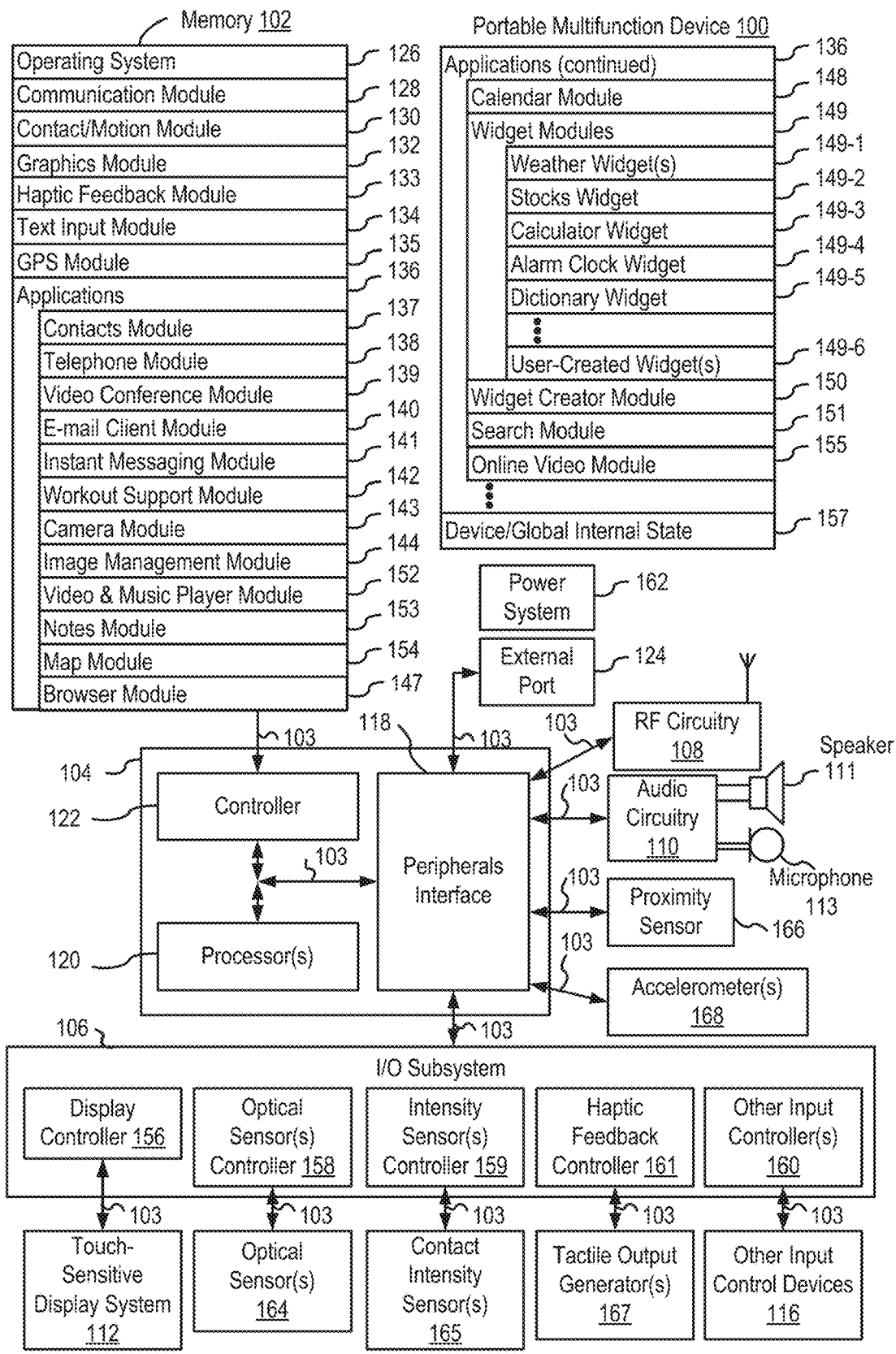
FIG. 1A is a block diagram illustrating a portable multifunction device with a touch-sensitive display in accordance with some embodiments.

The following description sets forth exemplary methods, parameters, and the like. It should be recognized, however, that such description is not intended as a limitation on the scope of the present disclosure but is instead provided as a description of exemplary embodiments.

As noted above, the present invention provides for electronic devices that provide efficient methods and interfaces for providing and managing browser tabs, such as to decrease reliance on user attention and memory. Such techniques can reduce the cognitive burden on a user who access event notifications, thereby enhancing productivity. Further, such techniques can reduce processor and battery power otherwise wasted on redundant user inputs.

Below, FIGS. 1A-1B, 2, 3, 4A-4B, and 5A-5B provide a description of exemplary devices for performing the techniques for providing and managing docked browser tabs. FIGS. 6A-6Z illustrate exemplary user interfaces for providing and managing docked browser tabs. FIGS. 7A-7F are flow diagrams illustrating methods of managing event notifications in accordance with some embodiments. The user interfaces in FIGS. 6A-6L are used to illustrate the processes described below, including the processes in FIGS. 7A-7F.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a", "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device may support a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally can include one or more computer-readable storage mediums. The computer-readable storage mediums optionally can be tangible and non-transitory. Memory 102 can optionally include high-speed random access memory and optionally also can include non-volatile memory, such as one or more magnetic disk storage devices, flash memory devices, or other non-volatile solid-state memory devices. Memory controller 122 optionally can control access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 optionally can be implemented on a single chip, such as chip 104. In some other embodiments, they optionally can be implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data optionally can be retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button optionally can disengage a lock of touch screen 112 or begin a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally can turn power to device 100 on or off. The user optionally can be able to customize a functionality of one or more of the buttons. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally can include graphics, text, icons, video, and any combination thereof (collectively termed "graphics"). In some embodiments, some or all of the visual output optionally can correspond to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally can use LCD (liquid crystal display) technology, LPD (light emitting polymer display) technology, or LED (light emitting diode) technology, although other display technologies optionally can be used in other embodiments. Touch screen 112 and display controller 156 optionally can detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 optionally can be analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 optionally can be as described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally can have a video resolution in excess of 100 dpi. In some embodiments, the touch screen has a video resolution of approximately 160 dpi. The user optionally can make contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally can include a touchpad (not shown) for activating or deactivating particular functions. In some embodiments, the touchpad is a touch-sensitive area of the device that, unlike the touch screen, does not display visual output. The touchpad optionally can be a touch-sensitive surface that is separate from touch screen 112 or an extension of the touch-sensitive surface formed by the touch screen.

Device 100 also includes power system 162 for powering the various components. Power system 162 optionally can include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 also optionally can include one or more optical sensors 164. FIG. 1A shows an optical sensor coupled to optical sensor controller 158 in I/O subsystem 106. Optical sensor 164 optionally can include charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally can capture still images or video. In some embodiments, an optical sensor is located on the back of device 100, opposite touch screen display 112 on the front of the device so that the touch screen display optionally can be used as a viewfinder for still and/or video image acquisition. In some embodiments, an optical sensor is located on the front of the device so that the user's image optionally can be obtained for video conferencing while the user views the other video conference participants on the touch screen display. In some embodiments, the position of optical sensor 164 can be changed by the user (e.g., by rotating the lens and the sensor in the device housing) so that a single optical sensor 164 optionally can be used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 also optionally can include one or more proximity sensors 166. FIG. 1A shows proximity sensor 166 coupled to peripherals interface 118. Alternately, proximity sensor 166 optionally can be coupled to input controller 160 in I/O subsystem 106. Proximity sensor 166 optionally can perform as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally can also include one or more accelerometers 168. FIG. 1A shows accelerometer 168 coupled to peripherals interface 118. Alternately, accelerometer 168 optionally can be coupled to an input controller 160 in I/O subsystem 106. Accelerometer 168 optionally can perform as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
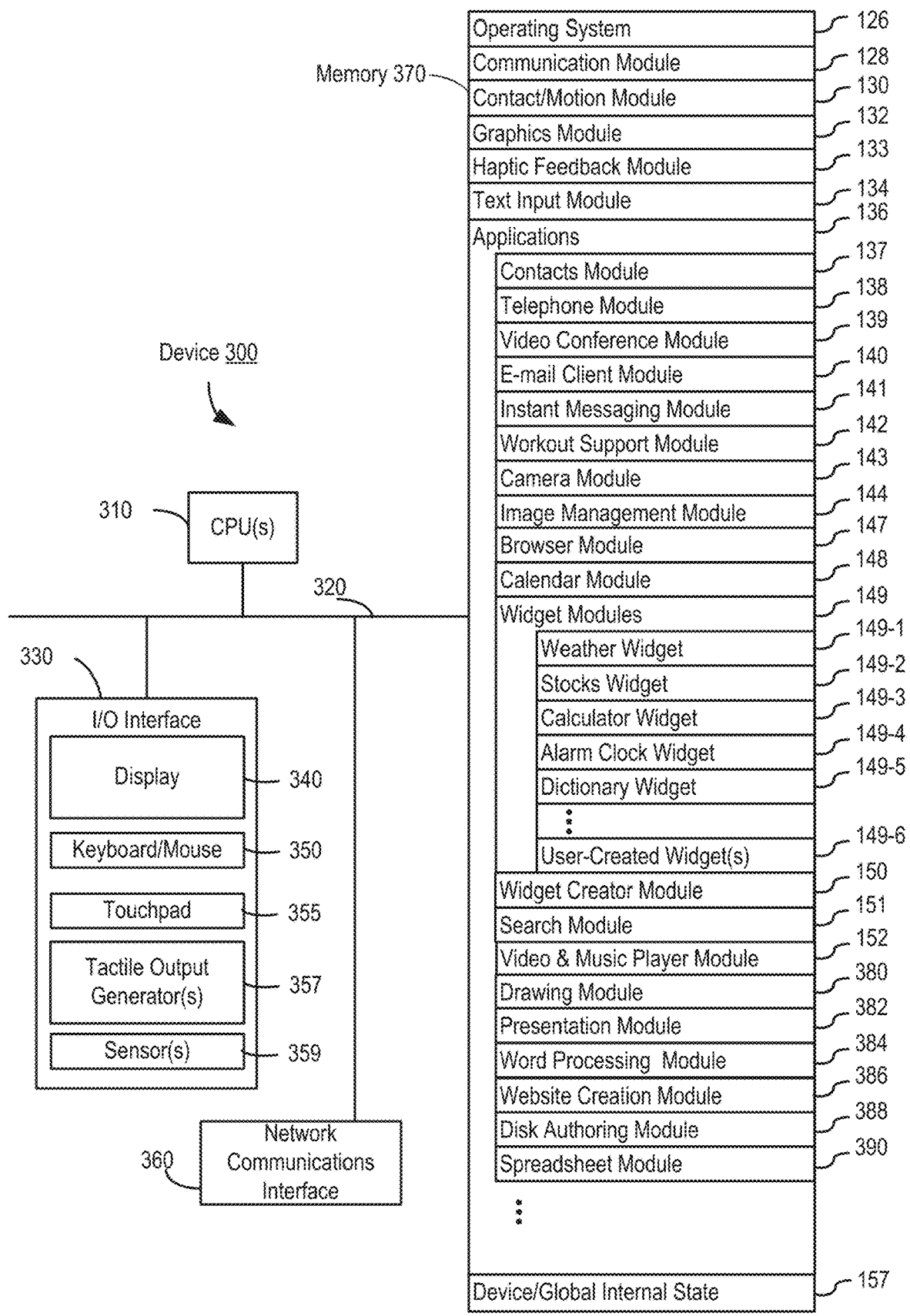
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which optionally can be a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 optionally can include the following modules (or sets of instructions), or a subset or superset thereof:

Contacts module 137 (sometimes called an address book or contact list);
Telephone module 138;
Video conference module 139;
E-mail client module 140;
Instant messaging (IM) module 141;
Workout support module 142;
Camera module 143 for still and/or video images;
Image management module 144;
Video player module;
Music player module;
Browser module 147;
Calendar module 148;
Widget modules 149, which optionally can include one or more of: weather widget 149-1, stocks widget 149-2, calculator widget 149-3, alarm clock widget 149-4, dictionary widget 149-5, and other widgets obtained by the user, as well as user-created widgets 149-6;
Widget creator module 150 for making user-created widgets 149-6;
Search module 151;
Video and music player module 152, which merges video player module and music player module;
Notes module 153;
Map module 154; and/or
Online video module 155.

Examples of other applications 136 that optionally can be stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 optionally can be used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 optionally can be used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally can use any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally can include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that optionally can be downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 optionally can be used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 optionally can be used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules optionally can be combined or otherwise rearranged in various embodiments. For example, video player module optionally can be combined with music player module into a single module (e.g., video and music player module 152, FIG. 1A). In some embodiments, memory 102 optionally can store a subset of the modules and data structures identified above. Furthermore, memory 102 optionally can store additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 optionally can be reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
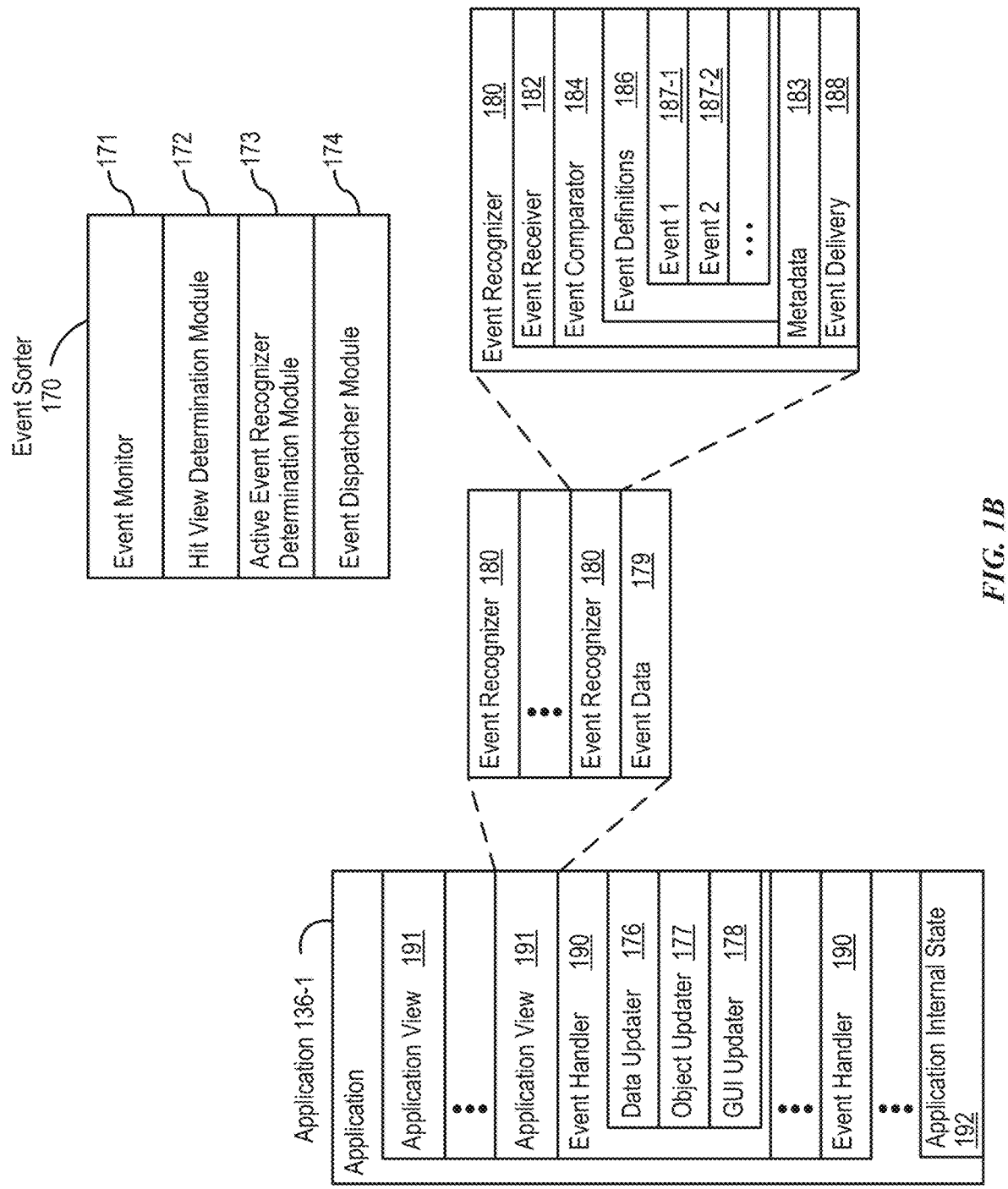
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally can correspond to programmatic levels within a programmatic or view hierarchy of the application. For example, the lowest level view in which a touch is detected optionally can be called the hit view, and the set of events that are recognized as proper inputs optionally can be determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally can utilize or call data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally can include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information also optionally can include speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers optionally can interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
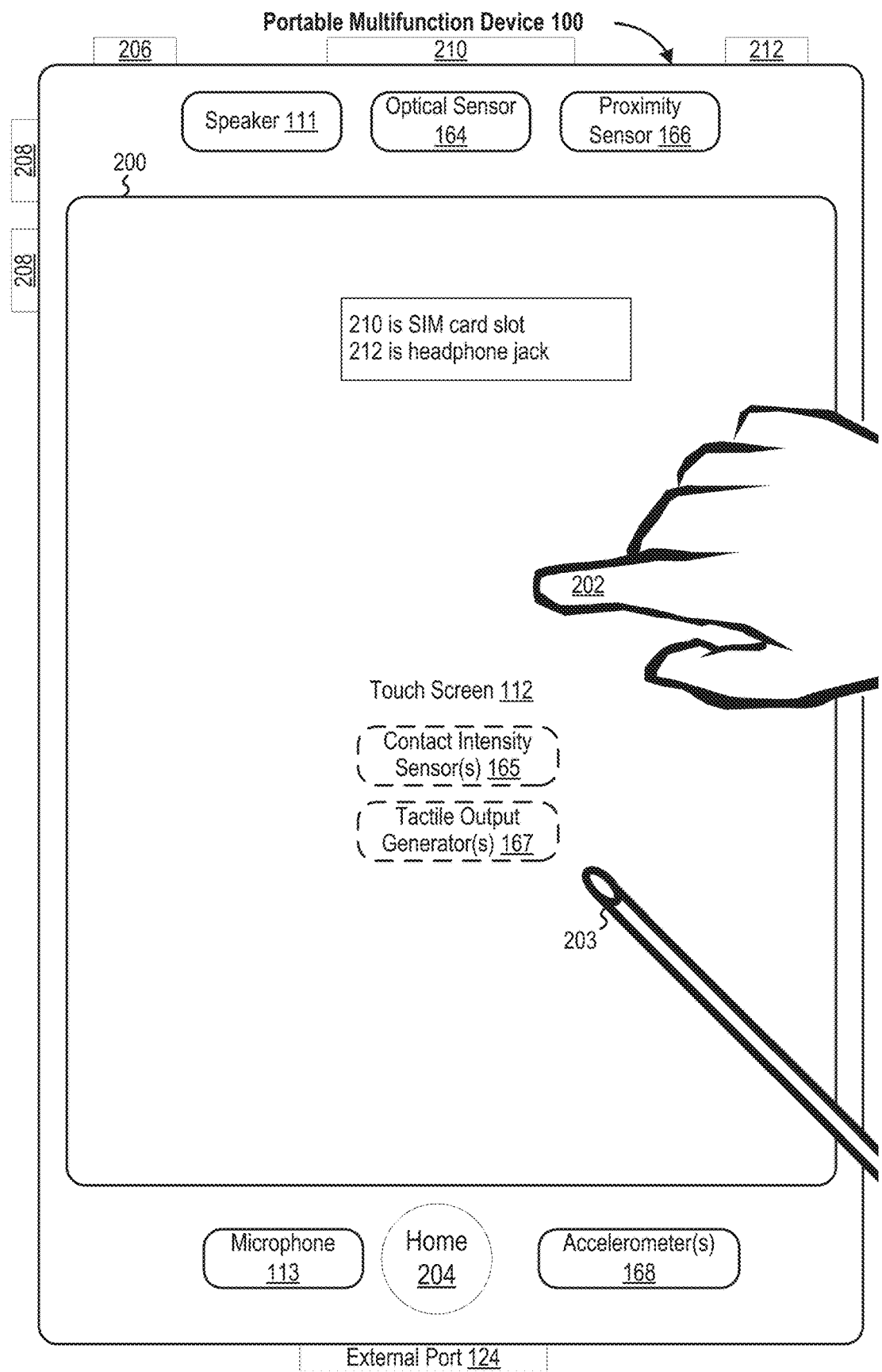
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also can include one or more physical buttons, such as "home" or menu button 204. As described previously, menu button 204 optionally can be used to navigate to any application 136 in a set of applications that optionally can be executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 optionally can be stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules optionally can be combined or otherwise rearranged in various embodiments. In some embodiments, memory 370 optionally can store a subset of the modules and data structures identified above. Furthermore, memory 370 optionally can store additional modules and data structures not described above.

Attention is now directed towards embodiments of user interfaces that optionally can be implemented on, for example, portable multifunction device 100.

Figure 4A:
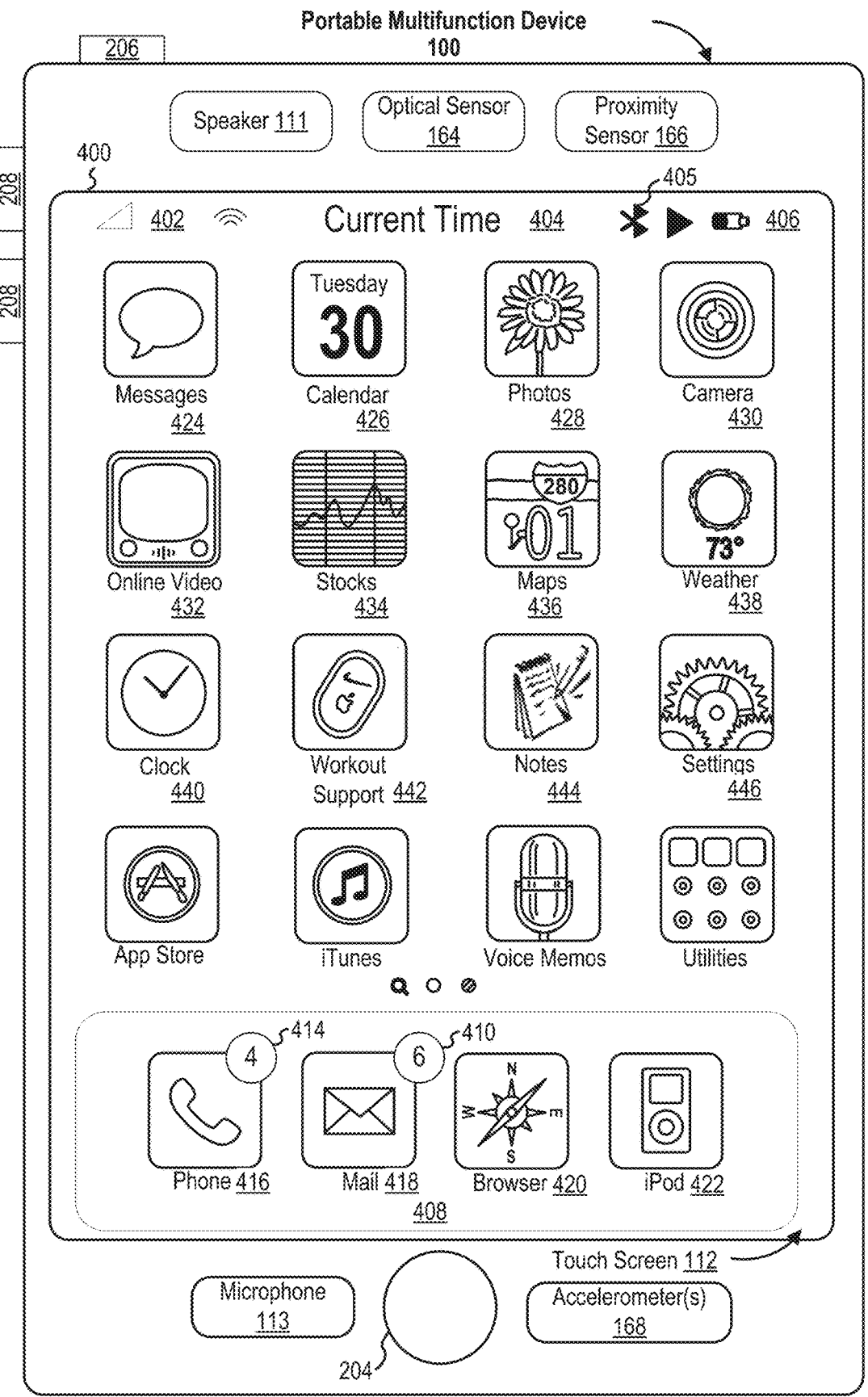
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces optionally can be implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, also referred to as iPod (trademark of Apple Inc.) module 152, labeled "iPod;" and
Icons for other applications, such as:
  Icon 424 for IM module 141, labeled "Messages;"
  Icon 426 for calendar module 148, labeled "Calendar;"
  Icon 428 for image management module 144, labeled "Photos;"
  Icon 430 for camera module 143, labeled "Camera;"
  Icon 432 for online video module 155, labeled "Online Video;"
  Icon 434 for stocks widget 149-2, labeled "Stocks;"
  Icon 436 for map module 154, labeled "Maps;"
  Icon 438 for weather widget 149-1, labeled "Weather;"
  Icon 440 for alarm clock widget 149-4, labeled "Clock;"
  Icon 442 for workout support module 142, labeled "Workout Support;"
  Icon 444 for notes module 153, labeled "Notes;" and
  Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 optionally can be labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
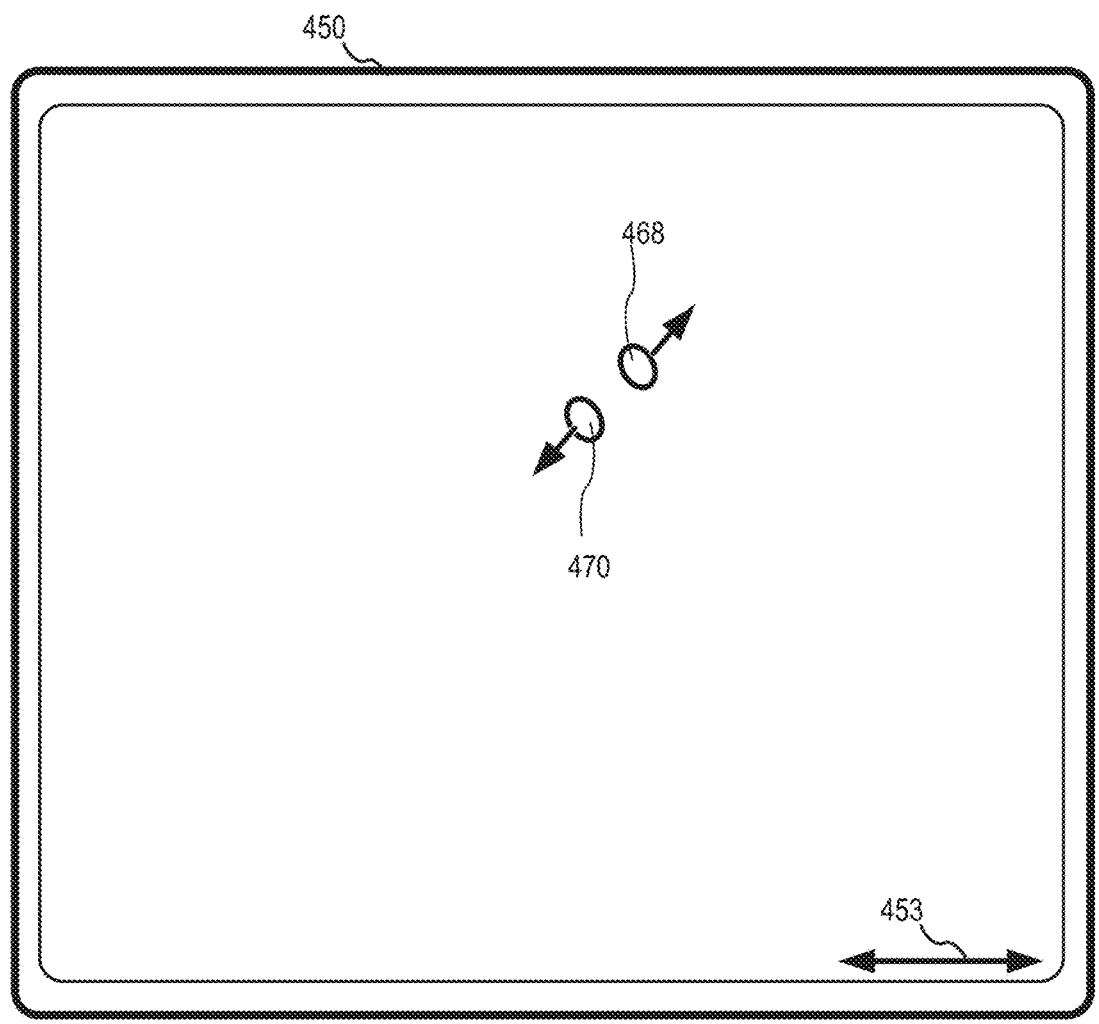
FIG. 4B illustrates an exemplary user interface for a multifunction device with a touch-sensitive surface that is separate from the display in accordance with some embodiments.
Figure 4B:
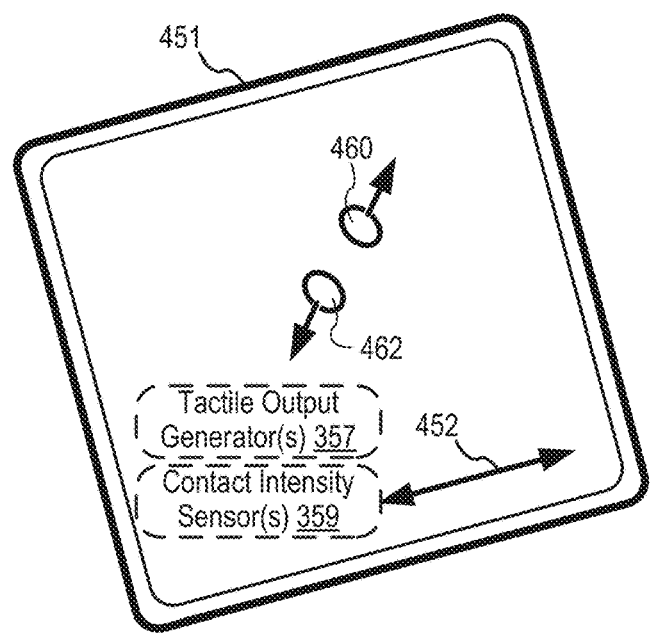

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 357) for detecting intensity of contacts on touch-sensitive surface 451 and/or one or more tactile output generators 359 for generating tactile outputs for a user of device 300.

Although some of the examples which follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
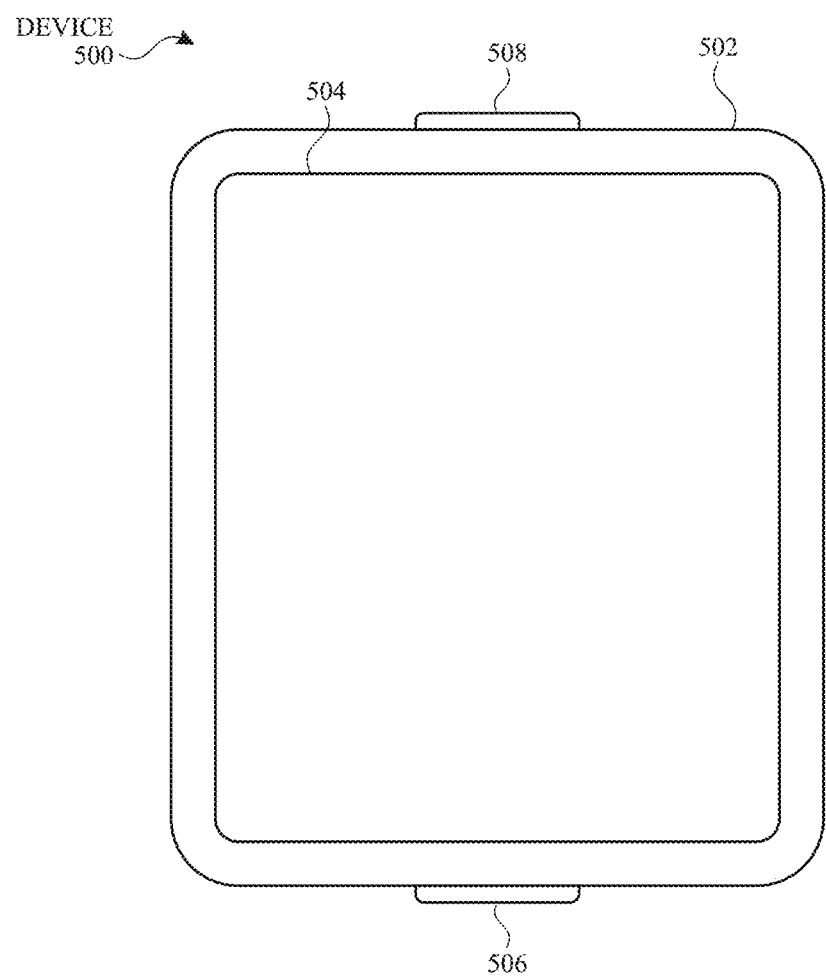
FIG. 5A illustrates a personal electronic device in accordance with some embodiments.
Figure 6A:
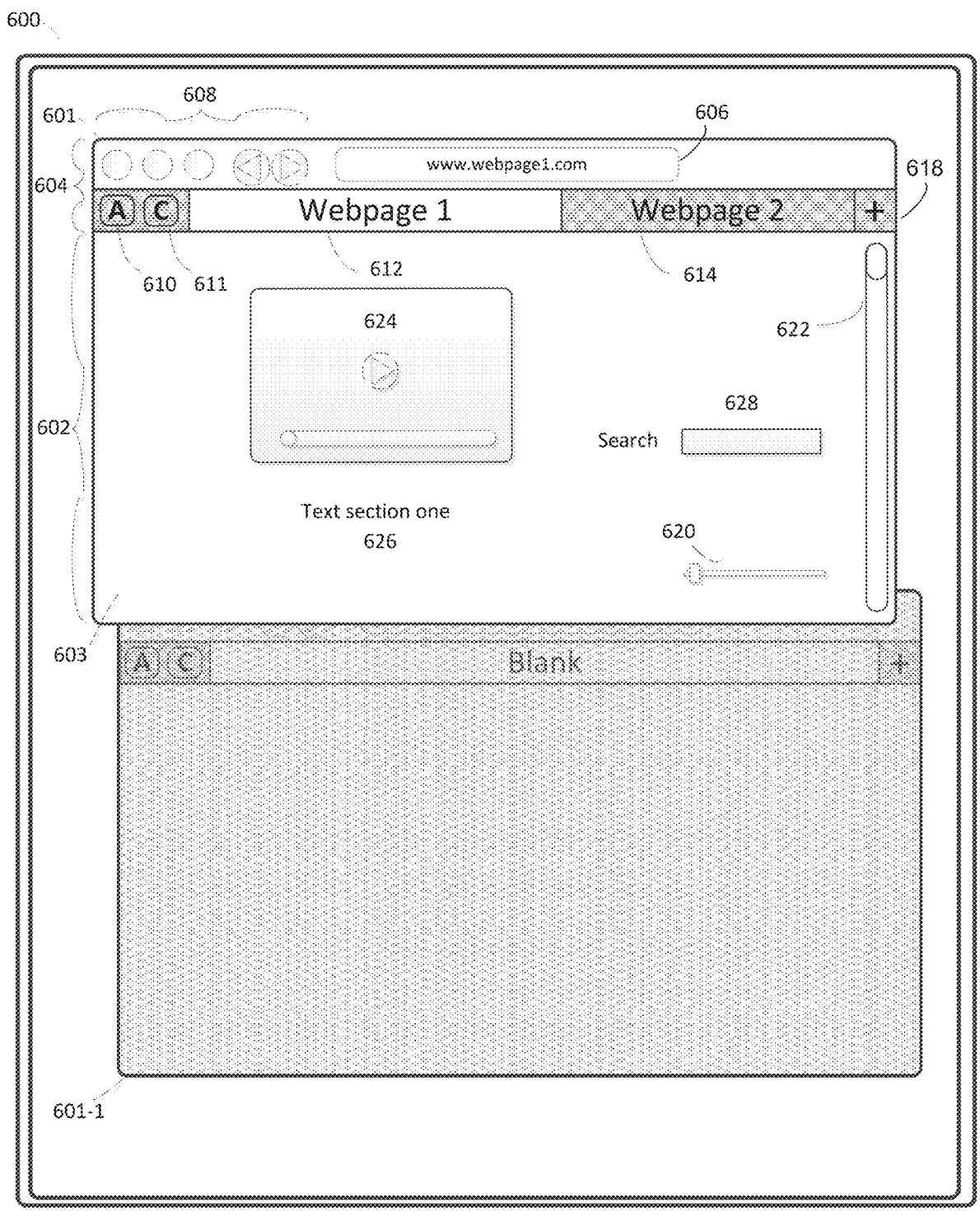
FIGS. 6A-6ZZZZ illustrate exemplary user interfaces for a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally can have one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Techniques for detecting and processing touch intensity optionally can be found, for example, in related applications: International Patent Application Serial No. PCT/US2013/040061, titled "Device, Method, and Graphical User Interface for Displaying User Interface Objects Corresponding to an Application," filed May 8, 2013, and International Patent Application Serial No. PCT/US2013/069483, titled "Device, Method, and Graphical User Interface for Transitioning Between Touch Input to Display Output Relationships," filed Nov. 11, 2013, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms optionally can permit device 500 to be worn by a user.

Figure 5B:
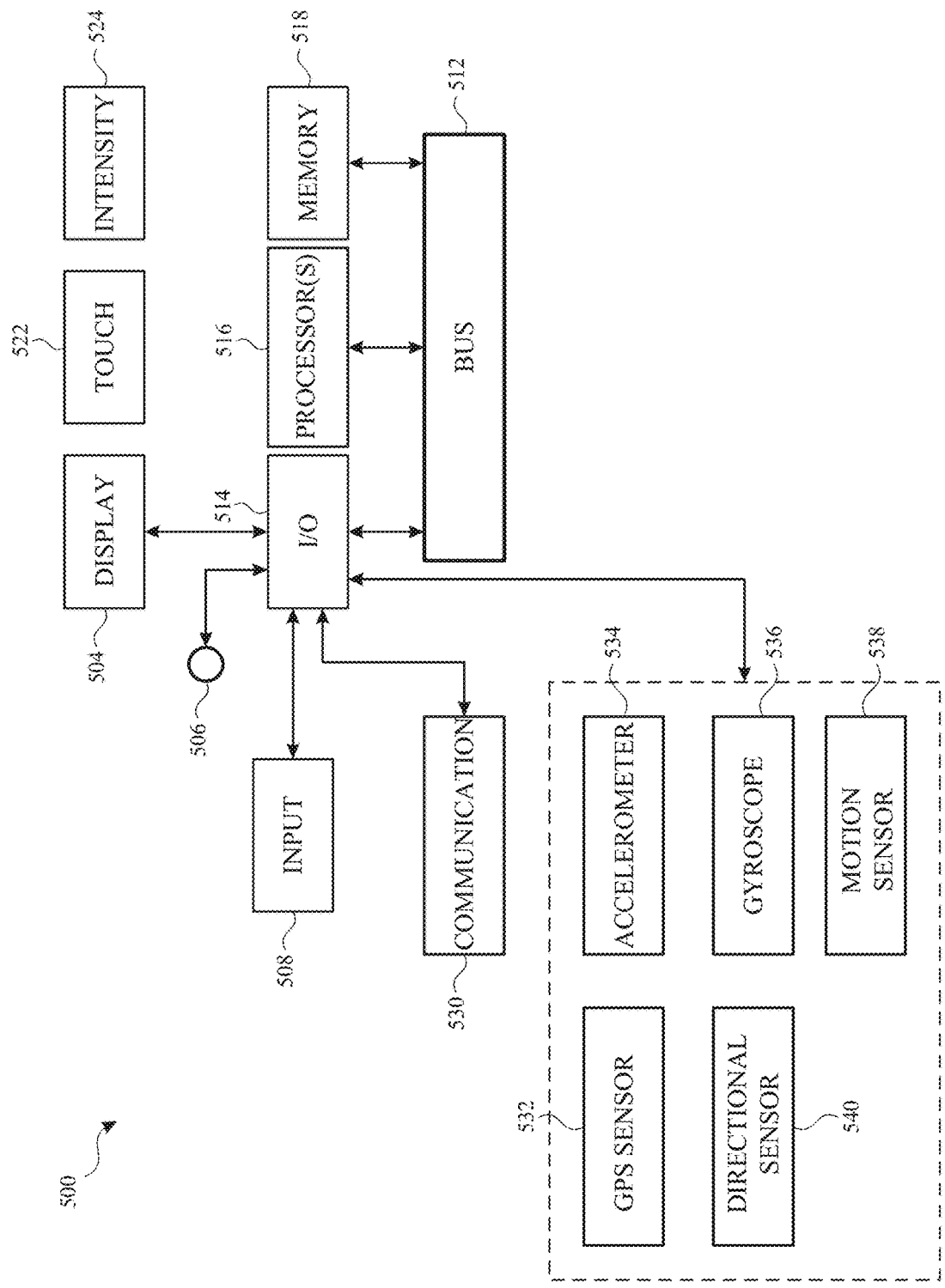
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, touch-intensity sensitive component 524. In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 optionally can be a rotatable input device or a depressible and rotatable input device, for example. Input mechanism 508 optionally can be a button, in some examples.

Input mechanism 508 optionally can be a microphone, in some examples. Personal electronic device 500 can include various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can be a non-transitory computer-readable storage medium, for storing computer-executable instructions, which, when executed by one or more computer processors 516, for example, can cause the computer processors to perform the techniques described above, including process 700 (FIGS. 7A-7F). The computer-executable instructions can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. For purposes of this document, a "non-transitory computer-readable storage medium" can be any medium that can tangibly contain or store computer-executable instructions for use by or in connection with the instruction execution system, apparatus, or device. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that optionally can be displayed on the display screen of devices 100, 300, and/or 500 (FIGS. 1, 3, and 5). For example, an image (e.g., icon), a button, and text (e.g., hyperlink) each optionally can constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally can include a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation) rather than being used to determine whether to perform a first operation or a second operation.

In some embodiments, a portion of a gesture is identified for purposes of determining a characteristic intensity. For example, a touch-sensitive surface optionally can receive a continuous swipe contact transitioning from a start location and reaching an end location, at which point the intensity of the contact increases. In this example, the characteristic intensity of the contact at the end location optionally can be based on only a portion of the continuous swipe contact, and not the entire swipe contact (e.g., only the portion of the swipe contact at the end location). In some embodiments, a smoothing algorithm optionally can be applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface optionally can be characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

As used herein, an "installed application" refers to a software application that has been downloaded onto an electronic device (e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the term "open application" or "executing application" refers to a software application with retained state information (e.g., as part of device/global internal state 157 and/or application internal state 192). An open or executing application optionally can be any one of the following types of applications:

an active application, which is currently displayed on a display screen of the device that the application is being used on;

a background application (or background processes), which is not currently displayed, but one or more processes for the application are being processed by one or more processors; and a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

Attention is now directed towards embodiments of user interfaces ("UI") and associated processes that optionally can be implemented on an electronic device, such as portable multifunction device 100, device 300, or device 500.

FIGS. 6A-6ZZZZ illustrate exemplary techniques and exemplary user interfaces for viewing, interacting with, and managing webpages in tabs of a web browser, in accordance with some embodiments. In some embodiments, a webpage is associated with a docked tab (e.g., a persistent tab or a pinned tab), thereby affecting the presentation state of the webpage, when it is opened in a different tab, as discussed in more detail below. In some embodiments, a docked tab is a tab that is displayed in a new browser window when that window is created, and has a persistent state across different browser windows when they are open concurrently. Adding a new docked tab to one browser window will, in some embodiments, add the same docked tab to other browser windows that are concurrently open. Removing a docked tab from one browser window will, in some embodiments, remove the same docked tab from other browser windows that are concurrently open. Changing a state of the docked tab in one browser window (e.g., navigating to different pages within a website associated with the docked tab, scrolling, entering text, playing content or otherwise interacting with the webpage) will, in some embodiments, also change the state of the docked tab in other browser windows.

Referring to FIG. 6A, electronic device 600, displaying a browser interface 601, is illustrated in accordance with some embodiments. Browser interface 601 is an interface of a browser application (e.g., Safari released by Apple Inc. of Cupertino, Calif.) for retrieving, rendering, presenting, and/or traversing information resources (e.g., webpage content) on the World Wide Web. Browser interface 601 is displayed on a display (not shown) such as display 112 (device 100, FIG. 1), 340 (device 300, FIG. 3), and/or 504 (device 500, FIG. 5). In some embodiments, browser interface 601 allows a user to control the presentation of content associated with one or more webpages displayed in respective tabs.

Browser interface 601 includes a first portion 602 and a second portion 604 distinct from the first portion 602. First portion 602 is configured to display content of webpages opened in tabs of the browser interface. In some embodiments, the first portion 602 includes a body of the webpages without one or more control affordances. Second portion 604 includes one or more control affordances and is sometimes referred to as the "chrome" of the browser. For example, second portion 604 includes one or more control affordances 608, address bar 606, and/or a tab bar 618.

In a non-limiting example, the one or more control affordances 608 include one or more of an exit affordance, a previous webpage affordance, and/or a forward webpage affordance. The address bar 606 includes a current uniform resource locator (URL) and accepts an entered URL that navigates the user to a chosen webpage in browser interface 601. That is, the address bar 606 includes a web address entry region of the browser interface 601. In some embodiments the web address entry region is also configured to receive search queries and display bookmarks. Further, the tab bar 618 includes a first docked tab 610, a second docked tab 611, a first standard tab 612, and a second standard tab 614. In FIG. 6A, standard tab 612 is the foreground tab (denoted by the lighter status of the tab 612), currently associated with second portion 602, and docked tab 610, docked tab 611, and standard tab 614 are background tabs (denoted by the shaded status of tabs 610, 611, and 614) not currently associated with second portion 602. Although shown as including four tabbed windows, it should be understood that browser interface 601 optionally includes any number of tabbed windows.

In some embodiments (e.g., as in FIG. 6A), docked tabs (e.g., 610 and 611) are displayed in a predetermined position (e.g., to the left of) standard tabs. Also as seen in FIG. 6A, docked tabs optionally can be displayed in a distinctive manner, in comparison to standard tabs, in order to facilitate ease of use and in order to keep them centrally located in an easy-to-find area. For example, referring to FIG. 6A, tab 612 and tab 614 are standard tabs that behave in a conventional manner (e.g., in a non-persistent manner or manner different than that of a docked tab). In some embodiments, docked tabs optionally can be located elsewhere in the browser interface 601. In some embodiments, docked tabs are present in a discrete and fixed area (e.g., a reserved or docked tab area) of a browser interface. In some embodiments, the location of the docked tabs and/or the docked tab area optionally can be user-adjustable.

As shown in FIG. 6A, browser interface 601 also includes a zoom controller 620 for controlling the size of content presented in first area 602 and a scroll controller 622 for controlling the scroll position of content presented in first area 602. An exemplary webpage 603 is open in foreground standard tab 612. Webpage 603 includes a video section 624, a text section one 626, and a search field 628.

As shown, the state of webpage 603 is based on the mark-up language associated with the webpage and the settings of browser interface 601. That is, webpage 603 is presented in a "default" state, as seen when a webpage is initially opened by browser interface 601. For example, in the default state, the progress bar of video section 624 is in a starting position and the video remains unplayed. Similarly, search field 628 is empty.

Figure 6B:
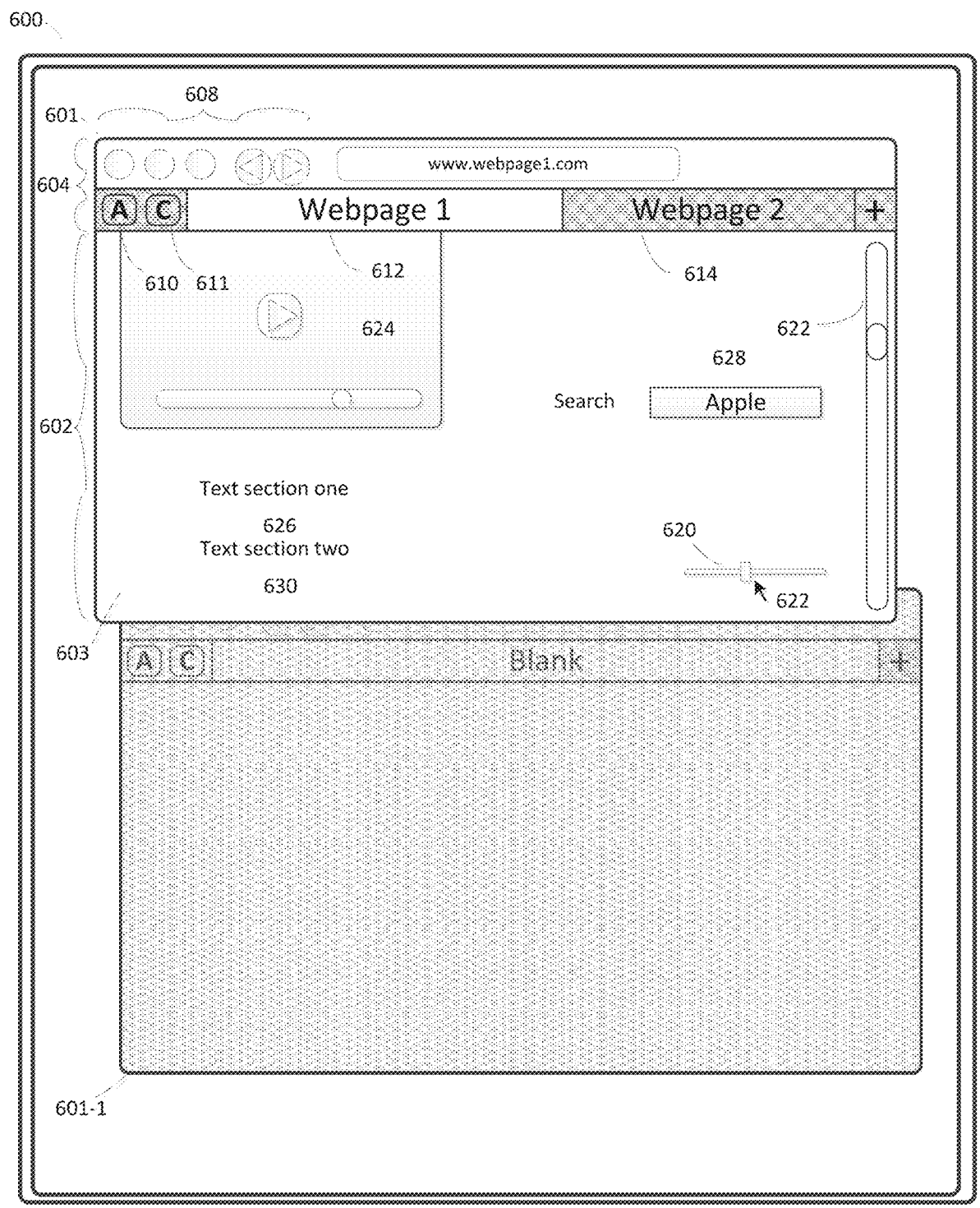
FIG. 6O is intentionally omitted to avoid any confusion between the capital letter O and the numeral 0 (zero).

While webpage 603 (here, Webpage 1) is open in foreground tab 612 of browser interface 601, electronic device 600 receives one or more inputs (e.g., mouse, keyboard, or touch inputs such as mouse input 622 on zoom controller 622 in FIG. 6B) corresponding to webpage 603. In response to receiving the one or more inputs, electronic device 600 changes the state of webpage 603 in the first tab (e.g., standard tab 612). As seen in FIG. 6B, the changes in state include: the content of webpage 603 being enlarged (reflected in the position of zoom controller 620 and the size of the displayed elements), the position of webpage 603 being changed (reflected in position of scroll controller 622 and the appearance of text section two 630), the content of video section 624 having been played (reflected in the progress bar), and text ("Apple") having been entered in search field 628. Thus, as seen in FIG. 6B, the state of webpage 603 in standard tab 612 has been changed in response to user input. Also as seen in FIG. 6B (and FIG. 6A) device 600 also displays a second browser interface 601-1 that is inactive (denoted by the shaded status).

Figure 6C:
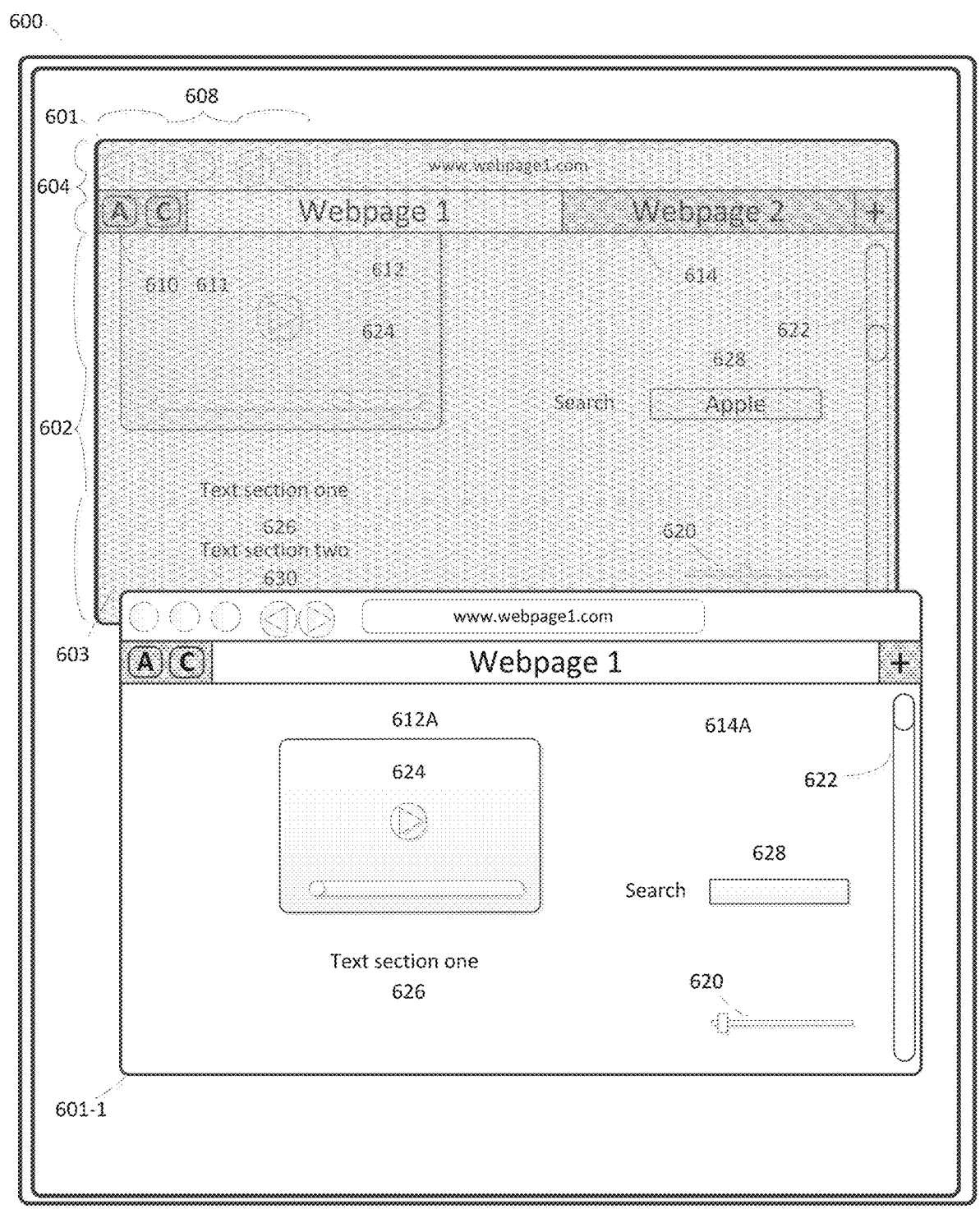
Figure 6A:
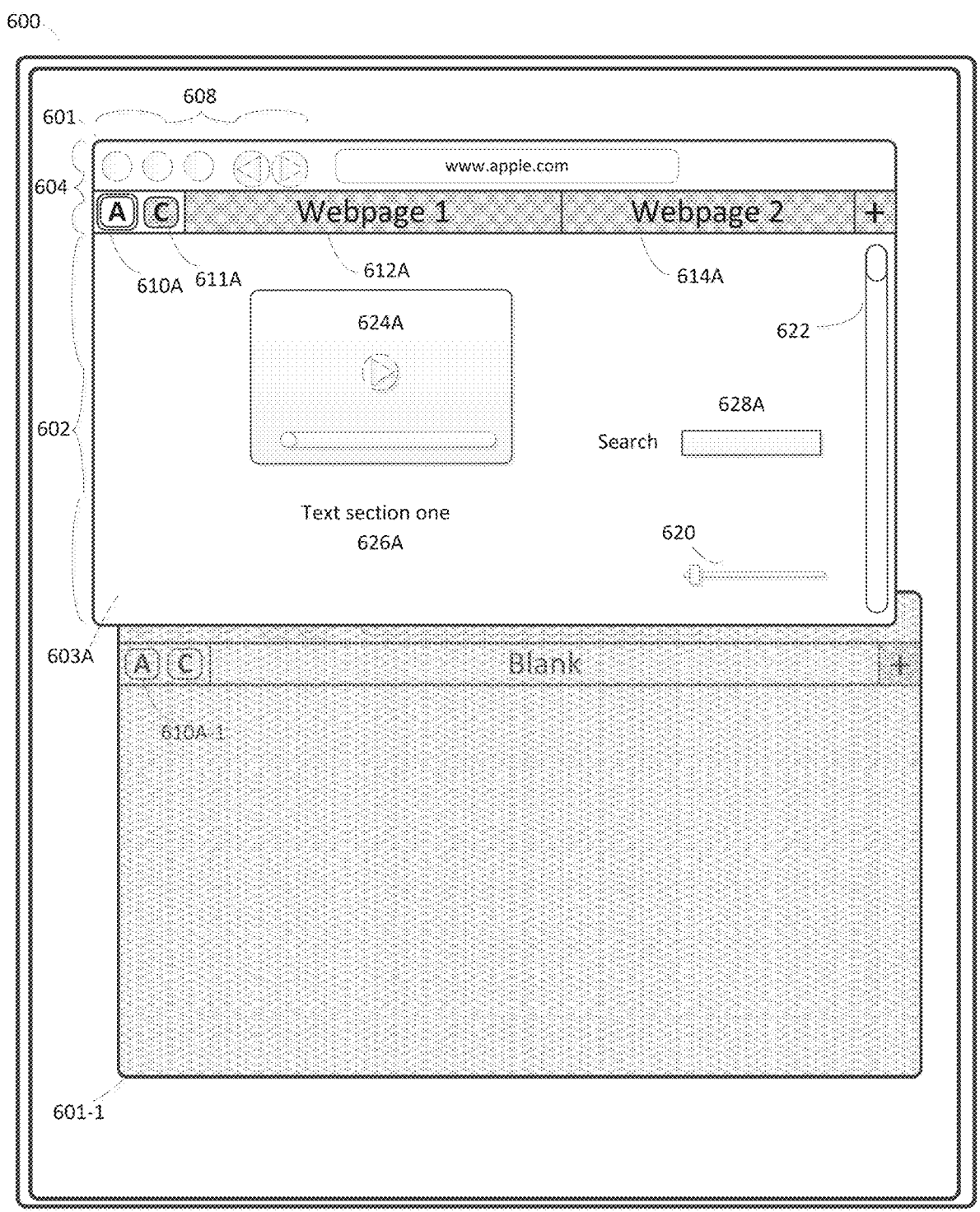
Figure 6B:
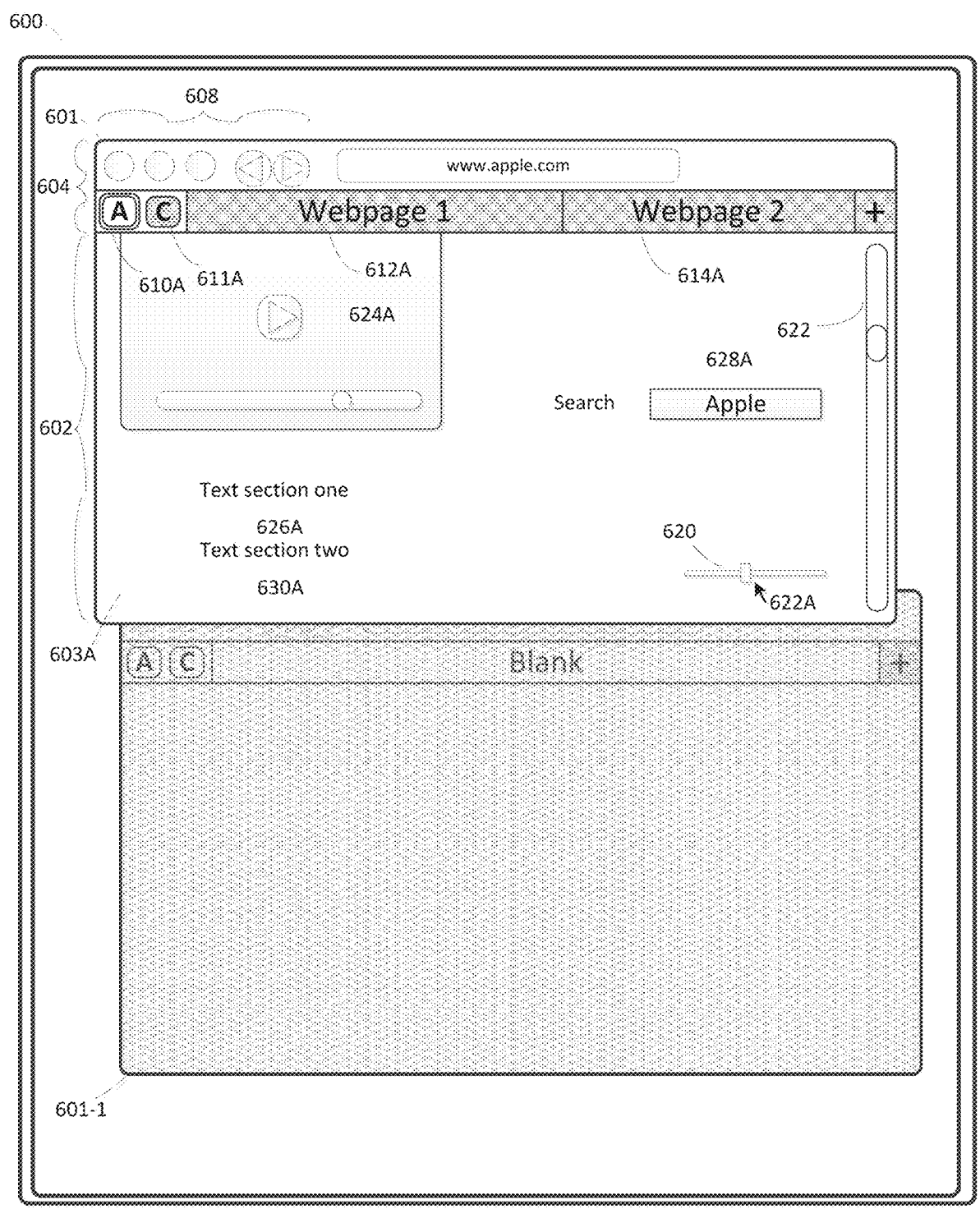
Figure 6C:
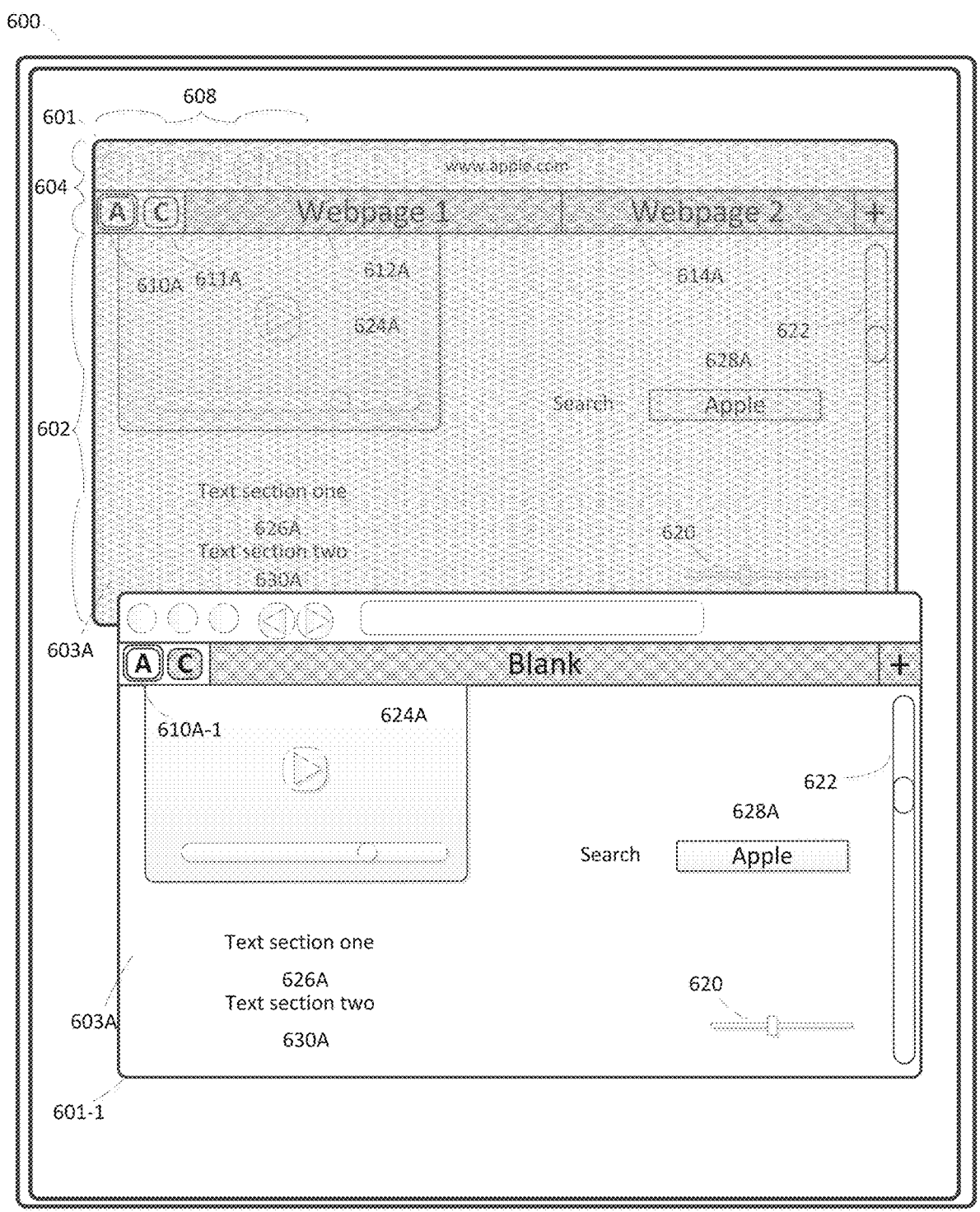

After changing the state of the webpage in tab 612 (e.g., a first tab) (and optionally, after ceasing to display the first tab or while the webpage in the first tab maintains the changed state), electronic device 600 receives a request (e.g., mouse, keyboard, or touch inputs) to open the webpage in a second tab that is different from the first tab. As seen in FIG. 6C, electronic device 600 receives a request to activate second browser interface 601-1 and, in response makes it the active window (denoted by the lighter status of interface 601-1) and transitions browser interface 601 to inactive status (denoted by the shaded status of interface 601). Also as seen in FIG. 6C, electronic device 600 has received a request to open the same webpage (e.g., www.webpage1.com) in foreground standard tab 612-1 of browser interface 601-1. Thus, as seen in FIG. 6C, webpage 603 is open in both standard tab 612 and standard tab 612-1. In accordance with a determination that the webpage is associated with a standard tab (e.g., standard tab 612-1) and that the first tab (e.g., standard tab 612) is not a docked tab, the electronic device (e.g., 600) presents the webpage (e.g., webpage 603) in the second tab (e.g., standard tab 612-1) with a state different (e.g., the webpage is presented without any stored state) from the state of the webpage in the first tab (e.g., standard tab 612). That is, the browser interface 601-1 has simply loaded webpage 603 according to the mark-up language associated with the URL, without reference to the state of the webpage in standard tab 612 of browser interface 612. Accordingly, webpage 603 is opened and presented in tab 612 of browser interface 601-1 with a state different than the changed state of webpage 603 presented in tab 612 of browser interface 601 seen in FIG. 6B. As seen in FIG. 6C, webpage 603 is opened with a default state matching the default state of FIG. 6A.

Turning to FIG. 6AA, electronic device 600 displays, in browser interface 601, a webpage 603A (e.g., www.apple.com) associated with docked tab 610A. Exemplary webpage 603A includes a video section 624A, a text section one 626A, and a search field 628A. As shown, the state of webpage 603A is based on the mark-up language associated with the webpage and the settings of browser interface 601. That is, webpage 603A is presented in a "default" state, as seen when a webpage is initially opened by browser interface 601. For example, in the default state, the progress bar of video section 624A is in a starting position and the video remains unplayed. Similarly, search field 628A is empty.

While webpage 603A is open in foreground docked tab 610A of browser interface 601, electronic device 600 receives one or more inputs (e.g., mouse, keyboard, or touch inputs such as mouse input 622 on zoom controller 622A in FIG. 6BB) corresponding to webpage 603A. In response to receiving the one or more inputs, electronic device 600 changes the state of webpage 603A in the first tab (docked tab 610A). As seen in FIG. 6BB, the changes in state include: the content of webpage 603 being enlarged (reflected in the position of zoom controller 620 and the size of the displayed elements), the position of webpage 603A being changed (reflected in position of scroll controller 622 and the appearance of text section two 630A), the content of video section 624A having been played (reflected in the progress bar), and text ("Apple") having been entered in search field 628A. Thus, as seen in FIG. 6BB, the state of webpage 603A in docked tab 610A has been changed in response to user input. Also as seen in FIG. 6BB (and FIG. 6AA) device 600 also displays a second browser interface 601-1 that is inactive (denoted by the shaded status).

After changing the state of the webpage in tab 610A (e.g., a first tab) (and optionally, after ceasing to display the first tab or while the webpage in the first tab maintains the changed state), electronic device 600 receives a request (e.g., mouse, keyboard, or touch inputs) to open the webpage in a second tab that is different from the first tab. As seen in FIG. 6CC, electronic device 600 receives a request to activate second browser interface 601-1 and, in response makes it the active window (denoted by the lighter status of interface 601-1) and transitions browser interface 601 to inactive status (denoted by the shaded status of interface 601). Also as seen in FIG. 6CC, electronic device 600 has received a request to open the same webpage (603A; e.g., www.apple.com) in foreground docked tab 610A-1 of browser interface 601-1. Thus, as seen in FIG. 6CC, webpage 603A is open in both docked tab 610A and docked tab 610A-1. In accordance with a determination that the webpage is associated with a docked tab (e.g., docked tab 610A-1) and that the first tab (e.g., docked tab 610A) is a docked tab, the electronic device (e.g., 600) presents the webpage (e.g., webpage 603A) in the second tab (e.g., docked tab 610A-1) with the state of the webpage in the first tab (e.g., docked tab 610A). That is, electronic device 600 has determined that webpage 603A is associated with a docked tab (e.g., 610A-1) and that the first tab (e.g., 610A) is a docked tab. Accordingly, webpage 603A is opened and presented with the (changed) state of webpage 603A seen in FIG. 6BB: the content of webpage 603 being enlarged (reflected in the position of zoom controller 620 and the size of the displayed elements), the position of webpage 603A being changed (reflected in position of scroll controller 622 and the appearance of text section two 630A), the content of video section 624A having been played (reflected in the progress bar), and text ("Apple") having been entered in search field 628A. Thus, in some embodiments, the state of a webpage associated with a docked tab persists (e.g., does not revert to a default state) as the webpage is opened in subsequent tabs.

In some embodiments, the state of the webpage (e.g., 603) is selected from one or more of page position state, zoom level state, entered text state, sub-domain state (e.g., navigating from www.apple.com to www.apple.com/iphone), and media playback state. In some embodiments, the state of the webpage is any state that can be controlled using a web browser.

Figure 6D:
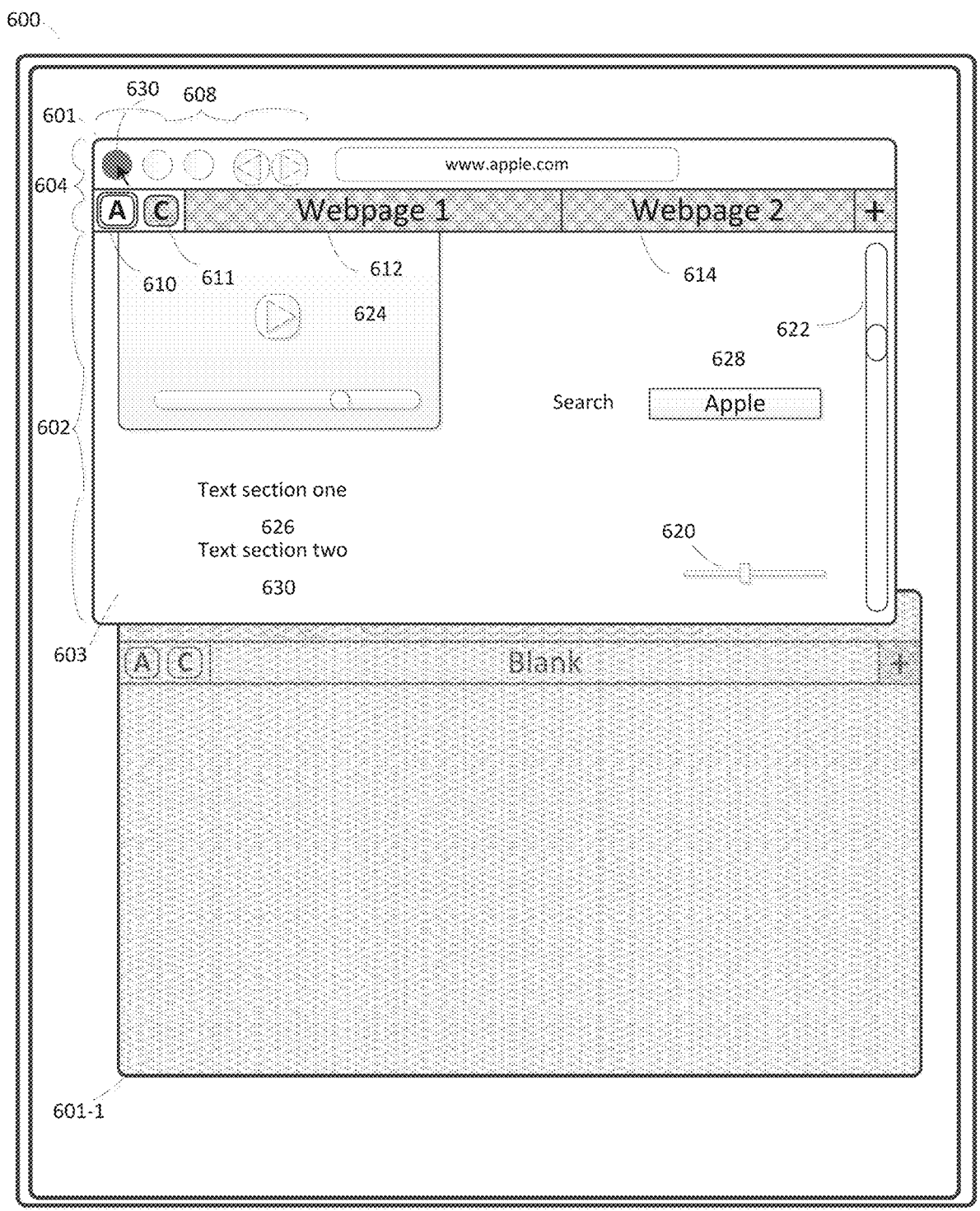

Turning to FIG. 6D, electronic device 600 displays webpage 603 (www.apple.com) in docked tab 610. Electronic device 600 receives a request to close webpage 603 (shown as input 630 on a close affordance of the one or more affordances 608). In response to receiving the request to close webpage 603 in tab 610, electronic device 600 determines whether the request to close the webpage in tab 610 is concurrent with a termination of the browser application generating browser interface 601. In accordance with a determination that the request to close webpage 603 in docked tab 610 is not concurrent with a termination of the browser application (e.g., the browser application remains a background application or a suspended application), electronic device 600 stores the state information associated with the webpage. As seen in FIG. 6D, a second browser interface 601-1 of the browser application is open, and will remain open, even after browser interface 601 is closed. Accordingly, the request to close browser interface 601 is not concurrent with a termination of the browser application and electronic device 600 stores the state information associated with webpage 603 associated with docked tab 610. In some embodiments, after storing the state information associated with the webpage (e.g., in response to closing webpage but not terminating the browser application), electronic device 600 receives a request to open the webpage in a third tab (e.g., a tab of a different instance of browser interface 601). In response to the request to open the webpage in the third tab, electronic device 600 presents the webpage in the third tab with the stored state information associated with the webpage.

Figure 6E:
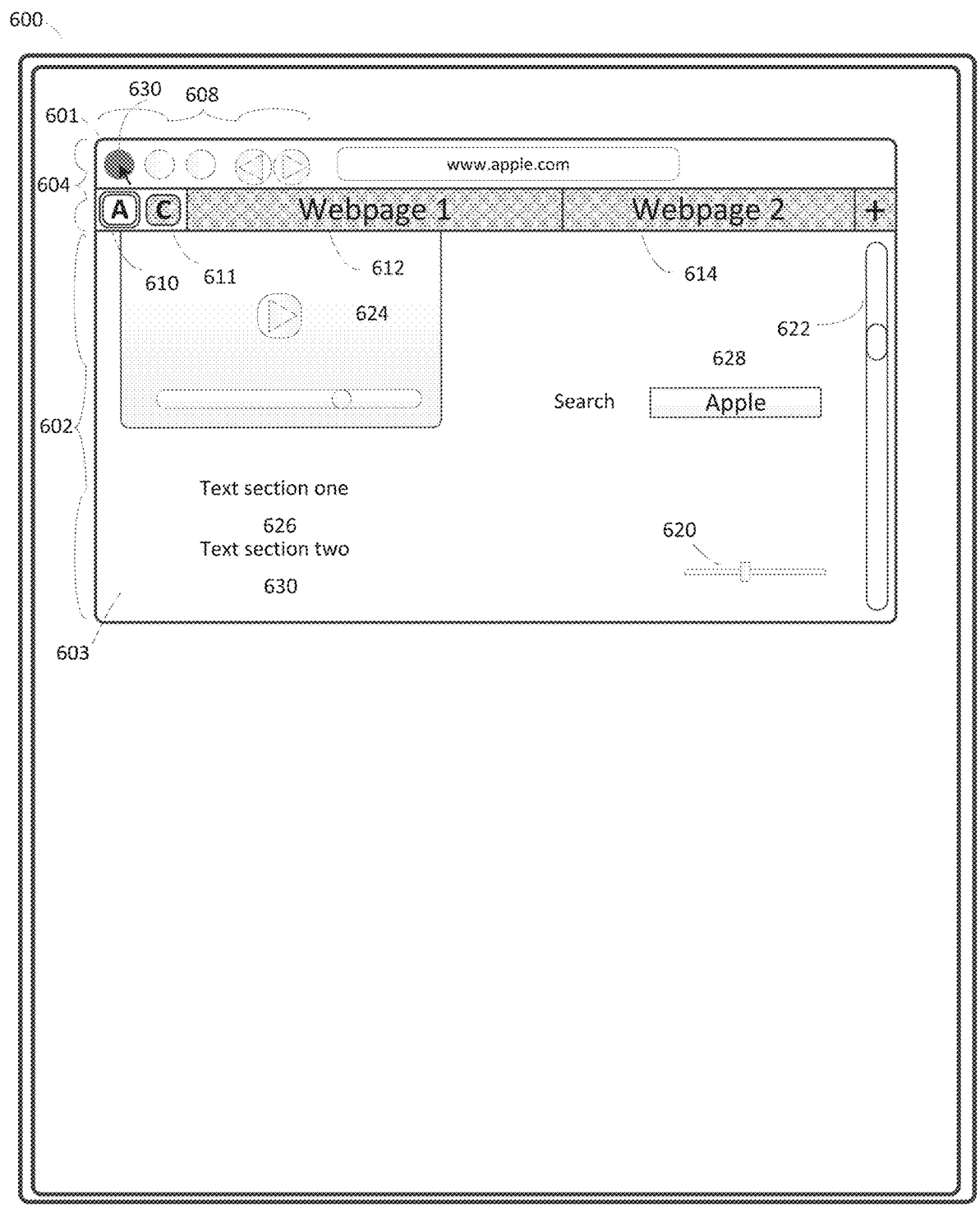

Turning to FIG. 6E, electronic device 600 receives a request (shown as input 630 on a close affordance of the one or more affordances 608) to close webpage 603 open in, and associated with, docked tab 610. In contrast to FIG. 6D, a second browser interface 601-1 is not displayed on electronic device 600. In the example of FIG. 6E, closing the final instance of browser interface of a browser application results in termination of the browser application. In accordance with a determination that the request to close webpage 603 in docked tab 610 is concurrent with a termination of the browser application, electronic device 600 does not store the state information associated with the webpage (e.g., 603). In some embodiments, when webpage 603 (e.g., a webpage associated with a docked tab) is subsequently opened once the browser application is re-initiated, it is opened in a default state because state information was not stored.

In some embodiments, when a docked tab is displayed, the user may attempt to open in a second tab, such as a standard tab, a webpage that is in the same domain as (or in the subdomain of) a domain associated with a docked tab. If so, the browser application will open the docked tab and optionally close the second tab, such that two tabs will not be open in the browser at once where both are in the same domain as (or in the subdomain of) a domain associated with a docked tab. In some embodiments, the first tab is in a first window of the browser application, and the second tab is in the same browser window as the first tab.

Figure 6F:
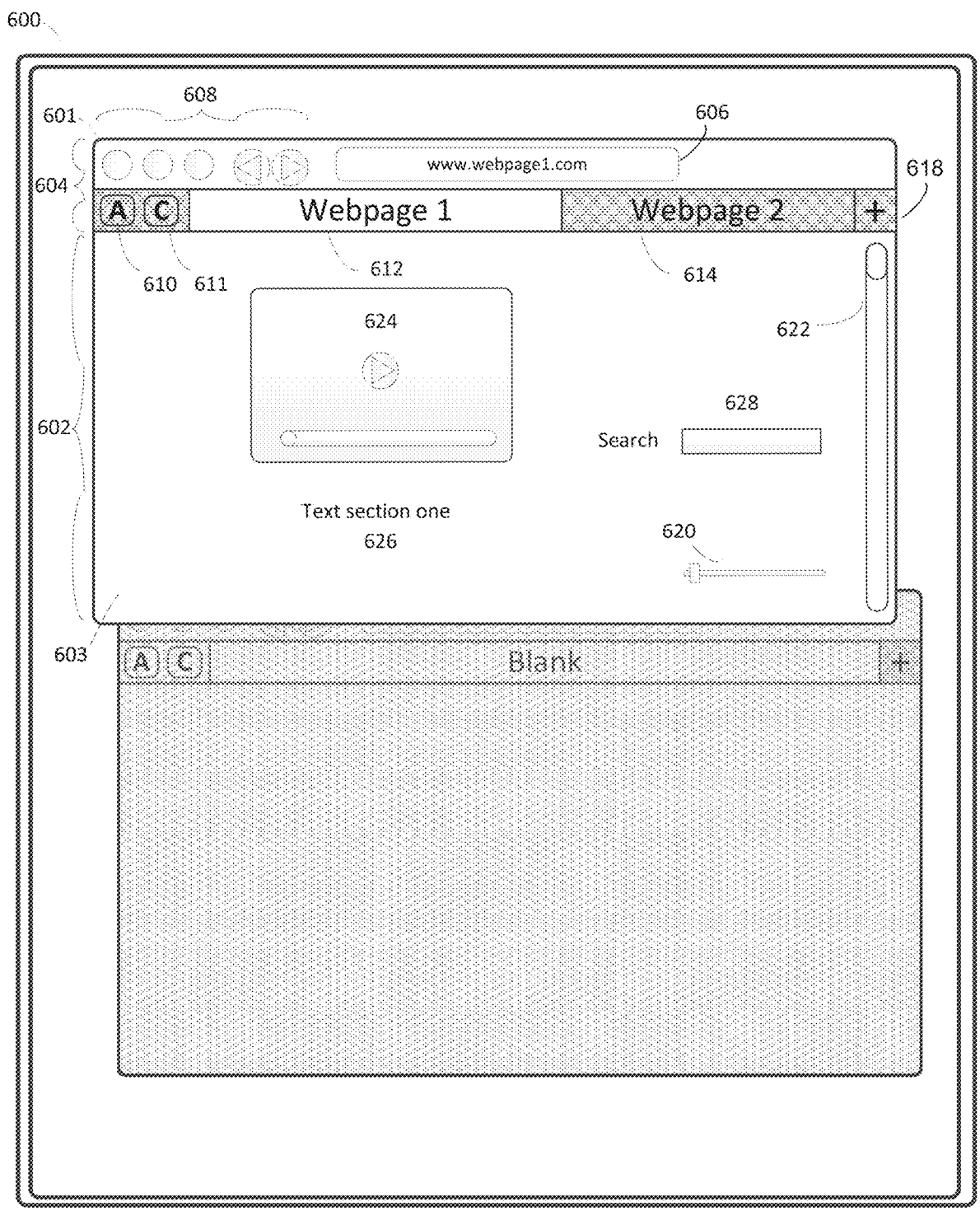
Figure 6G:
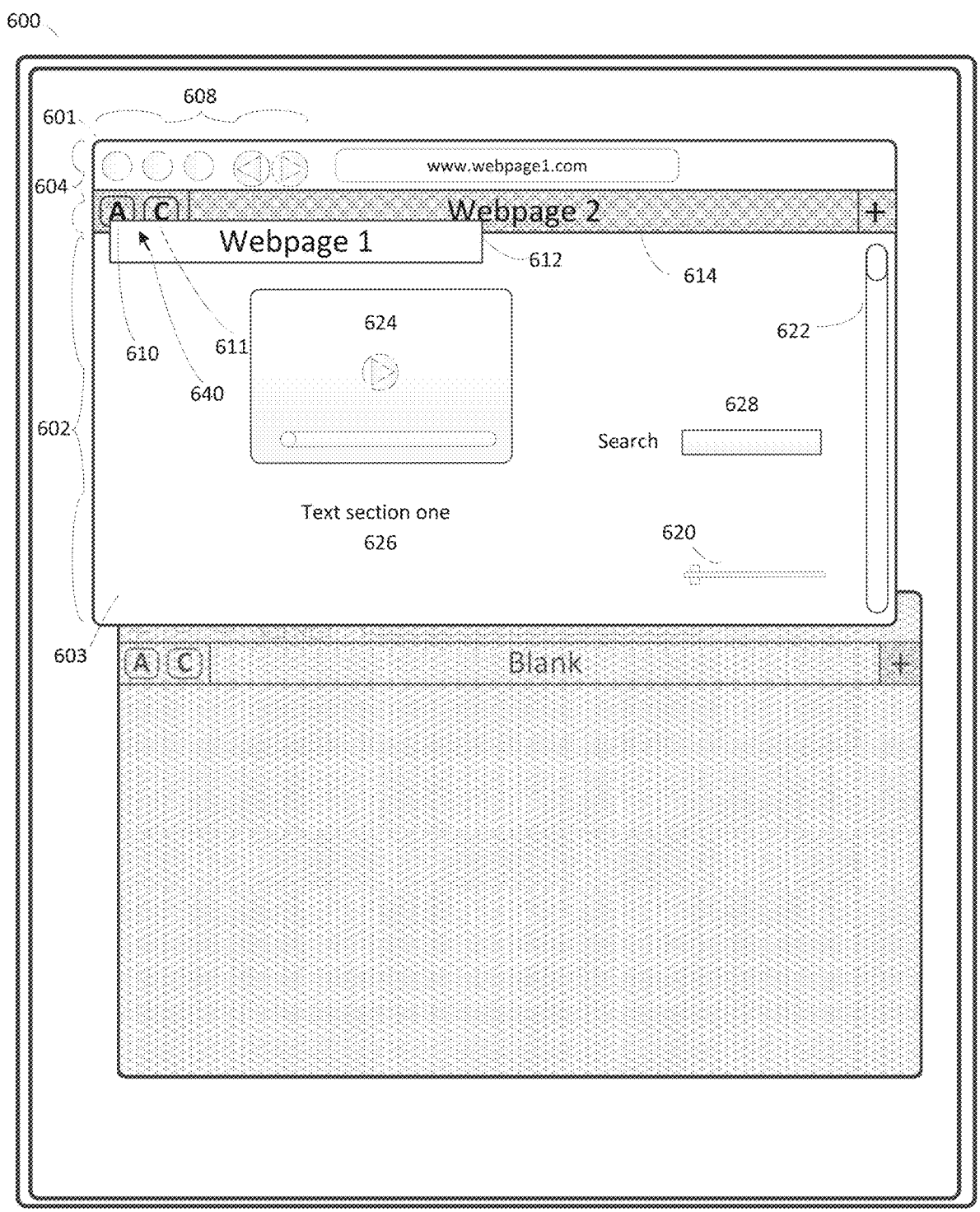
Figure 6H:
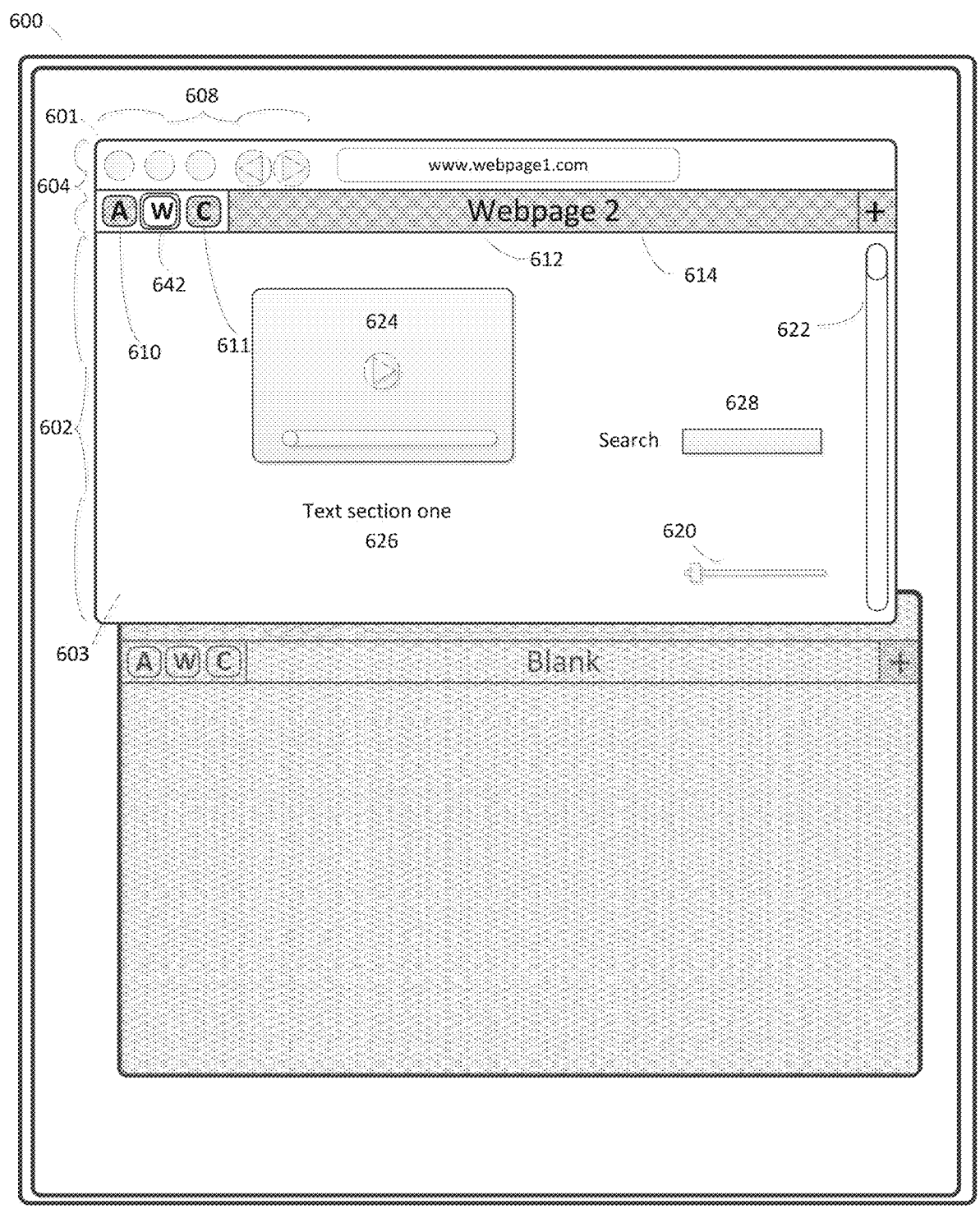

In some embodiments, a standard tab optionally can be converted to a docked tab. Turning to FIG. 6F, webpage 603 is displayed in standard tab 612 on electronic device 600. At FIG. 6G, electronic device 600 detects an input (e.g., a press and hold gesture or a mouse gesture on tab 612, followed by a drag) corresponding to a request to select and move standard tab 612. As shown, standard tab 612 is separated from the tab bar and moved in the direction of a drag motion. At FIG. 6H, electronic device 600 detects that tab 612 has been dragged to a position adjacent to docked tabs 610 and 611 (e.g., a predefined position) and released at that position. In response, electronic device 600 converts standard tab 612 to new docked tab 642 (shown as a docked tab with a "W" based on the first letter of webpage1.*com*). and associates the webpage (e.g., www.webpage1.*com*) with a docked tab (e.g., docked tab 642). In some embodiments, when a docked tab is created (or its position is rearranged) in a browser interface, all other open browser interfaces are updated to reflect the new docked tab (as seen in FIG. 6H).

Figure 6I:
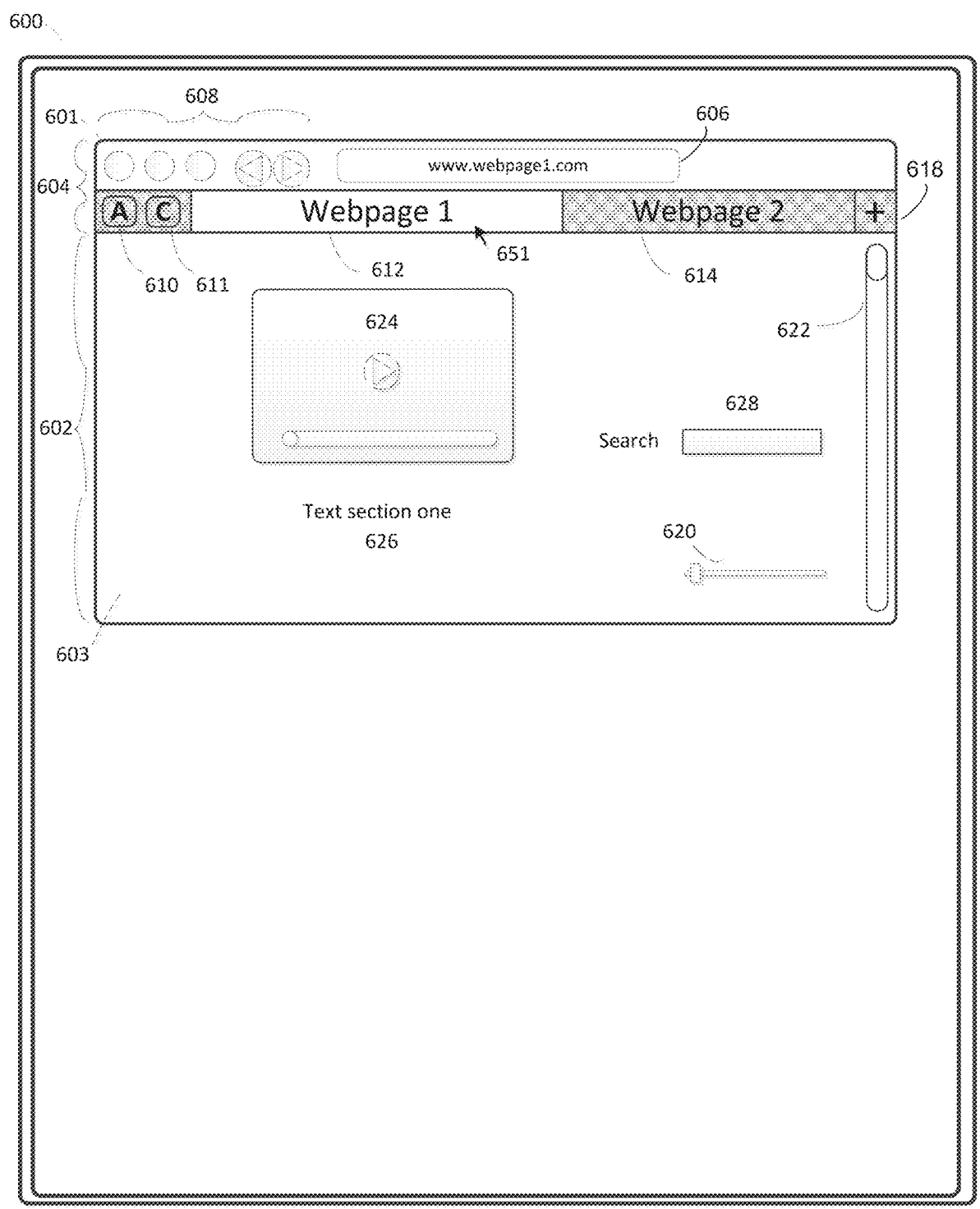
Figure 6J:
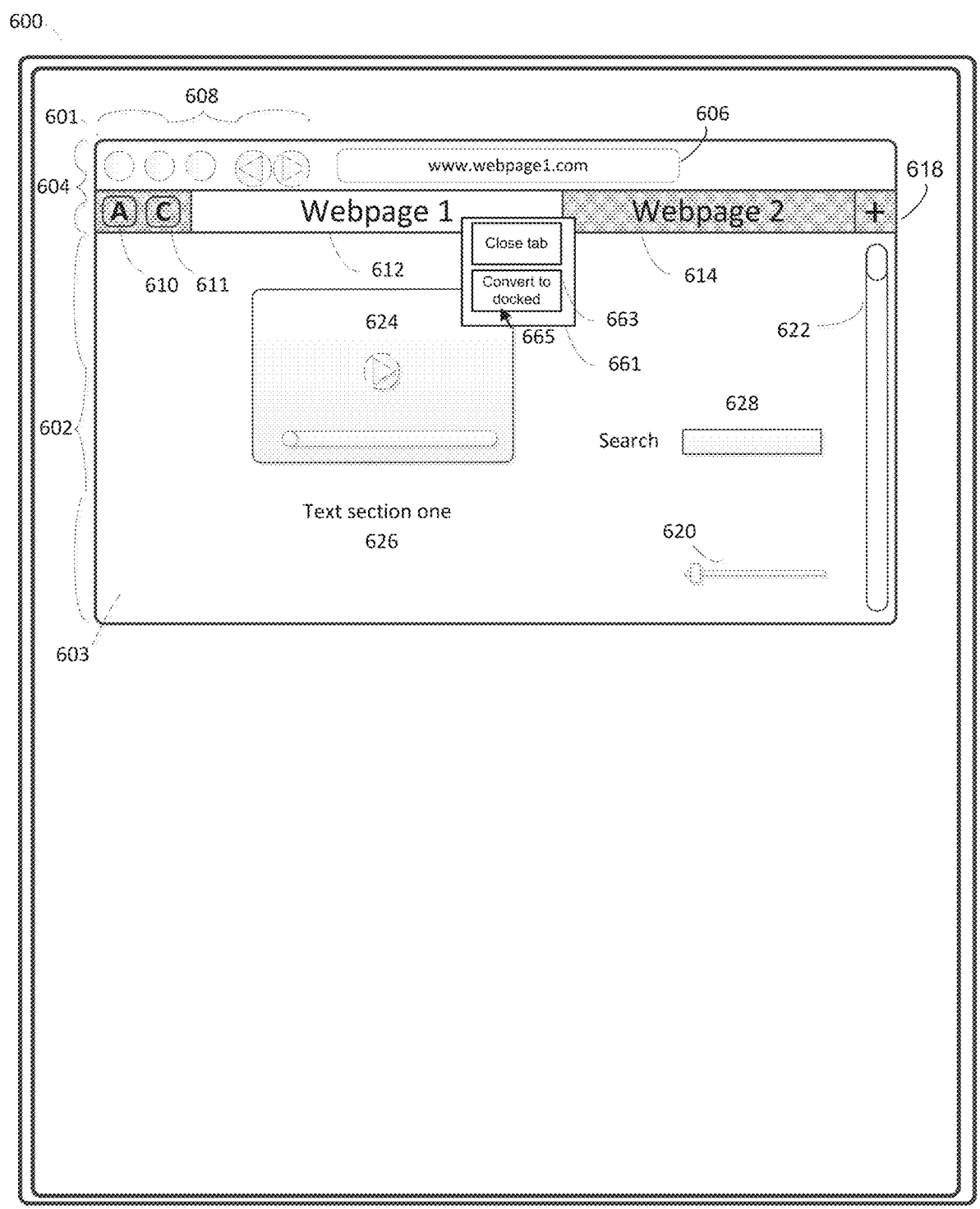
Figure 6J:
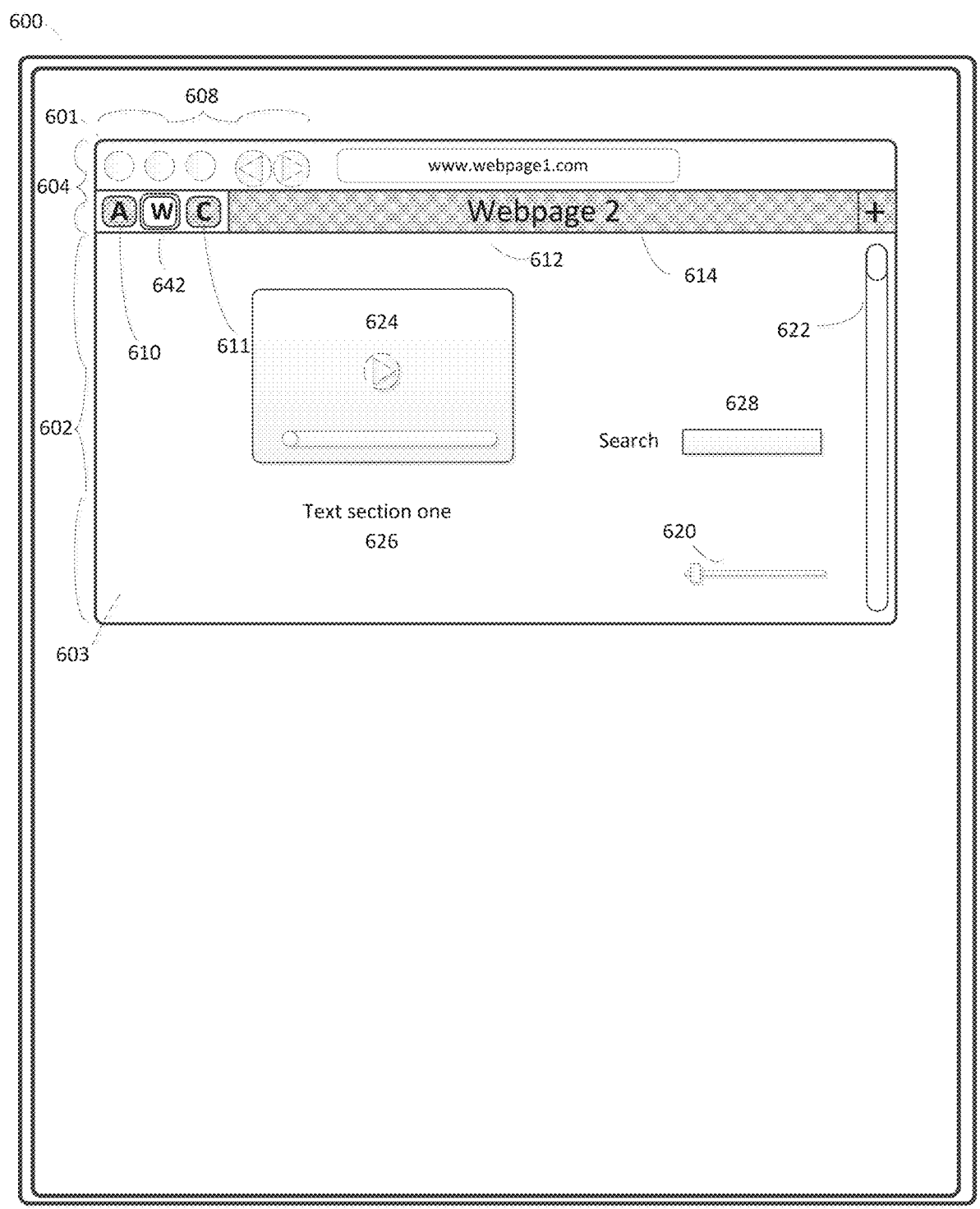

In some embodiments, a standard tab optionally can be converted to a docked tab using a contextual menu. Turning to FIG. 6I, webpage 603 is displayed in standard tab 612 on electronic device 600. At FIG. 6J, electronic device 600 detects an input (e.g., right mouse click 651 on standard tab 612 shown in FIG. 6I) corresponding to a request to display a contextual menu for a tab (e.g., tab 612) and displays contextual menu 661. Contextual menu 661 includes affordance 663 ("convert to docked"). In FIG. 6JJ, electronic device 600 detects an input (e.g., a left click on affordance 663 as shown in FIG. 6J) corresponding to a selection of affordance 663 (e.g., an affordance for converting the selected standard tab to a docked tab) and converts standard tab 612 to docked tab 642.

In some embodiments, a standard tab optionally can be converted to a docked tab via a menu of a browser interface. For example, a "bookmark" menu of a browser interface optionally can include an option to convert the foreground tab to a docked tab, if it is a standard tab.

In some embodiments, a second tab (e.g., tab 614 in FIG. 6A) is presented in the browser interface 601 with a different visual appearance than a first tab (e.g., tab 612 in FIG. 6A). The visual appearance differs, for example, in brightness, size, color saturation, color, and/or any other suitable characteristic. In some embodiments, the second tab (e.g., tab 614 in FIG. 6A) is presented with a different visual appearance than the first tab (e.g., tab 612 in FIG. 6A) because one of the tabs (e.g., tab 612 of FIG. 6A) is in the foreground compared to the other tab (e.g., tab 614 in FIG. 6A). In this way, the user can distinguish more readily between the foreground and background tabs. As set forth above, a first tab and second tab can differ in visual appearance in any other suitable characteristic, such as brightness, size, color saturation, and/or color.

In some embodiments, where a webpage is associated with a docked tab (e.g., webpage 603 displayed in tab 610 in FIG. 6AA), a visual indication is provided that the webpage 603 is associated with a docked tab. For example, as seen in FIG. 6AA, webpage 603 is associated with docked tab 610. Tab 610 is presented as a rounded square having a monogram (e.g., "A"), indicating that the webpage 603 is associated with docked tab 610 and that tab 610 is a docked tab. The docked tab could include any other, or additional, visual indication that the webpage 603 is associated with a docked tab, such as but not limited to brightness, size, color saturation, and/or color. In some embodiments, the visual indication that the webpage 603 is associated with a docked tab is not provided on the docked tab itself. Instead, a separate icon, banner, window, indicator, and/or other feature is presented by the browser interface 601 to provide a visual indication that the webpage is associated with the docked tab. For example, an indicator or affordance 632 is provided in the second portion 604 of the browser interface 601.

Figure 6K:
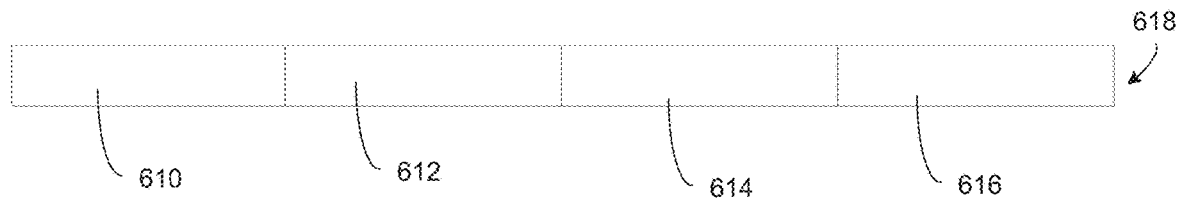
Figure 6L:
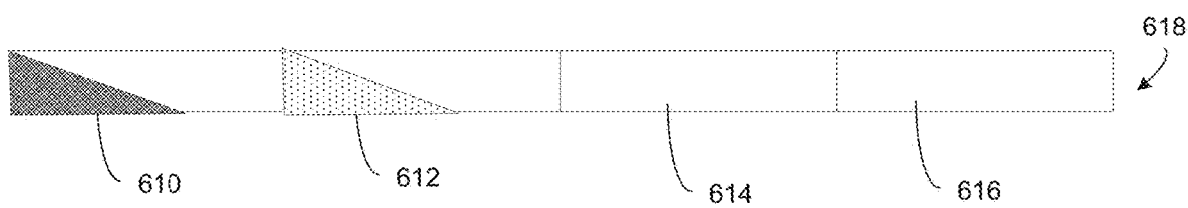
Figure 6M:
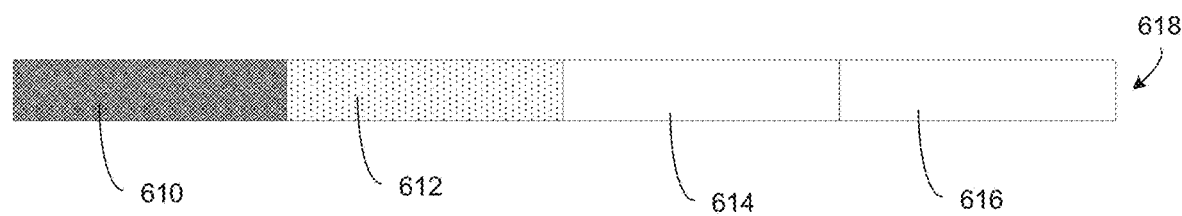

In some embodiments, a characteristic of the visual indication that the webpage 603 is associated with a docked tab is based on at least one characteristic of the content associated with the webpage 603. In some embodiments, the at least one characteristic of the content associated with the webpage 603 is included in the mark-up language associated with the webpage. Such at least one characteristic of the content associated with the webpage 603 is located in structured data in mark-up language, allowing the browser interface 601 to find and utilize that characteristic of the content associated with the webpage 603 to display a visual indication that the webpage 603 is associated with a docked tab. Color is one example of a characteristic of the content associated with the webpage 603. Exemplary tab bars 618 from a browser interface 601, such as shown in FIG. 6A, are shown in FIGS. 6K-6P. FIG. 6K shows the tab bar 618 of FIG. 6A, where tabs 610-616 have the same size, shape and color. FIG. 6L includes two docked tabs, the first tab 610 and the second tab 612. In the black and white representation of FIG. 6L, a region of color in each of the first tab 610 and the second tab 612 is represented by a shaded region. The shaded region of the first tab 610 is darker than the shaded region of the second tab 612, representing two different colors. For example, where the webpage associated with first tab 610 is predominantly dark blue, meaning that dark blue appears in more of the webpage as a whole, or in more of the portion of the webpage visible in the browser interface window, than other colors. As a result, the region of color in the first tab 610 is dark blue. Similarly, where the webpage associated with the second tab 612 is predominantly yellow, such that the region of the color in the second tab is predominantly yellow. Referring to FIG. 6M, the entirety of each of the first tab 610 and second tab 612 is presented with a visual indication of the predominant color characteristic of the content associated with their corresponding web pages, as described immediately above. In some embodiments, a color of the docked tab is determined in a different way, such as by determining an average color of the website, or a background color of the website. In some embodiments, the browser interface 601 examines a low-resolution bitmap icon (e.g., a favicon for the webpage) accompanying the webpage 603, and utilizes the predominant color or other characteristic of that bitmap icon to generate a color feature corresponding to the tab in which that webpage 603 is presented. In some embodiments, the docked tabs are presented elsewhere in the browser interface 601 than the tab bar 218, such as a separate tab bar or a separate area in the second portion 604 of the browser interface 601.

Figure 6N:
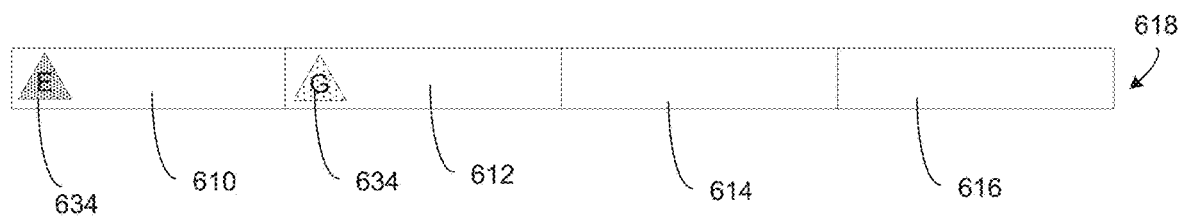
Figure 6P:
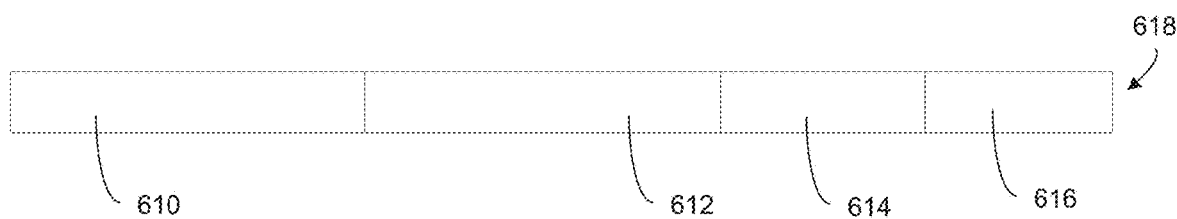

In some embodiments, the browser interface displays, for the docked tab or tabs, an icon (e.g., a monogram). One function of the icon (e.g., a monogram) is to provide a visual indication that a webpage 603 is associated with a docked tab. A low-resolution bitmap icon is optionally associated with the webpage 603, and is received by the browser interface 601 along with the webpage 603. As set forth above, the browser interface 601 can determine a color characteristic for the webpage 603. Further, the browser interface 601 determines text associated with the webpage, which is selected from a plurality of sources based on one or more rules for selecting text. For example, for the website www.apple.com, the browser application 601 selects the first letter of the domain, "A". In some embodiments, where a domain begins with "the" or similar words, "the" or such similar words are not considered, and the first letter thereafter is used. For example, for a website having a URL that begins www.thev . . . , after throwing out the first letters "the," the browser application 601 selects the letter V. In other examples, text associated with the webpage is a resource identifier of the webpage, a title of the webpage, a title of the webpage with one or more types of common words removed, and/or text from another metadata field associated with the webpage, such as a mobile webclip name. Heuristic rules are utilized in some embodiments to select the text associated with the webpage. Based on this information, the browser application generates a monogram. In some embodiments, the monogram is a vector graphic, which is higher resolution and quality than a bitmap icon. A high-resolution monogram is desirable in higher-resolution displays. As computer monitors, laptop screens, tablet displays and smartphone displays increase in quality, such as those utilizing the Retina® display of Apple Inc. of Cupertino, Calif., higher-resolution monograms are needed so that existing low-resolution bitmap icons do not ruin the high-resolution look of the display with low-quality graphics. In some embodiments, the browser application 601 generates a monogram using the previously-determined text associated with the webpage 603, and the color characteristic of the webpage 603. As one example, the monogram includes the first letter of text, against a background having the color characteristic of the webpage 603. As another example, a shape is generated, with the first letter of text inside the shape, and with the shape filled with the color of the color characteristic. As another example, where a low-resolution bitmap icon is associated with the webpage 603, that bitmap icon is redrawn as a vector graphic at higher resolution, and that vector graphic is used along with a monogram generated as described above, or instead of the monogram generated as described above. The redrawn vector graphic optionally includes the color characteristic and/or the first letter of the webpage, as described above. As another example, the browser application 601 checks a remote server to determine if a vector graphic exists for that website, and if so uses that vector graphic as the monogram. Referring to FIG. 6N, first tab 610 and second tab 612 are docked tabs, each of which includes a monogram 634, presented in the browser interface 601. The monogram 634 is optionally displayed in any other suitable location in the browser interface 601, such as the address bar 606, the search bar 650, and/or other location in the second portion 604 of the browser interface 601.

Figure 6Q:
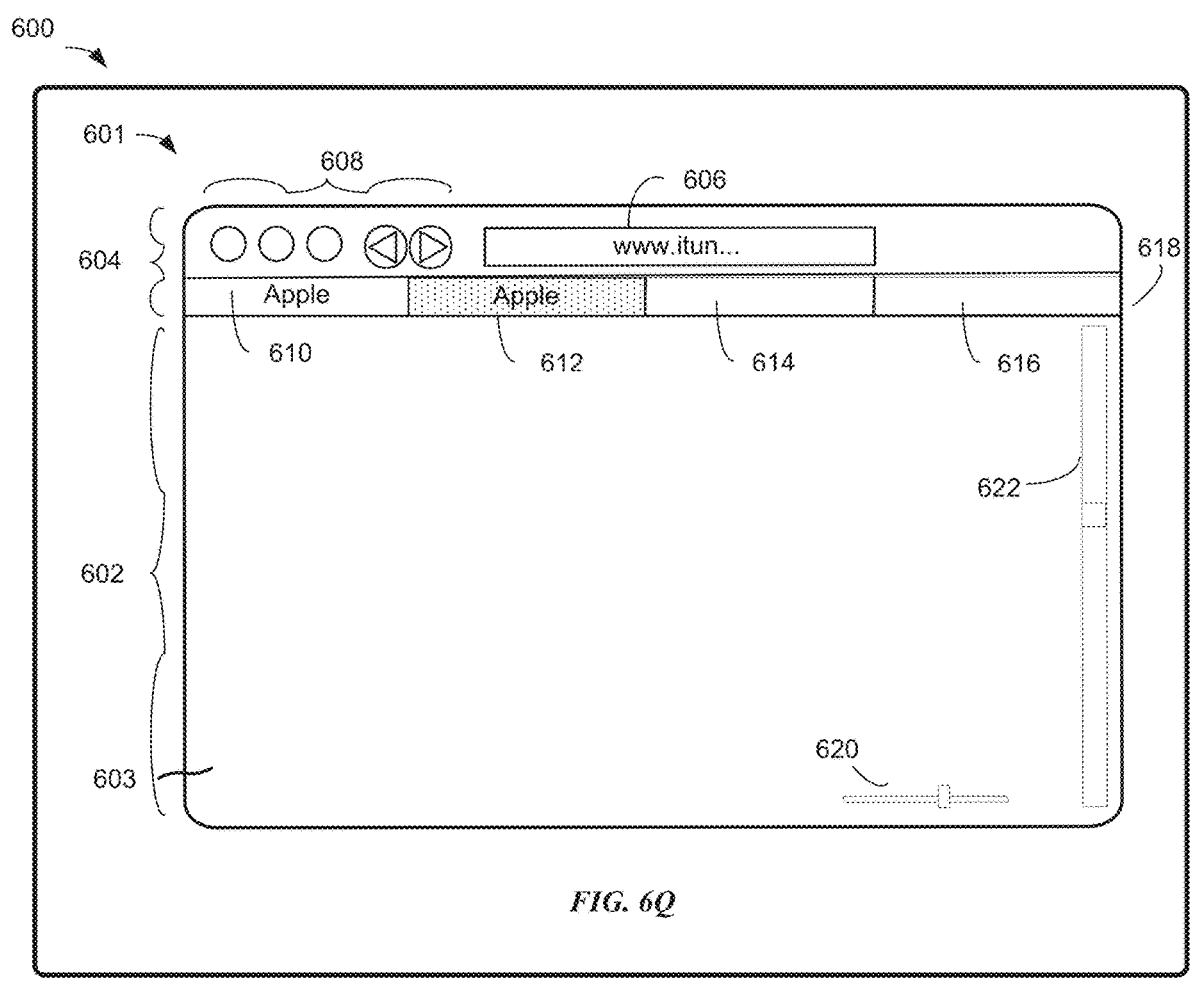
Figure 6R:
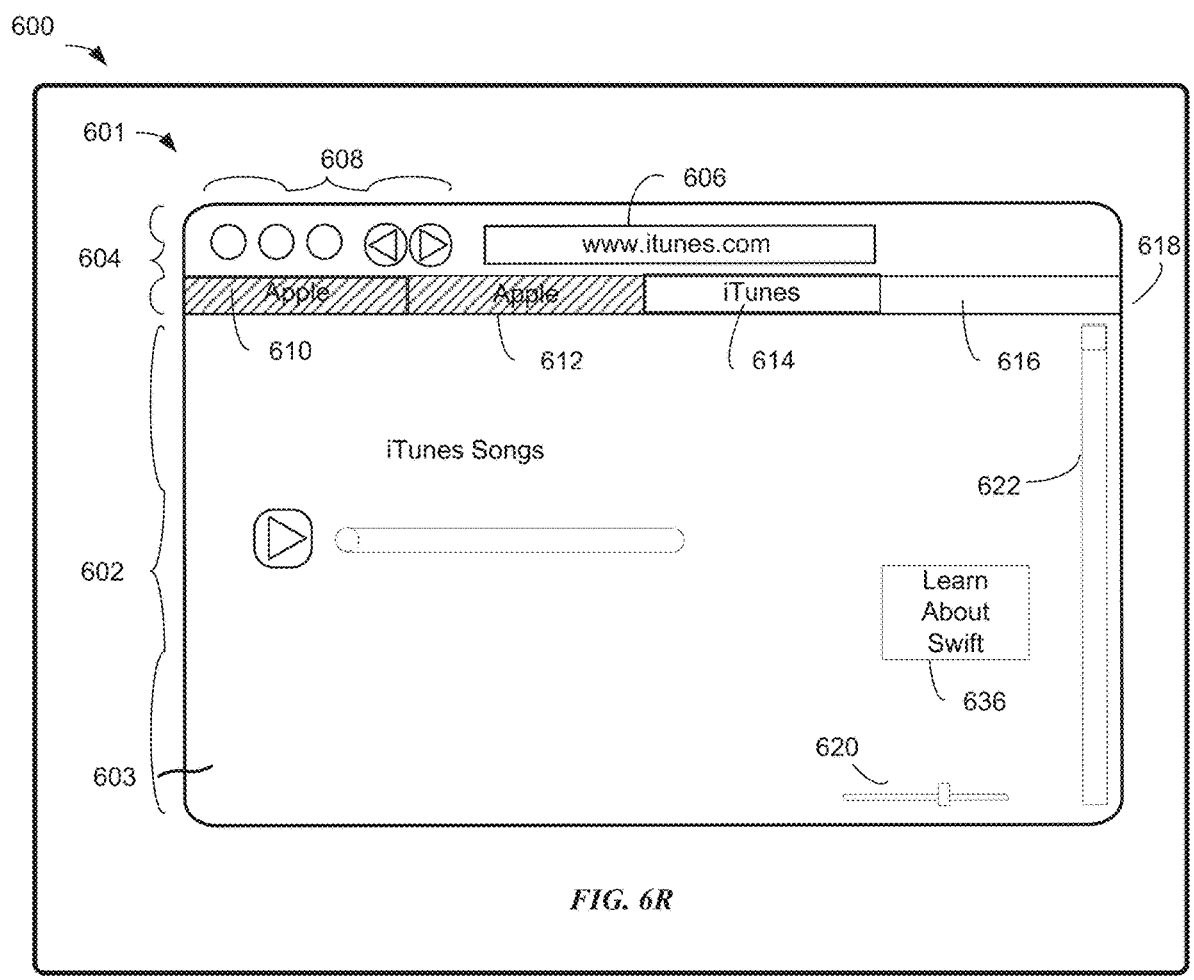

As described above with reference to FIG. 6D, in accordance with a determination that the webpage is associated with a docked tab (e.g., has the domain or subdomain associated with the docked tab) and that the first tab (e.g., 610) is a docked tab, electronic device 600 presents the webpage with the state of the webpage in the first tab (e.g., 610). As seen in FIG. 6D, electronic device 600 has received and processed, in second tab 612 (now the foreground tab and associated with first portion 602), a request to navigate to the same webpage (www.apple.com) that is open in tab 610 (now a background tab). Electronic device 600 has determined that webpage 603 is associated with a docked tab and that tab 612 is a docked tab. Accordingly, webpage 603 is opened and presented in tab 612 with the (changed) state of webpage 603 seen in FIG. 6B. Therefore, first tab 610 and second tab 612 are both docked tabs. In some embodiments, electronic device 600 receives a request (e.g., mouse, keyboard, or touch inputs) to open a second webpage in a third tab that is different from the first tab and the second tab. For example, a user selects an available tab (or open a new tab) and use address bar 606 to navigate to the same URL address as the webpage of the first tab. As seen in FIG. 6Q, upon selecting available tab 614, a blank second portion 602 of the browser interface 601 is presented, and the user begins to type the www.itunes.com URL into the address bar 606. In response to the request to open the second webpage in the third tab, the browser interface 601 determines whether the second webpage www.itunes.com is associated with a docked tab or a standard tab. Referring to FIG. 6R, in response to a determination that the second webpage is associated with a standard tab, the browser interface 601 presents the second webpage in the third tab 614, where the third tab 614 is a standard tab.

As displayed in FIG. 6R, the first and second tabs 610, 612 are docked tabs, and the third tab 614 is a standard tab.

In some embodiments, the browser interface 601 displays the docked and standard tabs in a predefined order in the tab bar 618 relative to one another. As seen in FIG. 6R, in one embodiment, the docked tabs are displayed to the left of the tab bar 618, and the standard tab or tabs are displayed to the right of the docked tabs. Similarly, this arrangement is shown in FIG. 6P where the first and second tabs (610, 612) are docked tabs and are larger in size, and the third and fourth tabs are standard tabs that are smaller in size. Of course, any other predefined order tabs in the tab bar 618 is optionally used. In some embodiments, the predetermined order is a default order which can be changed upon user input, in order to adjust to a particular user's preferences.

In some embodiments, a user navigates from the third tab 614 to a third webpage associated with a docked tab. For example, the electronic device detects that the user clicks on a button 636 displayed on the webpage 603 in order to navigate to a third webpage. Electronic device 600 determines that the webpage 603 to which the button 636 points is associated with a docked tab. In response to receiving the request to navigate within the third tab to a third webpage associated with a docked tab, the browser interface 601 displays the webpage 603 in the fourth tab 616, where the fourth tab 616 is a docked tab. As described above with regard to FIG. 6R, in some embodiments, the fourth tab 616 is displayed to the left of the third tab 614, because the fourth tab 616 is a docked tab, and in some embodiments docked tabs are displayed in a predefined order relative to standard tabs.

Figure 6S:
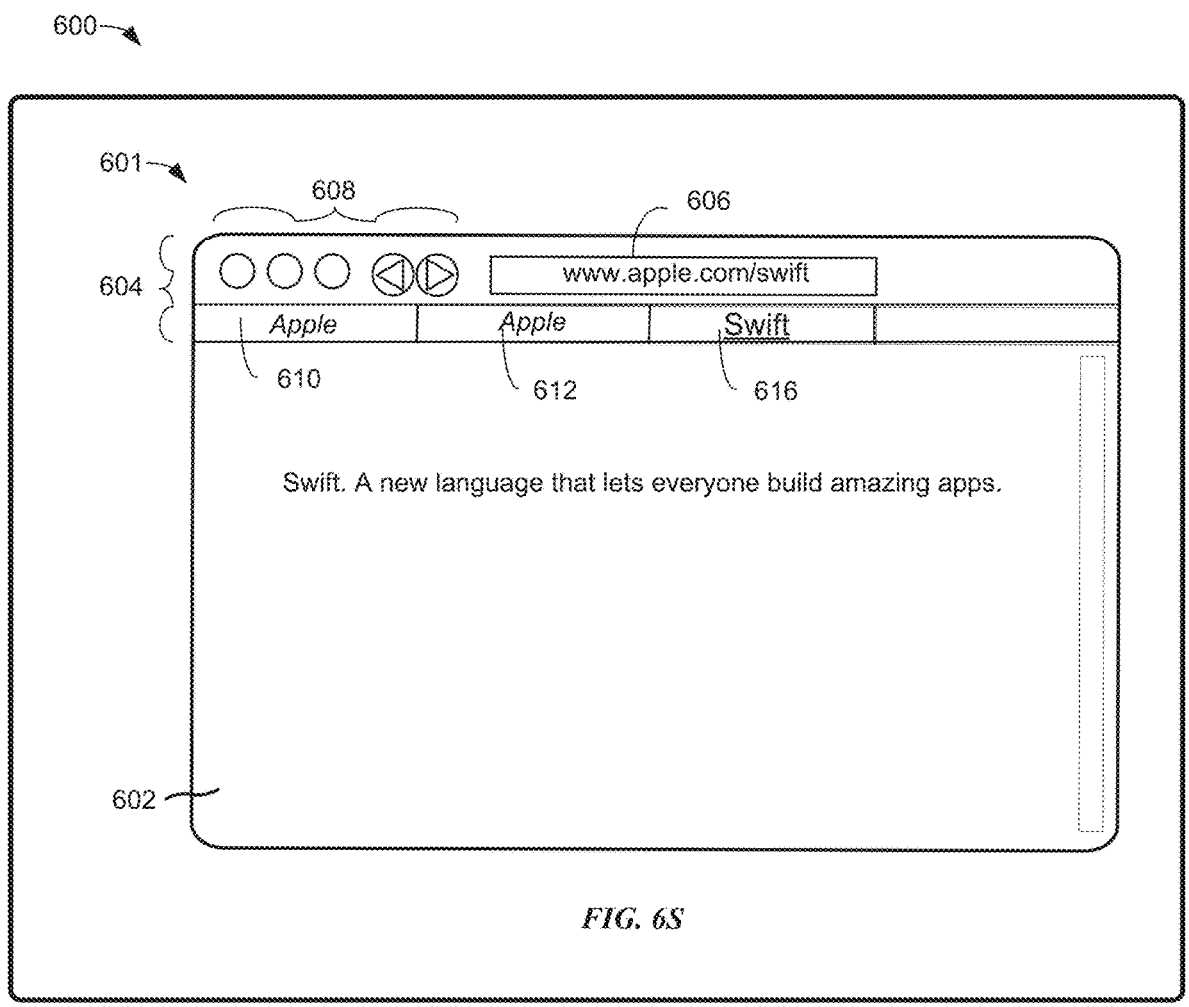

In some embodiments, the browser interface 601 receives a request to navigate within a third tab 614 to a third webpage associated with a docked tab. Starting with FIG. 6R, the electronic device detects that a user has clicked on button 636 to navigate to a third webpage, where that webpage is associated with a docked tab. In response, the browser interface 601 closes the third tab 612 in conjunction with opening the fourth tab 614, as seen in FIG. 6S.

Figure 6T:
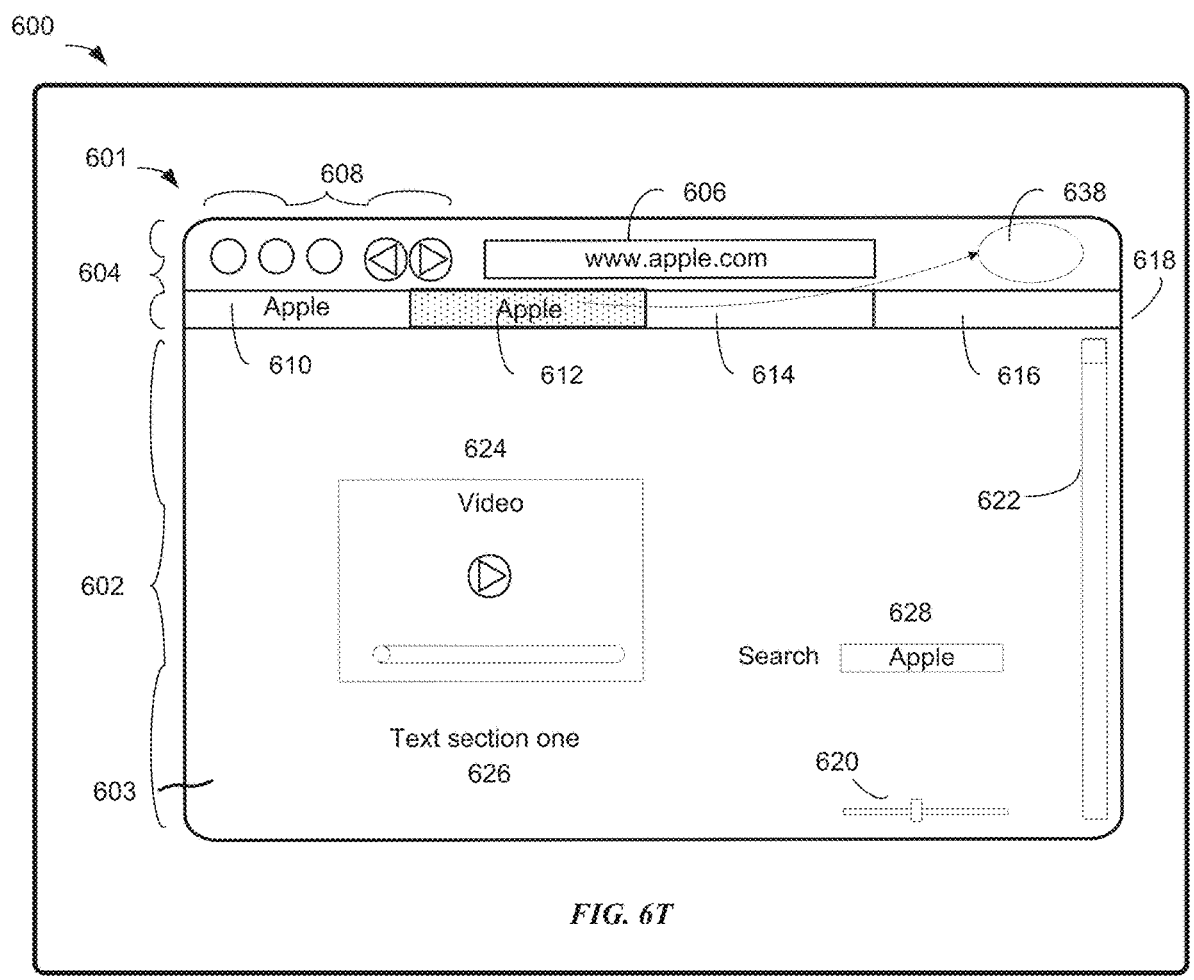

Referring to FIG. 6T, the first tab 610 and the second tab 612 are each docked tabs, and the third tab 614 and fourth tab 616 are both standard tabs. A user may wish to convert a standard tab to a docked tab. For example, the user frequently may utilize the webpage 603 displayed in the fourth tab 616, which is a standard tab. In order to convert the fourth tab 616 to a docked tab, the user optionally can drag that fourth tab 616 to a left edge of the tab bar 618, or other designated location in the browser interface 601, using a cursor, touchscreen or any other suitable input. In some embodiments, the user instead optionally can drag a standard tab to a different location or area in the browser interface 601. The electronic device detects that a user has clicked and dragged, such as with the cursor 615, the fourth tab 616 to the left within the browser interface window 601, such as to the left side of the tab bar 618, or leftward past a designated boundary in the browser interface 601, as shown in FIG. 6T-1. In some embodiments, other locations in the browser interface 601 than, or in addition to, the left side of the tab bar 618 of the browser interface 601 optionally can be associated with conversion of a standard tab to a docked tab. Where the browser interface 601 is displayed on a touch screen 112, the touch screen 112 optionally can simulate some resistance to dragging the fourth tab 616 to the left side of the tab bar 618. In some embodiments, the fourth tab 616 optionally can begin to fall behind the motion of the user's finger as detected by the touch screen 112. Other methods optionally can be used to simulate resistance. In some embodiments, the touch screen receives input corresponding to the user dragging the fourth tab 616 to the left border of the tab bar 618 or of the browser interface 601, or in some embodiments all the way to the left edge of the screen. The touch screen then receives input corresponding to holding the fourth tab 616 in that position for a predetermined amount of time. In response to receiving input of the fourth tab 616 being held in place against the left border of the tab bar 618 or of the browser interface 601, or in some embodiments all the way to the left edge of the screen, the fourth tab 616 is converted from a standard tab to a docked tab, and displayed in a manner consistent with the display of docked tabs. If the touch screen 112 detects that the user has lifted off before the predetermined amount of time, the fourth tab 616 springs back to its prior position, and is not converted to a docked tab. Where a mouse is used instead of a touch screen 112, similar input optionally can be received by the browser interface 601, where a user optionally can hold the fourth tab 616 in a certain area for a predetermined time, after which the fourth tab 616 is converted to a docked tab. In some embodiments, the electronic device receives input corresponding to the release of the second tab 616 in a particular area in the browser interface 601, and the fourth tab 616 is converted to a docked tab.

In some embodiments, the electronic device optionally can detect input corresponding to a user dragging a docked tab rightward. The electronic device detects that a user has clicked and dragged, such as with the cursor 615, the docked tab to the right within the browser interface window 601, such as to the right side of the tab bar 618, or rightward past a designated boundary in the browser interface 601. Inversely to the method described above, the docked tab then optionally can be converted to a standard tab, which is displayed in the tab bar 618 at a location to the right of the docked tabs, or if no docked tabs are present, at a location to the right of the position the docked tabs would occupy. The standard tabs optionally can be located elsewhere in the browser interface 601 if desired.

Figure 6U:
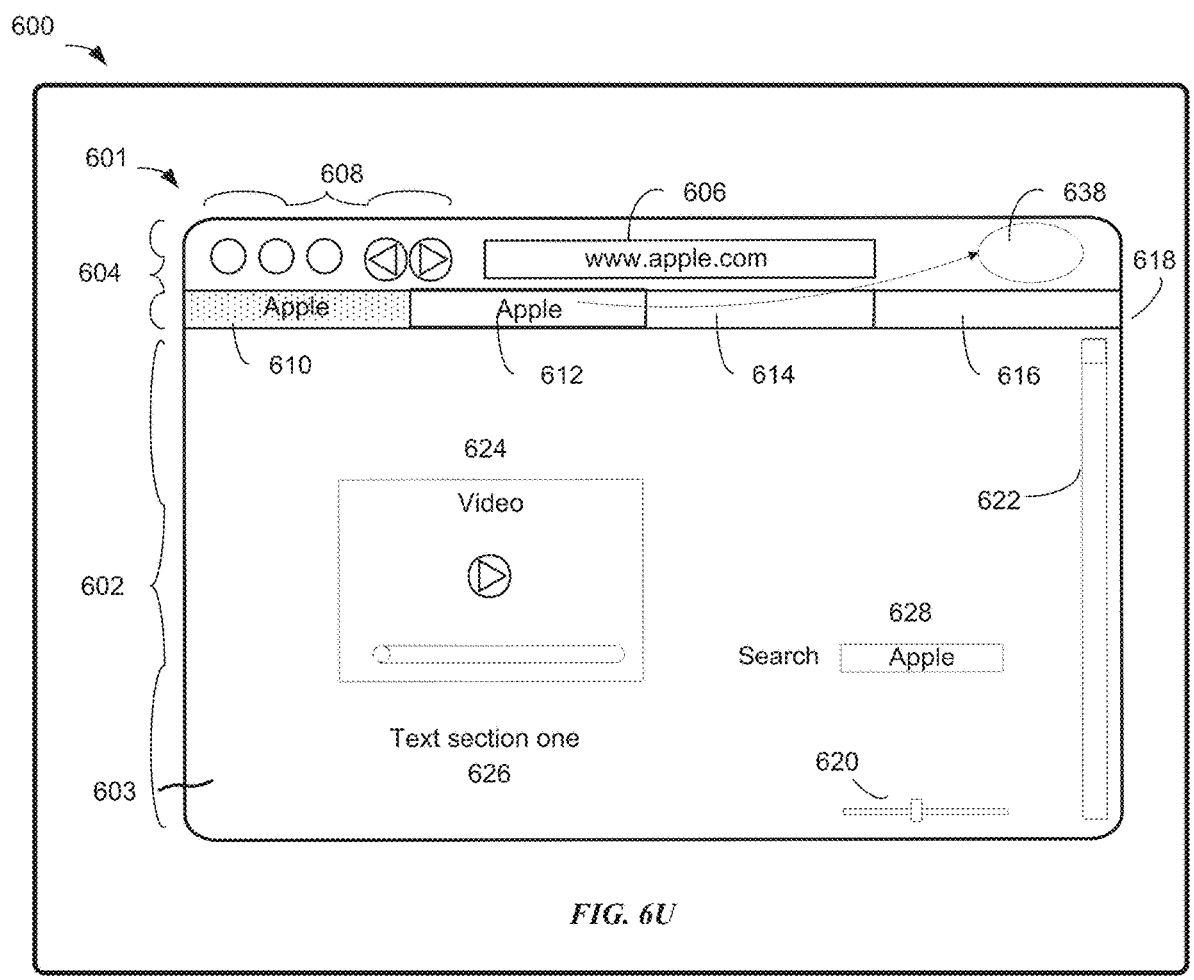

Correspondingly, the browser interface 601 receives the request to select the fourth tab 616 and move the fourth tab 616 to a conversion area 638 of the browser interface 601. In response to receiving the request to select the fourth tab 616 and move the fourth tab 616 to the left side of the tab bar 618, the fourth tab 616 is converted to a docked tab, and the webpage 603 is associated with the docked tab. The visual appearance of the fourth tab 616 has been altered to be consistent with the appearance of a docked tab. For example, as shown in FIGS. 6T and 6U, the docked tabs are squares at the left end of the tab bar 618. As seen in FIG. 6U, the fourth tab 616, which is now docked, is in the foreground on the left side of the tab bar 618. In some embodiments, the other instance of the webpage 603 displayed in the first tab 610 is closed in conjunction with the conversion of the fourth tab 616 to a docked tab. Other methods are contemplated for the conversion of a standard tab to a docked tab. In some embodiments, the electronic device detects that a user has right-clicked on a standard tab, such as the fourth tab 616. In response, the fourth tab 616 is converted to a docked tab, and the webpage 603 is associated with the docked tab. In some embodiments, the electronic device detects that a user has right-clicked on a standard tab, such as the fourth tab 616. In response, the browser interface 601 presents to the user an option to convert the second tab 612 to a docked tab. In response to the detection by the electronic device that the user has selected the option to convert the fourth tab 616 to a docked tab, the fourth tab 616 is converted to a docked tab, and the webpage 603 is associated with the docked tab. In response to the detection by the electronic device that the user has not selected the option to convert the fourth tab 616 to a docked tab, the fourth tab 616 is not converted to a docked tab. In some embodiments, the electronic device detects gestural input that a user has pressed and held the fourth tab 616, which is a standard tab, and detects that the user additionally has dragged the fourth tab 616 in a defined direction, such as left. In response to detection of that gestural input, which corresponds to the conversion of a standard tab to a docked tab, the fourth tab 616 is converted to a docked tab, and the webpage 603 is associated with the docked tab.

Figure 6V:
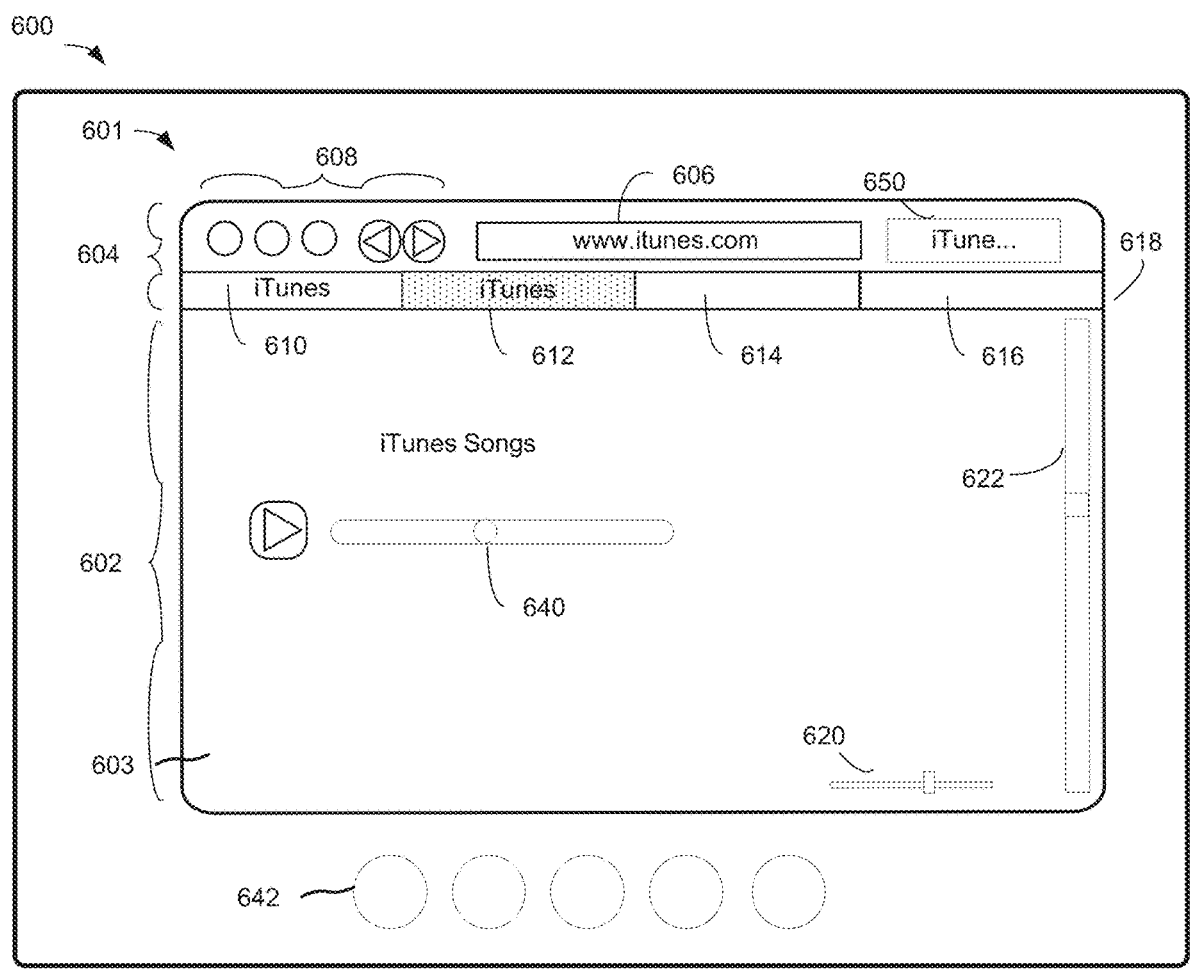
Figure 6W:
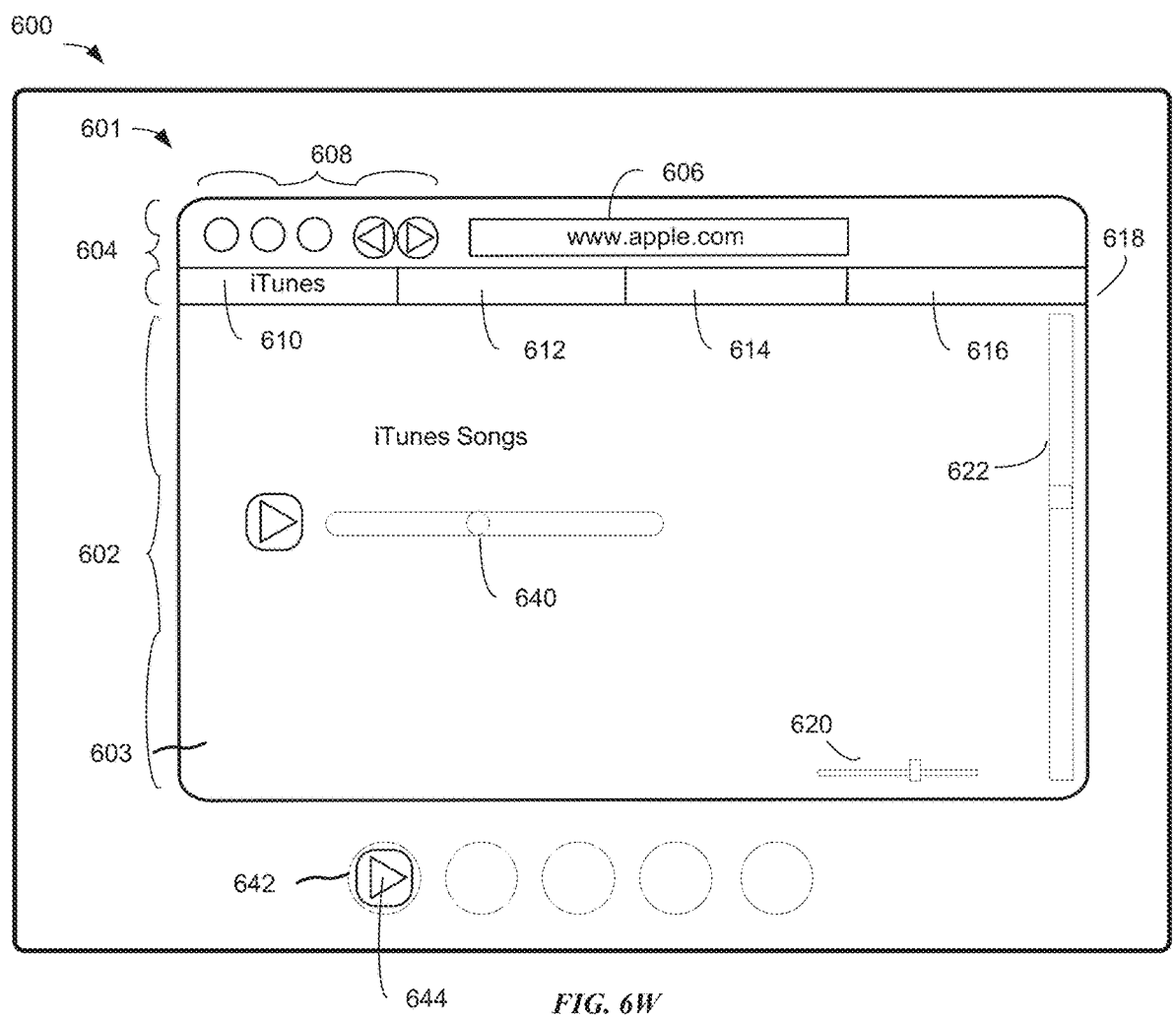

In some embodiments, as described above with reference to FIG. 6D, in accordance with a determination that the webpage is associated with a docked tab (e.g., has the domain or subdomain associated with the docked tab) and that the first tab (e.g., 610) is a docked tab, electronic device 600 presents the webpage with the state of the webpage in the first tab (e.g., 610). As seen in FIG. 6D, electronic device 600 has received and processed, in second tab 612 (now the foreground tab and associated with first portion 602), a request to navigate to the same webpage (www.apple.com) that is open in tab 610 (now a background tab). Referring to FIG. 6V, the exemplary webpage www.itunes.com is associated with each of the first tab 610 and the second tab 612, both of which are docked tabs. The user plays back media associated with the webpage, as shown by the progress indicator 640. The electronic device detects that a user has clicked and dragged the second tab 612 to a defined location 642 outside the browser interface 601, such as the dock region of the Mac OS X® operating system of Apple Inc. of Cupertino, Calif. As described above, the state of the webpage 603 associated with the second tab 612 includes media playback information. Optionally, media playback occurs as the electronic device detects dragging of the second tab 612 to the defined location 642 outside the browser interface 601. When the electronic device detects that a user has user released the second tab 612 in the defined location, the electronic device retains the media playback information associated with the second tab 612, and continues media playback after the releasing. The second tab 612 is no longer displayed in the browser application. Optionally, a media playback icon 644 is displayed in the defined region, which indicates that media playback is occurring and provides for control over media playback.

In some embodiments, referring back to exemplary FIG. 6V, the browser interface 601 includes a search box 650. As seen in FIG. 6V, media playback is in progress, referring to the progress indicator 640. The browser interface 601 receives search input through the search box 650. Upon receipt of the search input, if the browser interface 601 determines that the user is searching for a domain that is associated with a docked tab such as the second tab 612, and media playback is in progress in the docked tab, the browser interface 601 will display the docked tab to the user, while continuing media playback in the docked tab (i.e., without reloading contents of the docked tab). Upon receipt of the search input, if the browser interface 601 determines that the user is searching for a domain that is associated with a docked tab such as the second tab 612, and media playback is not in progress in the docked tab, the browser interface 601 reloads or refreshes the webpage in the docked tab. For example, user input optionally can be received in the search field 628, and search results optionally can be suggested by the browser interface 601 (e.g., via autocompletion or via a search of the user's browsing history), and the browser interface 601 receives user selection of a suggestion. In this way, the docked tab is refreshed as if it was just loaded, without interrupting media playback. In some embodiments, when the browser interface 601 receives search input in the search box that corresponds to a webpage associated with a docked tab, the browser automatically displays the docked tab, instead of opening the webpage in a currently displayed tab or launching a new tab to display the webpage.

Figure 6X:
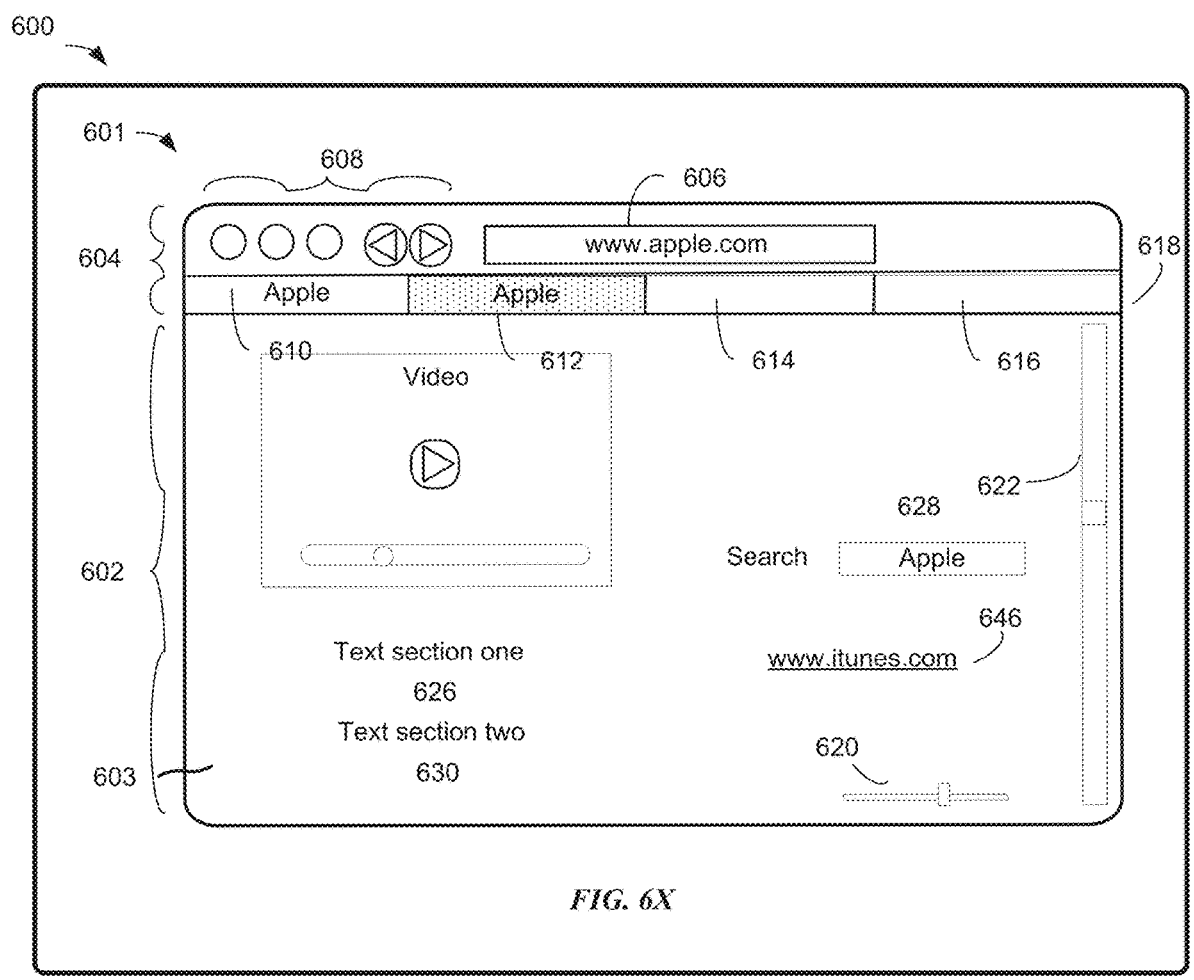
Figure 6Y:
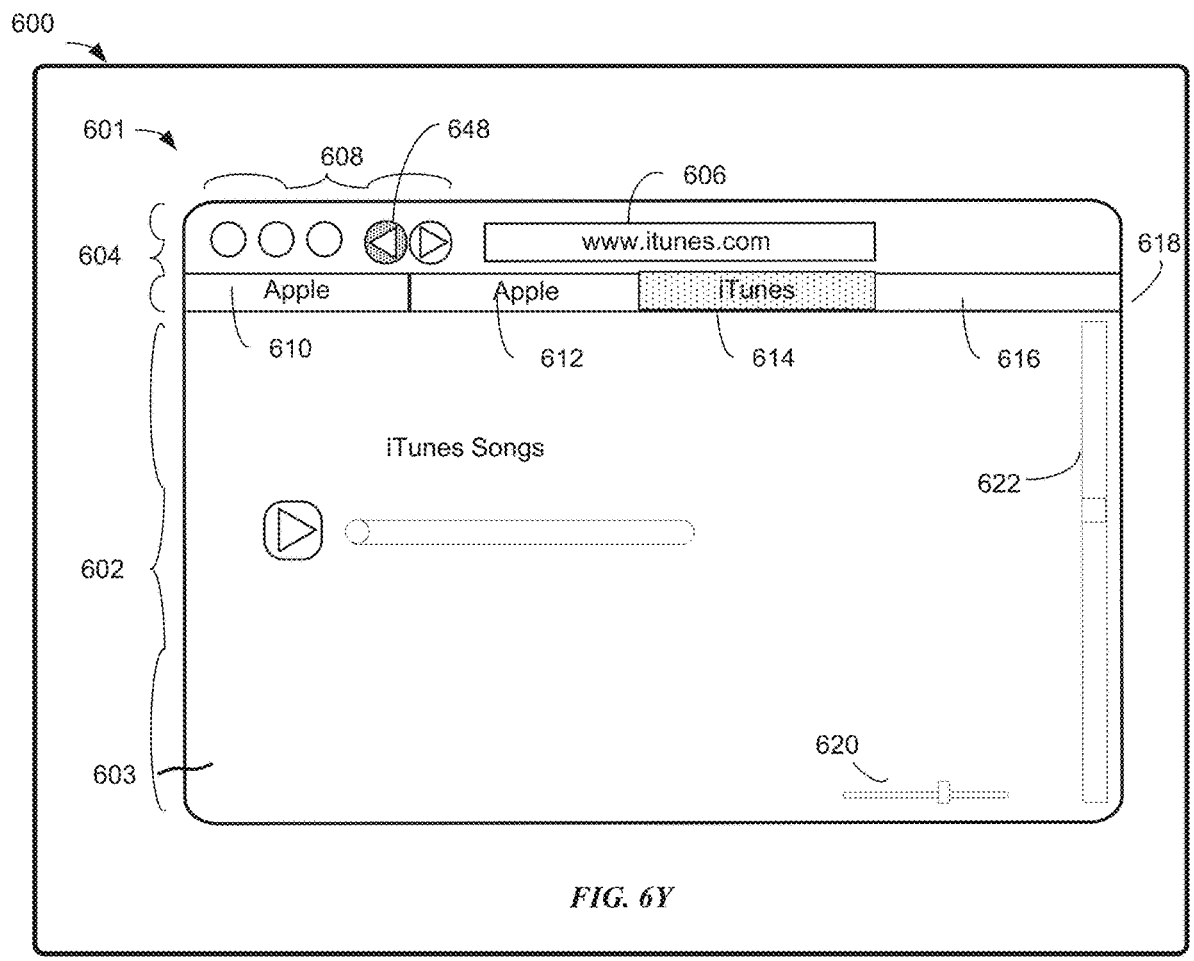
Figure 6Z:
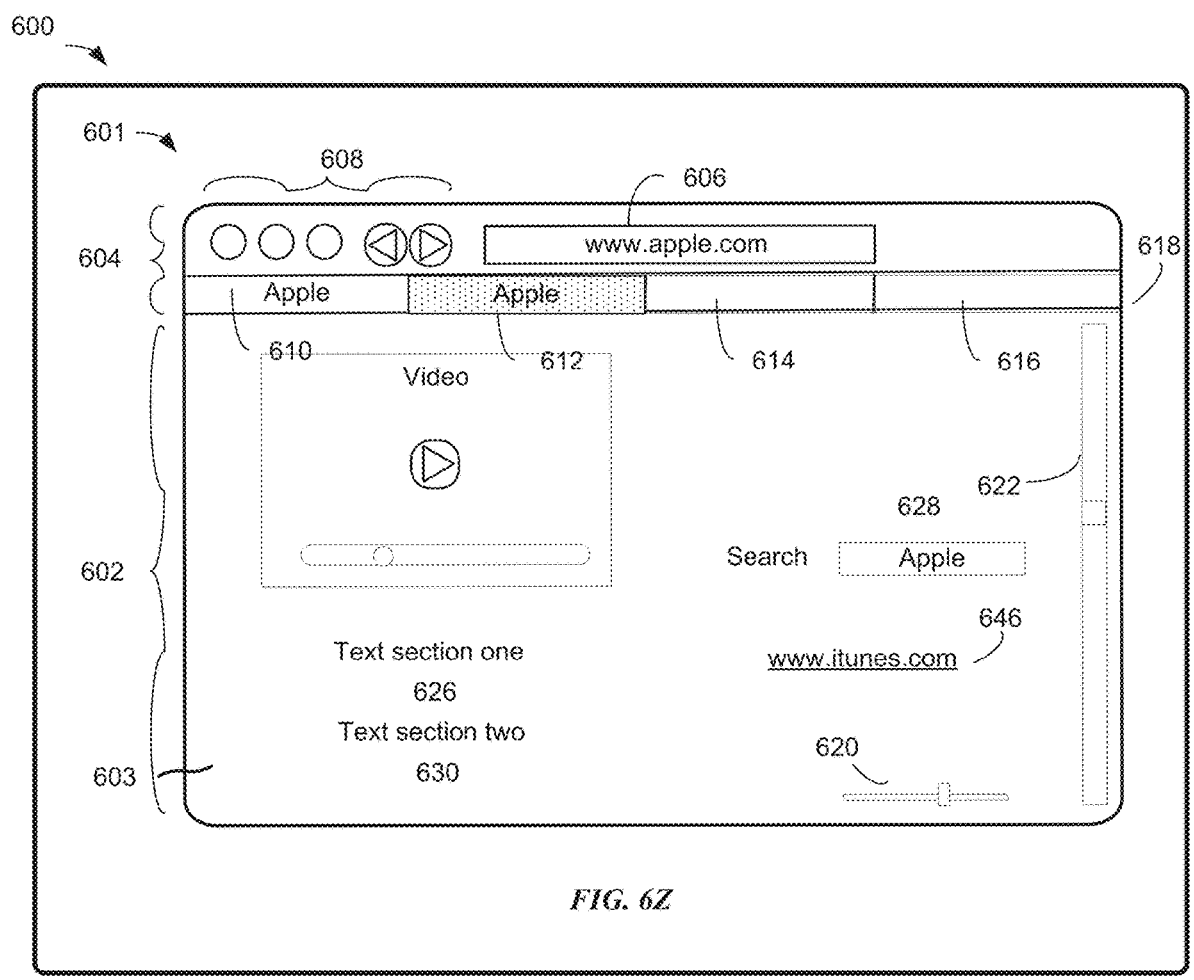
Figure 6Z:
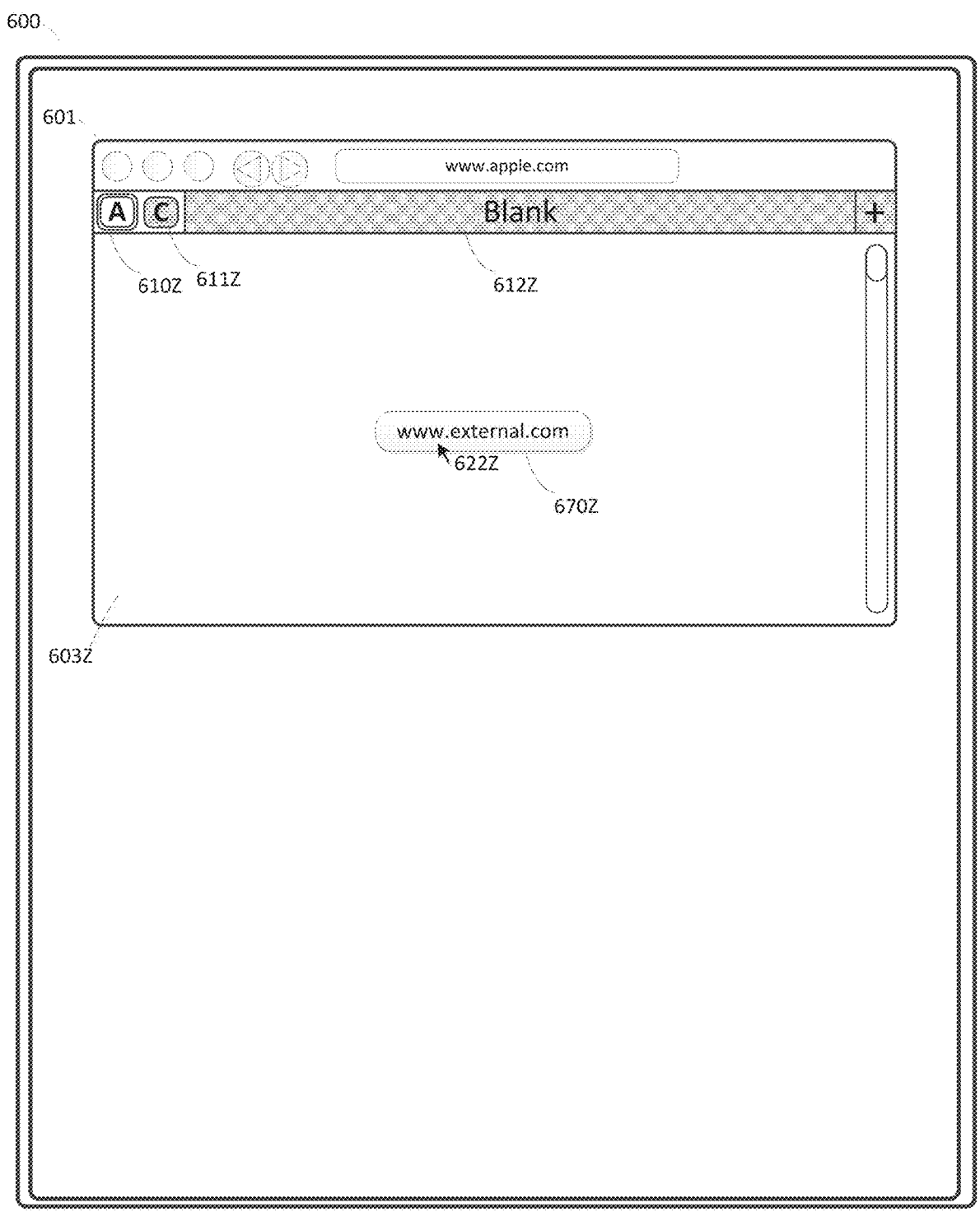

In some embodiments, as described above with reference to FIG. 6D, in accordance with a determination that the webpage is associated with a docked tab (e.g., has the domain or subdomain associated with the docked tab) and that the first tab (e.g., 610) is a docked tab, electronic device 600 presents the webpage with the state of the webpage in the first tab (e.g., 610). As seen in FIG. 6X, electronic device 600 has received and processed, in second tab 612 (now the foreground tab and associated with first portion 602), a request to navigate to the same webpage (www.apple.com) that is open in tab 610 (now a background tab). The webpage 603 displayed in FIG. 6X includes a link 646 that navigates away from a domain associated with the webpage 603 (www.apple.com). Referring to FIG. 6Y, in response to receiving a selection of the link 646 that navigates away from the domain associated with the webpage 603, electronic device 600 opens a third tab 614 and displays in the third tab 614 a second webpage 603 associated with the link 646. The browser interface 601 displays an affordance 648 associated with navigation back, and in some embodiments the affordance 648 is highlighted. After the user has viewed or listened to the content associated with the third tab 614, the user may wish to return to the second tab 612. In some embodiments, the electronic device detects a user selection of affordance 648. In response to selection of the affordance 648, the electronic device closes the third tab, and present the web page previously associated with the first and second tabs 610, 612, as shown in FIG. 6Z. In contrast and by way of further explanation, had the first tab 610 been a standard tab, receiving a selection of the link 646 that navigates away from the domain associated with the webpage 603 also results in opening a third tab 614 and displaying in the third tab 614 a second webpage 603 associated with the link 646. However, the affordance 648 would be neither highlighted nor would selection of affordance 648 result in closing of the third tab 614; rather third tab 614 would remain displayed, in unchanged form.

In some embodiments, the electronic device optionally can use a standard tab (e.g., an available blank standard tab (e.g., one without an open webpage) or a standard tab that is auto-generated when a browser interface is first opened) for displaying webpages on a different domain that are requested from requests (e.g., selection of hyperlinks) made from a docked tab. Turning to FIG. 6ZZ, a webpage 603Z is displayed on electronic device 600. Webpage 603Z (e.g., www.apple.com) is open in, and associated with, docked tab 610Z. Webpage 603Z includes an affordance (e.g., a hyperlink) that, when selected, directs the browser to a webpage (e.g., www.external.com) that is not associated with a docked tab. In the embodiment of FIG. 6ZZ, because docked tab 610Z is specifically associated with webpage 603Z (e.g., the domain www.apple.com and subdomains thereof), electronic device 600 does not, upon detecting an input (e.g., mouse click 622Z) to open the webpage associated with affordance 670Z (e.g., www.external.com) in docked tab 610Z. Rather, as seen in FIG. 6ZZZ, electronic device 600, upon detecting an input (e.g., mouse click 622Z) to open the webpage associated with affordance 670Z, activates standard tab 612Z as the foreground tab and opens the requested webpage (e.g., www.external.com) in the standard tab 612Z. In some embodiments, the standard tab used is a "favorites" standard tab that is auto-generated when a browser interface is first opened, such as the "favorites" tab of the Safari® web browser of Apple Corporation, Cupertino, Calif. In this way, electronic device 600 can avoid opening a new standard tab when receiving a request to navigate to a webpage not associated with a docked tab, thereby reducing clutter on the browser interface. In some embodiments, while browsing a standard webpage opened in a standard tab (e.g., an available blank standard tab (e.g., one without an open webpage) or a standard tab that is auto-generated when a browser interface is first opened) in response to a request to navigate away from a webpage associated with a docked tab, a request to go back (e.g., a selection of a back affordance) returns the browser interface to the docked tab (e.g., the behavior illustrated with reference to FIGS. 6X, 6Y, and 6Z) and further reverts the standard tab to its former state (e.g., a blank standard tab or a standard tab that is auto-generated when a browser interface is first opened), as seen in FIG. 6ZZZZ after receiving a back request (e.g., mouse click 699Z on a back affordance in FIG. 6ZZZ).

FIGS. 7A-7F are a flow diagram that illustrates, in conjunction with FIGS. 6A-6ZZZZ, a method for providing and managing docked browser tabs using an electronic device in accordance with some embodiments. Method 700 is performed at a device (e.g., 100, 300, 500) with a display. Some operations in method 700 can be combined, the order of some operations can be changed, and some operations can be omitted. In particular, optional operations indicated with dashed-line boxes in FIGS. 7A-7F can be performed in any suitable order, if at all, and need not be performed in the order set forth in FIGS. 7A-7F.

As described below, method 700 provides an intuitive way for providing and managing docked browser tabs. The method reduces the cognitive burden on a user for providing and managing browser tabs, thereby creating a more efficient human-machine interface. For battery-operated computing devices, enabling a user manage and utilize docked browser tabs faster and more efficiently conserves power and increases the time between battery charges.

The electronic device (e.g., 100, 300, 500) includes a display (e.g., 112, 340, 504). A browser application is installed on the electronic device (e.g., 100, 300, 500). A browser application is software with a graphical user interface for displaying files, used to navigate the World Wide Web. An exemplary web browser is the Safari® web browser of Apple Corporation, Cupertino, Calif. In some embodiments, the browser application (e.g., the browser module 147 shown in FIG. 3) is compliant with the HTML5 standard, although the browser module (e.g., 147) need not be compatible with the HTML standard. A webpage is displayed in a first tab (e.g., 610) of the browser interface (e.g., 601).

Referring also to FIG. 6B as an example, while a webpage (603) is open in a first tab (610) in a browser interface (601), the browser application window (601) receives (702) one or more inputs corresponding to the webpage. The input or inputs are in any suitable form, such as a click on the webpage (603), a touch on a touch sensitive display system, typing into a text box, receiving sound via a microphone, or any other supported input. The content of the input includes typing text into a text box, selecting media for playback, dictating into a text box, scrolling down in a web page, or any other suitable content.

In response to receiving one or more inputs, the electronic device (e.g., 100, 300, 500) changes (704) the state of the webpage (603) that is displayed in the first tab (610), as seen in FIG. 6B. The state of the webpage is an aspect of the webpage that is changeable by the user from the way that it is initially presented to the user. The state of the webpage (e.g., 603) includes the page position state, meaning the portion of the webpage (e.g., 603) displayed in the browser interface (e.g., 601). The electronic device optionally can detect a user request to scroll, swipe, or otherwise move the portion of the webpage displayed in the browser interface (e.g., 601). The state of the webpage (e.g., 603) includes zoom level state, meaning the amount of zoom, if any, applied to the webpage (603) by the browser interface (e.g., 601). The browser interface (e.g., 601) includes a zoom affordance (620) that the user may select to zoom in or out relative to the zoom level with which the browser interface (e.g., 601) initially presented the webpage (603). The state of the webpage (e.g., 603) includes an entered text state, meaning the content of text entered into text boxes on the webpage (e.g., 603), if any. Typically, where a text box is provided, it is provided empty, or with suggested text, and the user may enter different or additional text into the text box. The state of the webpage (e.g., 603) includes a media playback state, meaning whether the webpage is playing back media, which media is being played back, and the location in the media being played back at any given time. For example, the media playback state includes information about a particular song or video being played by the user, and information about the location in that song or video currently being played back. In addition. The state of the webpage includes information relating to the domain and sub-domain of the webpage. The sub-domain state means the identity of the sub-domain, if any, corresponding to the webpage (e.g., 603), including the identity of the higher-level domain to which the sub-domain belongs.

After changing the state of the webpage (e.g., 603) displayed in the first tab (e.g., 610), the browser interface (e.g., 601) receives (706) a user request to open the webpage (e.g., 603) in a second tab different from the first tab (e.g., 610). The request to open the webpage (e.g., 603) optionally is made in the same browser interface window, or in a second browser application window (e.g., 601-1; FIG. 6C and FIG. 6CC).

The electronic device (e.g., 100, 300, 500) determines (708) whether the first tab (e.g., 610) is a docked tab, and whether the webpage (603) is associated with a docked tab. A webpage (603) is associated with a docked tab when the webpage (e.g., 603) is a domain associated with the docked tab, or is a subdomain of that domain. As used in this document, the term "docked tab" refers to a tab in a browser interface (e.g., 601) that provides for the storage and/or transmission of information regarding the state of the webpage (e.g., 603), in the manner set forth herein. In this document, the term "persistent tab" or "pinned tab" are also used interchangeably to refer to a docked tab. In some embodiments, each docked tab exists in every open window of the browser interface (e.g., 601). Accordingly, when the browser interface (e.g., 601) is open, each docked tab is shown. Optionally, a docked tab cannot be closed in the same manner as a standard tab. For example, there is not an affordance on a docked tab associated with closing the docked tab. Instead, the browser interface (e.g., 601) optionally requires the user to navigate to a menu or perform some other action in order to close a docked tab.

In accordance with a determination that the webpage (e.g., 603) is associated with a standard tab and that the first tab (e.g., 610) is not a docked tab, the browser interface (e.g., 601) presents (712) the webpage (e.g., FIG. 6C) with a state different from the state of the webpage (e.g., 603) in the first tab (e.g., 610). A stored state is not associated with the webpage (e.g., 654) that is associated with a standard tab. In some embodiments, such an action is similar to the action of a conventional web browser when a new tab is opened.

In accordance with a determination that the webpage (e.g., 603A) is associated with a docked tab and that the first tab (610A) is a docked tab, a browser interface presents (710) the webpage (e.g., 603A) with the state of the webpage (e.g., 603A) in the first tab (e.g., 610A). As one example, where the first tab (e.g., 610) is presented in the browser interface (e.g., 601) and the user requests to open the webpage in a second tab (e.g., 610A-1; FIG. 6CC) in a different browser interface, the electronic device presents the webpage (e.g., 603) in association with the second tab (e.g., 610A-1), with the state of the webpage (603) in the first tab (e.g., 610A). As seen in exemplary FIG. 6CC, the state of the webpage (603A) includes information that had been typed into a text box (628A) in the first tab (610A), which is presented in the second tab (610A-1) upon the opening of the second tab (610A-1).

In some embodiments (e.g., FIGS. 6D and 6E), after a determination that the webpage (603) is associated with a docked tab and that the first tab (e.g., 610) is a docked tab, the electronic device (e.g., 100, 300, 500) receives (714) a request to close the webpage (e.g., 603) in the first tab (e.g., 610) or second tab (e.g., 612). The electronic device (e.g., 100, 300, 500) optionally determines (716) whether the request to close the webpage (e.g., 603) in the first tab (e.g., 610) or the second tab is concurrent with a termination of the browser application. If the request to close the webpage (603) in the first tab (610) or the second tab is concurrent with a termination of the browser application, then the electronic device optionally forgoes (718) storage of state information associated with the webpage (603). In other embodiments, the electronic device (e.g., 100, 300, 500) instead stores state information associated with the webpage (e.g., 603). If the request to close the webpage (e.g., 603) in the first tab (e.g., 610) or the second tab (e.g., 611) is not concurrent with a termination of the browser application, then the electronic device (e.g., 100, 300, 500) optionally stores (720) state information associated with the webpage (e.g., 603). The electronic device (e.g., 100, 300, 500) then receives (722) a request to open the webpage (e.g., 603) in a third tab. In response to the request to open the webpage in a third tab, the electronic device optionally presents (724) the webpage (603) in a third tab with the stored state information associated with the webpage (603). That is, when the browser interface (e.g., 601) is opened, the docked tab opens with the browser interface, with the same state as when the browser interface (e.g., 601) was previously closed. In some embodiments, that state information includes text that had been typed into a text box (e.g., 628).

In some embodiments (e.g., FIGS. 6AA, 6BB, 6CC), after a determination that the webpage (e.g., 603) is associated with a docked tab and that the first tab (e.g., 610) is a docked tab, the first tab (e.g., 610) is in a first browser interface (e.g., 601) and the second tab (e.g., 612) is in a different browser application window (e.g., 601) from the first browser interface (601). Referring to exemplary FIG. 6G, the first browser interface (601) detects (728) a change of the state of the webpage (603) displayed in the first tab (610). Referring to exemplary FIG. 6H, in response to detecting a change of the state of the webpage (603) displayed in the first tab (610), the electronic device (e.g., 100, 300, 500) updates (730) the state of the webpage (603) displayed in the second tab (612) to reflect the change of the state of the webpage (603) displayed in the first tab (610). Thus, where two docked tabs display the same webpage (603) in two different browser application interfaces (601), a change in the state of one changes the state of the other, so the two remain synchronized. In some embodiments, an update to a docked tab in an active browser window is not reflected in a docked tab open to, and associated with, the same webpage in an inactive browser window until the inactive browser window is made active.

In some embodiments, the browser application interfaces (e.g., 601 or 601-1) need not be displayed on the same electronic device, and are located on different electronic devices from one another. In some embodiments, the second tab (e.g., 612) is presented with a different visual appearance than the first tab (e.g., 610). That is, where the second tab (e.g., 612) is located in a background window relate to the first tab (e.g., 610), the second tab (e.g., 612) is "grayed out", presented with a lessened brightness or contrast, presented with a decreased color saturation, decreased in size, or otherwise presented differently than the first tab (e.g., 610).

In some embodiments, referring to exemplary FIGS. 6K-6P, after a determination that the webpage (e.g., 603) is associated with a docked tab and that the first tab (e.g., 610) is a docked tab, the browser interface (e.g., 601) provides (734) a visual indication that the webpage (603) is associated with a docked tab (e.g., 612).

In some embodiments, a docked tab is larger than a standard tab, is presented with a heightened brightness or contrast, presented with an increased color saturation, presented with a different shape, and/or is presented in any other suitable manner. In some embodiments, a characteristic of the visual indication is determined (736) based on at least one characteristic of content associated with the webpage (e.g., 603). Optionally such at least one characteristic is determined based on structured data, such as HTML fields, present in the webpage (e.g., 603). For example, the characteristic is a color associated with the webpage (e.g., 603), and that color is used to generate a color of the docked tab and/or a color of an icon displayed in the docked tab.

In some embodiments, after a determination that the webpage (e.g., 603) is associated with a docked tab and that the first tab (e.g., 610) is a docked tab, the electronic device (e.g., 100, 300, 500) associates (730) the state of the webpage (e.g., 603) with a user identifier. The user identifier is a login ID associated with a mobile electronic device, an email address of the user, or any other identifying data. The electronic device (e.g., 100, 300, 500) then transmits to a second electronic device, a cloud server, or other machine the user identifier and the state of the webpage (e.g., 603) associated with the user identifier. In this way, transfer of the state of a webpage across different electronic devices is facilitated.

In some embodiments, after a determination that the webpage (e.g., 603) is associated with a docked tab and that the first tab (e.g., 610) is a docked tab, the browser interface (601) receives (742) a request to open a second webpage in a third tab. Referring to exemplary FIG. 6Q, in response to receipt of the request to open a second webpage in a third tab, in accordance with a determination that the second webpage is associated with a standard tab, the browser interface (601) presents (744) the webpage in the third tab (614) in FIG. 6R, where the third tab (e610) is a standard tab. In some embodiments, the browser interface (e.g., 601) displays (746) the docked and standard tabs in a predefined order relative to one another. For example, the docked tab is or tabs are located in proximity to one lateral side of the browser interface (e.g., 601), with the standard tab or tabs located further from that lateral side of the browser interface (601). The browser interface (e.g., 601) optionally receives (e.g., 748) a request to navigate within the third tab—which is a standard tab—to a third webpage associated with a docked tab. In response to the receipt of a request to navigate within the third tab to a third webpage associated with a docked tab, the browser interface (e.g., 601) optionally opens (750) a fourth tab and display the third webpage in the fourth tab, where the fourth tab is a docked tab. Further in response to the receipt of a request to navigate within the third tab to a third webpage associated with a docked tab, the browser interface (e.g., 601) closes (752) the third tab in conjunction with opening the fourth tab.

In some embodiments, after a determination that the webpage (e.g., 603) is associated with a docked tab and that the first tab (e.g., 610) and/or second tab (e.g., 612) is a docked tab, the user selects (754) the first tab (e.g., 610) or the second tab (612). Referring to FIG. 6V, the user drags (756) or otherwise move the selected tab (e.g., 610 or 612) out of the browser interface (601), where the state of the webpage (e.g., 603) associated with the selected tab (610 or 612) includes media playback information, and where media playback continues as the user drags or otherwise moves the selected tab (e.g., 610 or 612). The user releases (758) the selected tab (e.g., 610 or 612) at a defined location (e.g., 642), outside the browser interface (e.g., 601). The defined location (e.g., 616) is, as one example, in the Dock of the OS X® operating system software of Apple Corporation of Cupertino, Calif. The electronic device (e.g., 100, 300, 500) retains (760) the media playback information associated with the selected tab (e.g., 610 or 612). Referring to FIG. 6W, the electronic device continues (762) media playback after the user release of the selected tab (e.g., 610 or 612) at the defined location (e.g., 642). An icon or other indicator at the defined location (e.g., 642) optionally indicates that media playback continues, and optionally offers one or more controls relating to media playback.

In some embodiments, after a determination that the webpage (e.g., 603) is associated with a docked tab and that the first tab (e.g., 610) and/or second tab (e.g., 612) is a docked tab, the browser interface (e.g., 601) receives (764) the selection of a link (e.g., 646; FIG. 6X) that navigates away from a domain associated with the webpage (e.g., 603). Referring to FIG. 6Y, in response to receipt of the selection of a link (e.g., 646) that navigates away from a domain associated with the webpage (e.g., 603), the browser interface (e.g., 601) opens (766) a third tab (e.g., 614) and display in the third tab (e.g., 614) a second webpage (e.g., 601-1) that is associated with the link (e.g., 646). In some embodiments, the browser interface (e.g., 601) presents (768), in association with the third tab (e.g., 614), an affordance associated with backward navigation (648). The browser interface (e.g., 601) then receives (770) a selection of the affordance associated with backward navigation (648). There is no browser history associated with the third tab (e.g., 614), because it was opened to display the content associated with the link (e.g., 646). In response to selection (772) of the affordance associated with backward navigation (e.g., 648), the browser interface (e.g., 601) closes (774) the third tab (e.g., 614) and presents (776) the webpage associated with the first tab (e.g., 610) and/or second tab (e.g., 612) as seen in exemplary FIG. 6Z. Thus, the user returns to the tab from which he or she selected the link (e.g., 646) using intuitive back button (e.g., 648) functionality.

In contrast, selection of a link that navigates to a domain (e.g., a subdomain) associated with the webpage (e.g., 603) navigates to that domain, and presents a webpage associated with that domain in the same tab in which the link was displayed.

Figure 7A:
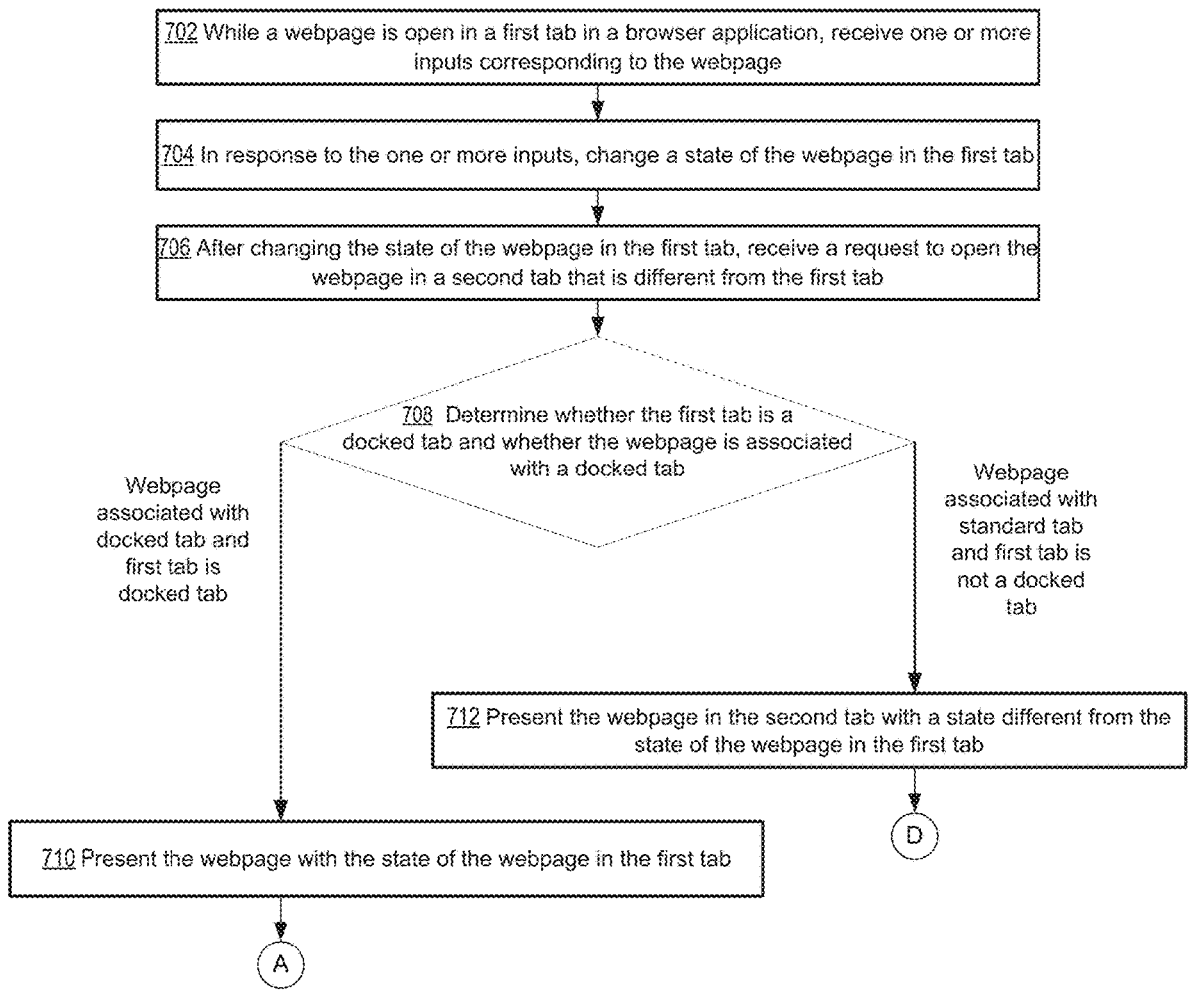
FIGS. 7A-7F illustrate a flow diagram of an exemplary process for providing and managing browser tabs associated with a browser application, in accordance with some embodiments.
Figure 7B:
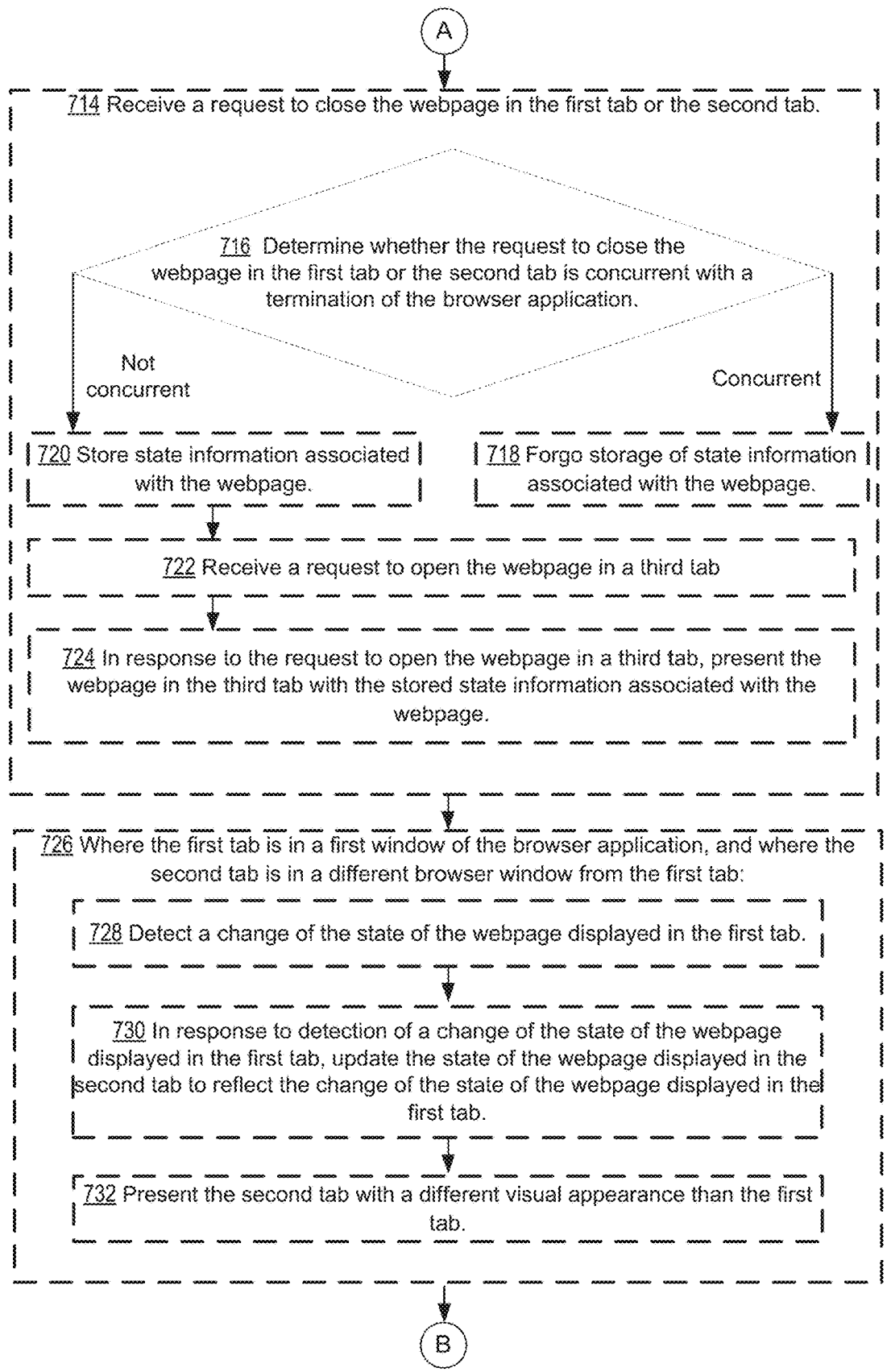
Figure 7C:
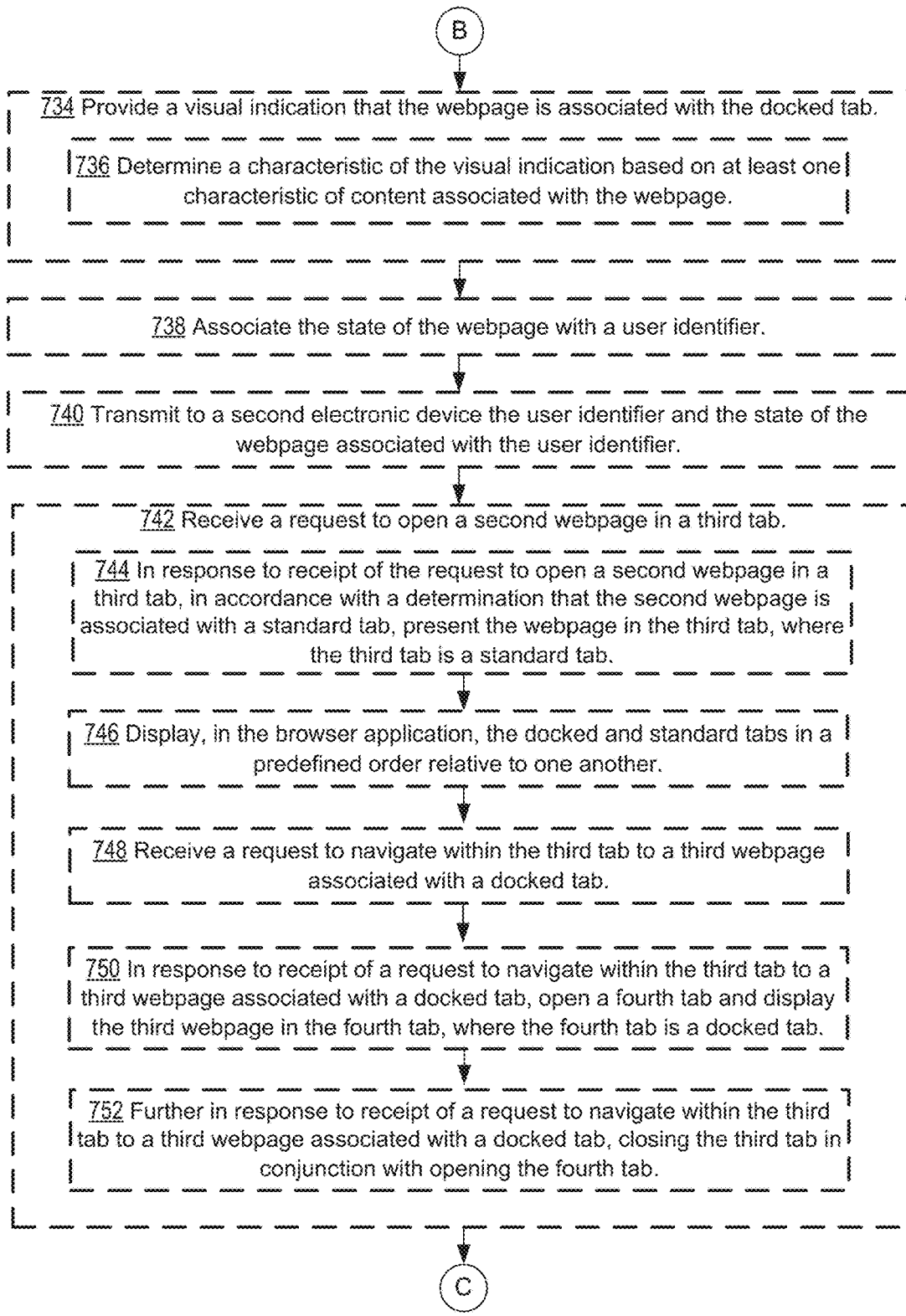
Figure 7D:
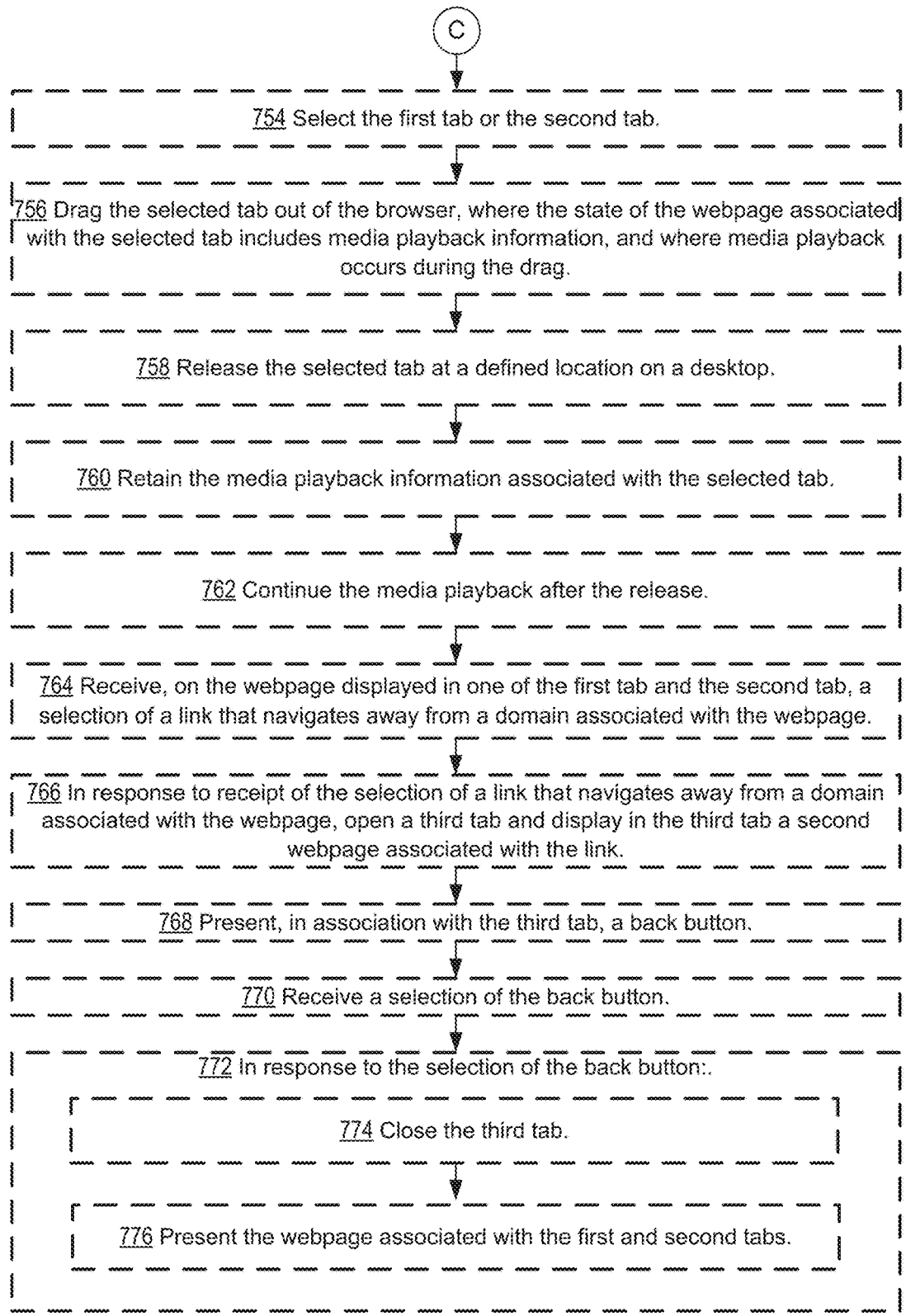
Figure 7E:
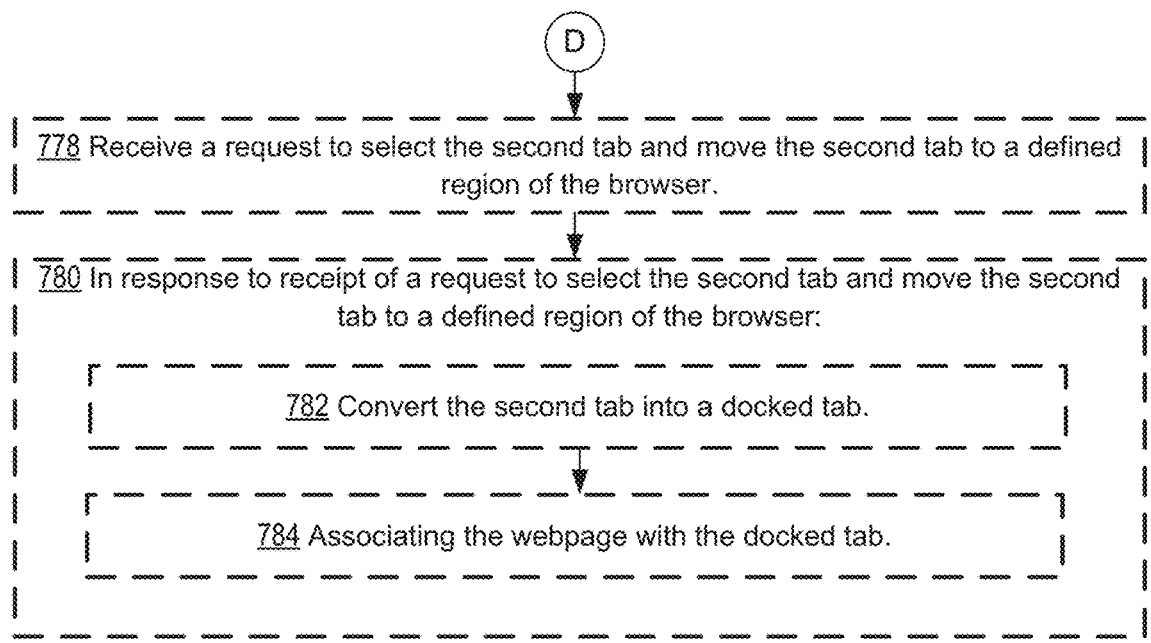

Referring to FIGS. 7A and 7E, after a determination that the webpage (e.g., 603) is associated with a standard tab and that the first tab (610) is not a docked tab, the browser interface (e.g., 601) optionally can receive (778) a request to select the second tab (e.g., 610; FIGS. 6F, 6G, 6H) and move the second tab (612) to a defined region (638) within the browser interface (e.g., 601). To reiterate, the second tab (e.g., 612) is a standard tab. In some embodiments, in response (780) to the receipt of the request to select the second tab (e.g., 612; FIG. 6F) and move the second tab (e.g., 612) to a defined region (e.g., adjacent to docked tabs 610 and 611 of FIG. 6G) within the browser interface (601), the browser interface (e.g., 601) converts (782) the second tab (e.g., 612) to a docked tab, and associate the webpage with the docked tab. In this way, the user can decide which webpages are of personal importance, and convert those to docked tabs for convenience.

Figure 7F:
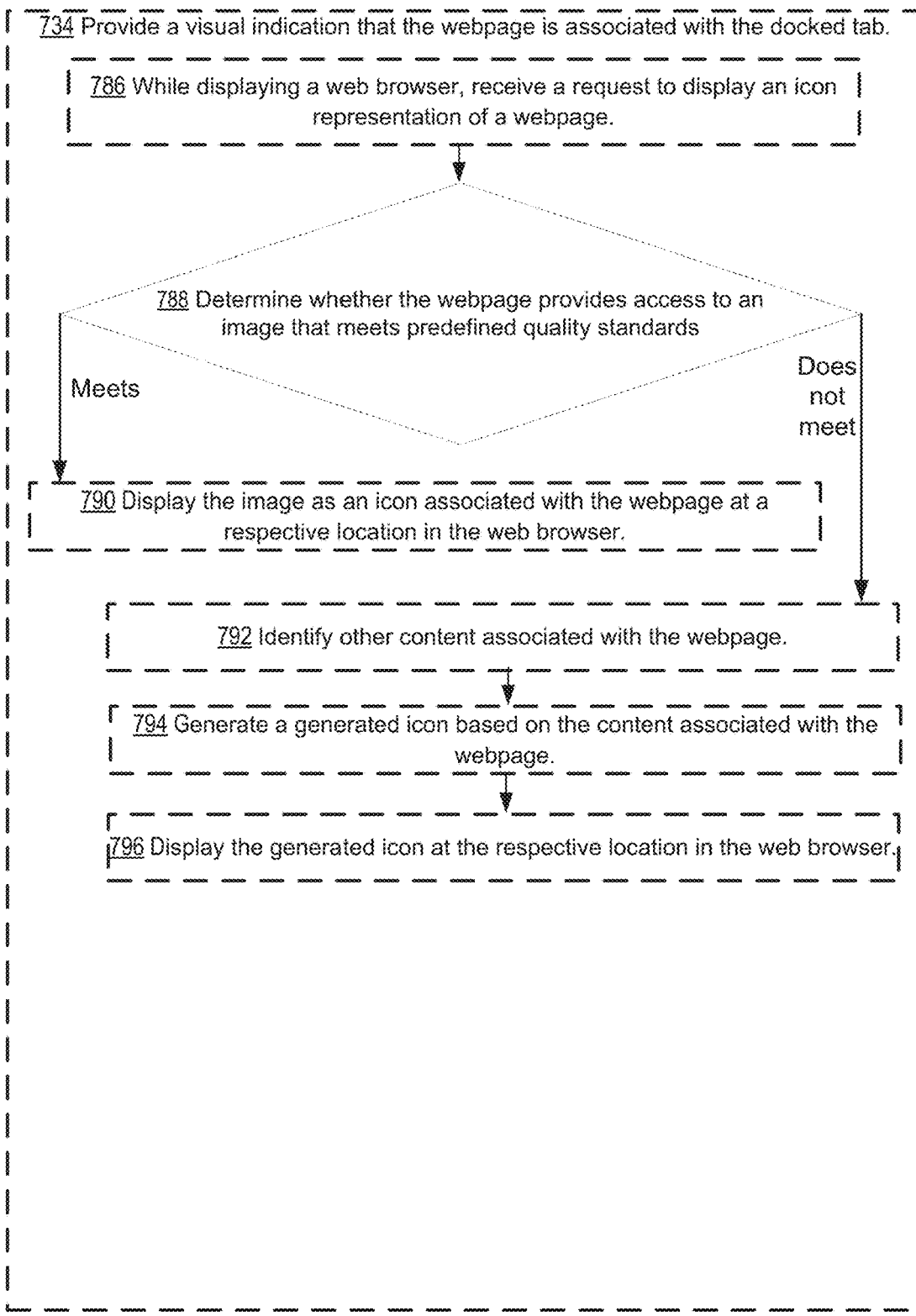

Referring to FIG. 7F, in some embodiments, providing (734) a visual indication that the webpage is associated with the docked tab is provided using an icon (e.g., monogram 634). While displaying a web browser interface (e.g., 601), the electronic device receives (786) a request to display an icon representation of a webpage. Next, the electronic device determines (788) whether the webpage (e.g., 603) provides access to an image that meets predefined quality standards. Where the image meets those quality standards, the electronic device displays (790) the image as an icon (e.g., 634) at a respective location in the browser interface. An image that meets quality standards is, for example, an image that is compliant with standards for the size, resolution, color gamut, color saturation, or other relevant characteristics, such as but not limited to a vector graphic or other image with similar or better resolution. In some embodiments, a low resolution image (such as a low resolution bitmap or similar image) does not meet the predefined quality standards, so the electronic device identifies (792) other content associated with the webpage (e.g., 603), in the manner described above. Next, the electronic device generates (794) a generated icon based on the content associated with the webpage. In some embodiments, the electronic device generates the generated icon substantially in real time; the electronic devices creates the generated icon (e.g., monogram 634) itself. The browser interface (601) then displays (796) the generated icon (e.g., monogram 634) at the respective location in the web browser.

Figure 8:
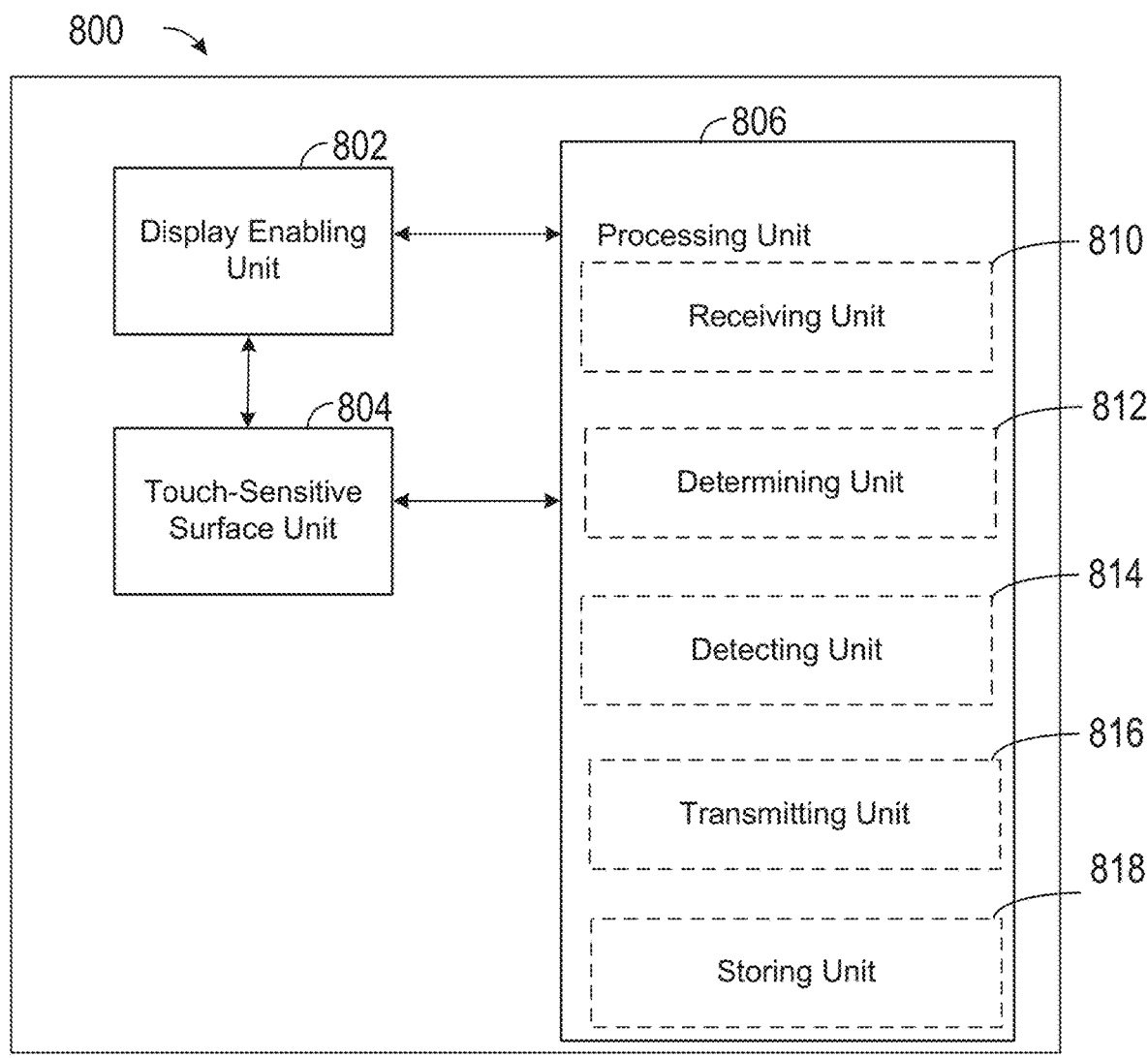
FIG. 8 is a functional block diagram of an electronic device in accordance with some embodiments.

In accordance with some embodiments, FIG. 8 shows an exemplary functional block diagram of an electronic device 800 configured in accordance with the principles of the various described embodiments. In accordance with some embodiments, the functional blocks of electronic device 800 are configured to perform the techniques described above. The functional blocks of the device 800 are, optionally, implemented by hardware, software, or a combination of hardware and software to carry out the principles of the various described examples. It is understood by persons of skill in the art that the functional blocks described in FIG. 8 are, optionally, combined or separated into sub-blocks to implement the principles of the various described examples. Therefore, the description herein optionally supports any possible combination or separation or further definition of the functional blocks described herein.

As shown in FIG. 8, an electronic device 800 includes a display enabling unit 802 configured to display a graphic user interface, optionally, a touch-sensitive surface unit 804 configured to receive contacts, and a processing unit 806 coupled to the display unit 802 and, optionally, the touch-sensitive surface unit 804. In some embodiments, the processing unit 806 includes a receiving unit 810, a determining unit 812, a detecting unit 814, a transmitting unit 816, and a storing unit 818.

The processing unit (806) includes a determining unit (812) and a receiving unit (810), and is coupled to a display enabling unit (802). The processing unit (806) is configured to, while a webpage is open in a first tab in a browser application, receive (e.g., with the receiving unit 810) one or more inputs corresponding to the webpage; and in response to the one or more inputs, change (e.g., with the processing unit 806) a state of the webpage in the first tab; after the change to the state of the webpage in the first tab: receive (e.g., with the receiving unit 810) a request to open the webpage in a second tab that is different from the first tab; and in response to the request to open the webpage in the second tab, determine (e.g., with the determining unit 812) whether the first tab is a docked tab and whether the webpage is associated with a docked tab: in accordance with a determination that the webpage is associated with and that the first tab is a docked tab, present (e.g., with the display enabling unit 802) the webpage with the state of the webpage in the first tab; in accordance with a determination that the webpage is associated with a standard tab and that the first tab is not a docked tab, present (e.g., with the display enabling unit 802) the webpage in the second tab with a state different from the state of the webpage in the first tab. The state of the webpage is selected from the group consisting of one or more of page position state, zoom level state, entered text state, sub-domain state, and media playback state.

The processing unit (806) is further configured to, further in accordance with the determination that the webpage is associated with a docked tab and that the first tab is a docked tab, and where the processing unit further comprising a storing unit, receive (e.g., with the receiving unit 810) a request to close the webpage in the first tab or the second tab; in response to the request to close the webpage in the first tab or the second tab, determine (e.g., with the determining unit 812) whether the request to close the webpage in the first tab or the second tab is concurrent with a termination of the browser application; in accordance with a determination that the request to close the webpage in the first tab or the second tab is not concurrent with a termination of the browser application, store (e.g., with the storing unit 818) the state information associated with the webpage; in accordance with a determination that the request to close the webpage in the first tab or the second tab is concurrent with a termination of the browser application, forgo storing (e.g., with the storing unit 818) the state information associated with the webpage.

The processing unit (806) is further configured to after storage of the state information associated with the webpage, receive (e.g., with the receiving unit 810) a request to open the webpage in a third tab; and in response to the request to open the webpage in a third tab, present (e.g., with the display enabling unit 802), the webpage in the third tab with the stored state information associated with the webpage. The first tab is in a first window of the browser application, and the second tab is in the same browser window as the first tab. In other embodiments, the first tab is in a first window of the browser application, and where the second tab is in a different browser window from the first tab.

The processing unit (806) is further configured to, where the webpage is associated with a docked tab, and where the processing unit further comprises a detecting unit, detect (e.g., with the detecting unit 814) a change of the state of the webpage displayed in the first tab; and in response to detection of a change of the state of the webpage displayed in the first tab, update (e.g., with the processing unit 806) the state of the webpage displayed in the second tab to reflect the change of the state of the webpage displayed in the first tab.

The display enabling unit (802) is further configured to present the second tab with a different visual appearance from the first tab. Where the webpage is associated with a docked tab, the display enabling unit (802) is further configured to provide a visual indication that the webpage is associated with the docked tab. The determining unit is further configured to determine (e.g., with the determining unit 812) a characteristic of the visual indication based on at least one characteristic of content associated with the webpage.

The processing unit (806) is further configured to, where the webpage is associated with a docked tab, where the processing unit is further configured to associate (e.g., with the processing unit 806) the state of the webpage with a user identifier; and transmit (e.g., with the transmitting unit), to a second electronic device, the user identifier and the state of the webpage associated with the user identifier.

The processing unit (806) is further configured to, where the webpage is associated with a docked tab, receive (e.g., with the receiving unit 810) a request to open a second webpage in a third tab; in response to the request to open the second webpage in a third tab, in accordance with a determination that the second webpage is associated with a standard tab, present (e.g., with the display enabling unit 802) the webpage in the third tab, where the third tab is a standard tab; and display (e.g., with the display enabling unit 802), in the browser application, the docked and standard tabs in a predefined order relative to one another.

The processing unit (806) is further configured to receive (e.g., with the receiving unit 810) a request to navigate within the third tab to a third webpage associated with a docked tab; in response to the request to navigate within the third tab to a third webpage associated with a docked tab, open a fourth tab and display (e.g., with the display enabling unit 802) the webpage in the fourth tab, where the fourth tab is a docked tab.

The processing unit (806) is further configured to, further in response to the request to navigate within the third tab to a third webpage associated with a docked tab, close the third tab and open the fourth tab.

The processing unit (806) is further configured to, where the webpage is associated with a standard tab, receive (e.g., with the receiving unit 810), a request to select the second tab and move the second tab to a defined region of the browser; in response to the request to select the second tab and move the second tab to a defined region of the browser: convert (e.g., with the processing unit 806) the second tab into a docked tab; and associate (e.g., with the processing unit 806) the webpage with the docked tab.

The electronic device of any of claims 24-38, where the webpage is associated with a docked tab, where the processing unit is further configured to: receive (e.g., with the receiving unit 810) a user selection of the first tab or the second tab; receive (e.g., with the receiving unit 810) a user action of dragging the selected tab out of the browser, where the state of the webpage associated with the selected tab includes media playback information, and where media playback occurs during the dragging; and receive (e.g., with the receiving unit 810) a user action of releasing the selected tab at a defined location on a desktop; retaining (e.g., with the storing unit 818) the media playback information associated with the selected tab; and continuing (e.g., with the processing unit 806) media playback after the releasing.

The processing unit (806) is further configured to, where the webpage is associated with a docked tab, receive (e.g., with the receiving unit 810) on the webpage displayed in one of the first tab and the second tab, a selection of a link that navigates away from a domain associated with the webpage; in response to selection of the link that navigates away from the domain associated with the webpage, open (e.g., with the processing unit 806) a third tab and displaying in the third tab a second webpage associated with the link; present (e.g., with the display enabling unit 802) in association with the browser, a back button; receive (e.g., with the receiving unit 810) a selection of the back button; and in response to the selection of the back button: close the third tab, and present (e.g., with the display enabling unit 802) the webpage associated with the first and second tabs.

In accordance with some embodiments, FIG. 9 shows an exemplary functional block diagram of an electronic device 900 configured in accordance with the principles of the various described embodiments. In accordance with some embodiments, the functional blocks of electronic device 800 are configured to perform the techniques described above. The functional blocks of the device 900 are, optionally, implemented by hardware, software, or a combination of hardware and software to carry out the principles of the various described examples. It is understood by persons of skill in the art that the functional blocks described in FIG. 9 are, optionally, combined or separated into sub-blocks to implement the principles of the various described examples. Therefore, the description herein optionally supports any possible combination or separation or further definition of the functional blocks described herein.

As shown in FIG. 9, an electronic device 900 includes a display enabling unit 902 configured to display a graphic user interface, optionally, a touch-sensitive surface unit 904 configured to receive contacts, and a processing unit 906 coupled to the display unit 902 and, optionally, the touch-sensitive surface unit 904. In some embodiments, the processing unit 906 includes a receiving unit 910, a determining unit 912, an identifying unit 914, and a generating unit 916.

The processing unit (906) includes a receiving unit (910), a determining unit (912), an identifying unit (914), and a generating unit (916), and is coupled to a display enabling unit (902). The processing unit (906) is configured to, while displaying (e.g., using the display enabling unit 902), a web browser, receiving (e.g., using the receiving unit 910) a request to display an icon representation of a webpage; in response to receiving the request to display the icon representation of the webpage, determining (e.g., using the determining unit 912), whether the webpage provides access to an image that meets predefined quality standards: in accordance with a determination that the webpage provides access to an image that meets predefined quality standards for use as an icon, displaying (e.g., using the display enabling unit 902) the high-quality image as an icon associated with the webpage at a respective location in the web browser; and in accordance with a determination that the webpage does not provide access to an image that meets the predefined quality standards: identify (e.g., using the identifying unit 914) other content associated with the webpage; generate (e.g., using the generating unit 916) a generated icon based on the content associated with the webpage; and display (e.g., using the display enabling unit 902) the generated icon at a respective location in the web browser.

In some embodiments, the generating unit (916) optionally can be further configured to: identify (e.g., using the identifying unit 914) text associated with the webpage; identify (e.g., using the identifying unit 914) a color associated with the webpage; and generate (e.g., using the generating unit 916) the generated icon that uses a predefined portion of the text associated with the webpage and incorporates the color associated with the webpage.

In some embodiments, the generated icon includes the first letter of the text associated with the webpage overlaid on a background that is the color associated with the webpage.

In some embodiments, the text associated with the webpage is selected from a plurality of sources based on one or more rules for selecting text.

In some embodiments, the text associated with the webpage is selected from one or more of the following: a resource identifier of the webpage; a title of the webpage; text retrieved from the webpage; a title of the webpage with one or more types of common words removed; and text from another metadata field associated with the webpage.

In some embodiments, the color associated with the webpage is generated (e.g., using the generating unit 916) based on one or more of: a predominant color of an icon associated with the webpage that does not meet the predefined quality standard; and a predominant color of the webpage.

In some embodiments, the webpage is associated with a low-quality icon that does not meet the predefined quality standards, and the generated icon is displayed (e.g., using the display enabling unit 902) for the webpage instead of displaying (e.g., using the display enabling unit 902) the low-quality icon.

In some embodiments, the low-quality icon is a bitmap icon.

In some embodiments, the high-quality image is a vector graphic.

The operations described above with reference to FIGS. 7A-7F are, optionally, implemented by components depicted in FIGS. 1A-1B or FIG. 8 or FIG. 9. For example, receiving operations 702 and 706 and changing operation 704 is implemented by browser module 147 event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 optionally can utilize or call data updater 176 or object updater 177 to update the application internal state 192. In some embodiments, event handler 190 accesses a respective GUI updater 178 to update what is displayed by the application. Browser module 147 optionally can interact with event handler 190 to update the state of a webpage received by and interpreted by the browser module 147. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to improve the delivery to users of invitational content or any other content that may be of interest to them. The present disclosure contemplates that in some instances, this gathered data may include personal information data that uniquely identifies or can be used to contact or locate a specific person. Such personal information data can include demographic data, location-based data, telephone numbers, email addresses, home addresses, or any other identifying information.

The present disclosure recognizes that the use of such personal information data, in the present technology, can be used to the benefit of users. For example, the personal information data can be used to deliver targeted content that is of greater interest to the user. Accordingly, use of such personal information data enables calculated control of the delivered content. Further, other uses for personal information data that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services. In another example, users can select not to provide location information for targeted content delivery services. In yet another example, users can select to not provide precise location information, but permit the transfer of location zone information.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publically available information.

What is claimed is:

1. An electronic device, comprising:
a display;
a memory;
one or more processors coupled to the display and the memory; and
one or more programs stored in the memory and executable by the one or more processors, wherein the one or more programs comprise instructions which, when executed by the one or more processors, cause the electronic device to:
while displaying a web browser, receive a request to display an icon representation of a webpage;
in response to receiving the request to display the icon representation of the webpage, determine whether the webpage provides access to an image that meets predefined quality standards for use as an icon, wherein the predefined quality standards include a threshold image resolution:
in accordance with a determination that the webpage provides access to an image that meets the predefined quality standards, display the image as an icon associated with the webpage at a respective location in the web browser; and
in accordance with a determination that the webpage does not provide access to an image that meets the predefined quality standards:
identify other content associated with the webpage;
generate a generated icon based on the content associated with the webpage; and
display the generated icon at a respective location in the web browser.

2. The electronic device of claim 1, wherein generating the generated icon includes:
identifying text associated with the webpage;
identifying a color associated with the webpage; and
generating the generated icon that uses a predefined portion of the text associated with the webpage and incorporates the color associated with the webpage.

3. The electronic device of claim 2, wherein the generated icon includes a first letter of the text associated with the webpage overlaid on a background that is the color associated with the webpage.

4. The electronic device of claim 2, wherein the text associated with the webpage is selected from a plurality of sources based on one or more rules for selecting text.

5. The electronic device of claim 2, wherein the text associated with the webpage is selected from one or more of the following:
a resource identifier of the webpage;
a title of the webpage;
text retrieved from the webpage;
a title of the webpage with one or more types of common words removed; and
text from another metadata field associated with the webpage.

6. The electronic device of claim 2, wherein the color associated with the webpage is generated based on one or more of:
a predominant color of an icon associated with the webpage that does not meet the predefined quality standard; and
a predominant color of the webpage.

7. The electronic device of claim 1, wherein the webpage is associated with a low-quality icon that does not meet the predefined quality standards, and the generated icon is displayed for the webpage instead of displaying the low-quality icon.

8. The electronic device of claim 7, wherein the low-quality icon is a bitmap icon.

9. The electronic device of claim 7, wherein the image that meets the predefined quality standards is a vector graphic.

10. A non-transitory computer-readable storage medium storing one or more programs, the one or more programs comprising instructions, which when executed by an electronic device, cause the electronic device to:
while displaying a web browser, receive a request to display an icon representation of a webpage;
in response to receiving the request to display the icon representation of the webpage, determine whether the webpage provides access to an image that meets predefined quality standards for use as an icon, wherein the predefined quality standards include a threshold for image resolution:
in accordance with a determination that the webpage provides access to an image that meets the predefined quality standards, display the image as an icon associated with the webpage at a respective location in the web browser; and
in accordance with a determination that the webpage does not provide access to an image that meets the predefined quality standards:
identify other content associated with the webpage;
generate a generated icon based on the content associated with the webpage; and
display the generated icon at a respective location in the web browser.

11. The non-transitory computer-readable storage medium of claim 10, wherein generating the generated icon includes:
identifying text associated with the webpage;
identifying a color associated with the webpage; and
generating the generated icon that uses a predefined portion of the text associated with the webpage and incorporates the color associated with the webpage.

12. The non-transitory computer-readable storage medium of claim 11, wherein the generated icon includes the first letter of the text associated with the webpage overlaid on a background that is the color associated with the webpage.

13. The non-transitory computer-readable storage medium of claim 11, wherein the text associated with the webpage is selected from a plurality of sources based on one or more rules for selecting text.

14. The non-transitory computer-readable storage medium of claim 11, wherein the text associated with the webpage is selected from one or more of the following:

a resource identifier of the webpage;
a title of the webpage;
text retrieved from the webpage;
a title of the webpage with one or more types of common words removed; and
text from another metadata field associated with the webpage.

15. The non-transitory computer-readable storage medium of claim 11, wherein the color associated with the webpage is generated based on one or more of:
   a predominant color of an icon associated with the webpage that does not meet the predefined quality standard; and
   a predominant color of the webpage.

16. The non-transitory computer-readable storage medium of claim 10, wherein the webpage is associated with a low-quality icon that does not meet the predefined quality standards, and the generated icon is displayed for the webpage instead of displaying the low-quality icon.

17. The non-transitory computer-readable storage medium of claim 16, wherein the low-quality icon is a bitmap icon.

18. The non-transitory computer-readable storage medium of claim 16, wherein the image that meets the predefined quality standards js a vector graphic.

19. A method, comprising:
   at an electronic device with a display:
      while displaying a web browser, receiving a request to display an icon representation of a webpage;
      in response to receiving the request to display the icon representation of the webpage, determining whether the webpage provides access to an image that meets predefined quality standards for use as an icon, wherein the predefined quality standards include a threshold for image resolution:
         in accordance with a determination that the webpage provides access to an image that meets the predefined quality standards, displaying the image as an icon associated with the webpage at a respective location in the web browser; and
         in accordance with a determination that the webpage does not provide access to an image that meets the predefined quality standards:
            identifying other content associated with the webpage;
            generating a generated icon based on the content associated with the webpage; and
            displaying the generated icon at a respective location in the web browser.

20. The method of claim 19, wherein generating the generated icon includes:
   identifying text associated with the webpage;
   identifying a color associated with the webpage; and
   generating the generated icon that uses a predefined portion of the text associated with the webpage and incorporates the color associated with the webpage.

21. The method of claim 20, wherein the generated icon includes the first letter of the text associated with the webpage overlaid on a background that is the color associated with the webpage.

22. The method of claim 20, wherein the text associated with the webpage is selected from a plurality of sources based on one or more rules for selecting text.

23. The method of claim 20, wherein the text associated with the webpage is selected from one or more of the following:
   a resource identifier of the webpage;
   a title of the webpage;
   text retrieved from the webpage;
   a title of the webpage with one or more types of common words removed; and
   text from another metadata field associated with the webpage.

24. The method of claim 20, wherein the color associated with the webpage is generated based on one or more of:
   a predominant color of an icon associated with the webpage that does not meet the predefined quality standard; and
   a predominant color of the webpage.

25. The method of claim 19, wherein the webpage is associated with a low-quality icon that does not meet the predefined quality standards, and the generated icon is displayed for the webpage instead of displaying the low-quality icon.

26. The method of claim 25, wherein the low-quality icon is a bitmap icon.

27. The method of claim 25, wherein the image that meets the predefined quality standards is a vector graphic.

* * * * *

UNITED STATES PATENT AND TRADEMARK OFFICE
CERTIFICATE OF CORRECTION

PATENT NO. : 10,877,720 B2
APPLICATION NO. : 16/363945
DATED : December 29, 2020
INVENTOR(S) : Kevin Decker et al.

Page 1 of 1

It is certified that error appears in the above-identified patent and that said Letters Patent is hereby corrected as shown below:

In the Claims

In Column 55, Line 25, Claim 18, delete "js" and insert -- is --, therefor.

Signed and Sealed this
Sixth Day of April, 2021

Drew Hirshfeld
*Performing the Functions and Duties of the*
*Under Secretary of Commerce for Intellectual Property and*
*Director of the United States Patent and Trademark Office*